United States Patent
Cirik et al.

(10) Patent No.: US 12,041,617 B2
(45) Date of Patent: Jul. 16, 2024

(54) POWER CONTROL IN MULTIPLE DATA SCHEDULING

(71) Applicant: Ofinno, LLC, Reston, VA (US)

(72) Inventors: Ali Cagatay Cirik, Chantilly, VA (US); Hua Zhou, Vienna, VA (US); Esmael Hejazi Dinan, McLean, VA (US); Yunjung Yi, Vienna, VA (US); Jonghyun Park, Syosset, NY (US); Nazanin Rastegardoost, McLean, VA (US); Kai Xu, Great Falls, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/197,472

(22) Filed: May 15, 2023

(65) Prior Publication Data
US 2023/0284230 A1 Sep. 7, 2023

Related U.S. Application Data

(63) Continuation of application No. PCT/US2022/021657, filed on Mar. 24, 2022.
(Continued)

(51) Int. Cl.
*H04W 72/21* (2023.01)
*H04L 5/00* (2006.01)
*H04W 72/232* (2023.01)

(52) U.S. Cl.
CPC ........... *H04W 72/21* (2023.01); *H04L 5/0048* (2013.01); *H04W 72/232* (2023.01)

(58) Field of Classification Search
CPC .... H04W 72/21; H04W 72/232; H04L 5/0048
(Continued)

(56) References Cited

U.S. PATENT DOCUMENTS

2019/0182001 A1* 6/2019 Lee .................... H04W 72/21
2020/0008270 A1   1/2020 Zhang et al.
(Continued)

FOREIGN PATENT DOCUMENTS

EP      3 477 885 A1      5/2019
WO   2020/150943 A1      7/2020
(Continued)

OTHER PUBLICATIONS

R1-2101608; 3GPP TSG RAN WG1 Meeting #104-e; Electronic Meeting, Jan. 25-Feb. 5, 2021; Source: NTT Docomo, Inc.; Title: Beam based operation for new SCSs for NR from 52.6 to 71 GHz; Agenda Item: 8.2.4; Document for: Discussion and Decision.
(Continued)

*Primary Examiner* — Chi Tang P Cheng
(74) *Attorney, Agent, or Firm* — Brett Gardner; Kavon Nasabzadeh; Philip R. Smith

(57) ABSTRACT

A wireless device may receive downlink control information (DCI) scheduling physical uplink shared channel (PUSCH) transmissions for a cell. The DCI may comprise a first phase tracking reference signal-demodulation reference signal (PTRS-DMRS) association field, a second PTRS-DMRS association field, and a sounding reference signal (SRS) resource set field. A first value of the SRS resource set field may indicate the PUSCH transmissions are based on the first PTRS-DMRS association field, and a second value of the SRS resource set field may indicate the PUSCH transmissions are based on both the first PTRS-DMRS association field and the second PTRS-DMRS association field. The wireless device may transmit the PUSCH transmissions based on the SRS resource set field.

20 Claims, 23 Drawing Sheets

Related U.S. Application Data

(60) Provisional application No. 63/165,526, filed on Mar. 24, 2021.

(58) Field of Classification Search
USPC .......................................................... 370/328
See application file for complete search history.

(56) References Cited

U.S. PATENT DOCUMENTS

| | | |
|---|---|---|
| 2020/0204312 A1 | 6/2020 | Xu et al. |
| 2020/0221485 A1 | 7/2020 | Cirik et al. |
| 2020/0267712 A1 | 8/2020 | Cirik et al. |
| 2020/0314880 A1 | 10/2020 | Cirik et al. |
| 2020/0351129 A1 | 11/2020 | Kwak et al. |
| 2020/0351841 A1 | 11/2020 | Cirik et al. |
| 2020/0351892 A1 | 11/2020 | Yi et al. |
| 2021/0036746 A1 | 2/2021 | Liu et al. |
| 2021/0136802 A1 | 5/2021 | Cirik et al. |
| 2021/0144720 A1 | 5/2021 | Xu et al. |
| 2021/0321379 A1 | 10/2021 | Cirik et al. |
| 2021/0385840 A1 | 12/2021 | Cirik et al. |
| 2022/0239410 A1 | 7/2022 | Lim et al. |

FOREIGN PATENT DOCUMENTS

| | | |
|---|---|---|
| WO | 2022/025590 A1 | 2/2022 |
| WO | 2022/083634 A1 | 4/2022 |
| WO | 2022/187051 A1 | 9/2022 |

OTHER PUBLICATIONS

R1-2101609; 3GPP TSG RAN WG1 Meeting #104-e; Electronic Meeting, Jan. 25-Feb. 5, 2021; Source: NTT Docomo, Inc.; Title: PDSCH/PUSCH enhancements for NR from 52.6 to 71 GHz; Agenda Item: 8.2.5; Document for: Discussion and Decision.

R1-2101776; 3GPP TSG RAN WG1 Meeting #104-e; E-meeting, Jan. 25-Feb. 5, 2021; Source: Moderator (vivo); Title: Summary of PDSCH/PUSCH enhancements (Bandwidth/Timeline/Reference signals); Agenda item: 8.2.5; Document for: Discussion and decision.

R1-2101780; 3GPP TSG RAN WG1 #104-e; e-Meeting, Jan. 25-Feb. 5, 2021; Agenda Item: 8.2.5; Source: InterDigital, Inc.; Title: Discussions on PDSCH/PUSCH enhancements; Document for: Discussion and Decision.

R1-2101784; 3GPP TSG RAN WG1 #104-e; e-Meeting, Jan. 25-Feb. 5, 2021; Agenda item: 8.1.2.1; Source: Moderator (Nokia, Nokia Shanghai Bell); Title: Summary of Multi-TRP for PUCCH and PUSCH; Document for: Discussion and Decision.

R1-2101799; 3GPP TSG RAN WG1 #104-e; e-Meeting, Jan. 25-Feb. 5, 2021; Agenda Item: 8.2.5; Source: Moderator (LG Electronics); Title: Summary #1 of PDSCH/PUSCH enhancements (Scheduling/HARQ); Document for: Discussion and decision.

R1-2101819; 3GPP TSG RAN WG1 #104-e; e-Meeting, Jan. 25-Feb. 5, 2021; Title: Discussion on the data channel enhancements for 52.6 to 71GHz; Source: ZTE, Sanechips; Agenda Item: 8.2.5; Document for: Discussion and Decision.

R1-2101858; 3GPP TSG RAN WG1 #104-e; e-Meeting, Jan. 25-Feb. 5, 2021; Agenda Item: 8.2.5; Source: Moderator (LG Electronics); Title: Summary #2 of PDSCH/PUSCH enhancements (Scheduling/HARQ); Document for: Discussion and decision.

R1-2101883; 3GPP TSG RN WG1 Meeting #104-e; E-meeting, Jan. 25-Feb. 5, 2021; Source: Moderator (vivo); Title: Discussion summary #1 of [104-e-NR-52-71GHz-05]; Agenda item: 8.2.5; Document for: Discussion and decision.

R1-2101895; 3GPP TSG RAN WG1 #104-e; e-Meeting, Jan. 25-Feb. 5, 2021; Agenda Item: 8.2.4; Source: Moderator (InterDigital, Inc.); Title: Discussion summary of [104-e-NR-52-71GHz-04]; Document for: Discussion and Decision.

R1-2101900; 3GPP TSG RAN WG1 #104-e; e-Meeting, Jan. 25-Feb. 5, 2021; Agenda item: 8.1.2.1; Source: Moderator (Nokia); Title: Summary #2 of Multi-TRP for PUCCH and PUSCH; Document for: Discussion and Decision.

R1-2101958; 3GPP TSG-RAN WG1 Meeting #104-e; eMeeting, Jan. 25-Feb. 5, 2021; Agenda item: 8.2.5; Source: Charter Communications; Title: PDSCH-PUSCH Enhancement Aspects for NR beyond 52.6 GHz; Document for: Discussion.

R1-2101972; 3GPP TSG RAN WG1 #104-e; e-Meeting, Jan. 25-Feb. 5, 2021; Agenda Item: 8.2.5; Source: Moderator (LG Electronics); Title: Summary #3 of PDSCH/PUSCH enhancements (Scheduling/HARQ); Document for: Discussion and decision.

R1-2102016; 3GPP TSG RAN WG1 #104-e; e-Meeting, Jan. 25-Feb. 5, 2021; Agenda Item: 8.2.4; Source: Moderator (InterDigital, Inc.); Title: Discussion summary #2 of [104-e-NR-52-71GHz-04]; Document for: Discussion and Decision.

R1-2102060; 3GPP TSG RAN WG1 #104-e; e-Meeting, Jan. 25-Feb. 5, 2021; Agenda item: 8.1.2.1; Source: Moderator (Nokia); Title: Summary #3 of Multi-TRP for PUCCH and PUSCH; Document for: Discussion and Decision.

R1-2102072; 3GPP TSG RAN WG1 Meeting #104-e; E-meeting, Jan. 25-Feb. 5, 2021; Source: Moderator (vivo); Title: Discussion summary #2 of [104-e-NR-52-71GHz-05]; Agenda item: 8.2.5; Document for: Discussion and decision.

R1-2102080; 3GPP TSG RAN WG1 #104-e; e-Meeting, Jan. 25-Feb. 5, 2021; Agenda Item: 8.2.5; Source: Moderator (LG Electronics); Title: Summary #4 of PDSCH/PUSCH enhancements (Scheduling/HARQ); Document for: Discussion and decision.

R1-2102090; 3GPP TSG RAN WG1 Meeting #104-e; e-Meeting, Jan. 25-Feb. 5, 2021; Title: [Draft] LS on the maximum/minimum channel bandwidth and channelization for NR operation in 52.6 to 71 GHz; Response to:; Release: Rel-17; Work Item: NR_ext_to_71GHZ.

R1-2102100; 3GPP TSG RAN WG1 #104-e; e-Meeting, Jan. 25-Feb. 5, 2021; Agenda Item: 8.2.4; Source: Moderator (InterDigital, Inc.); Title: Discussion summary of [104-e-NR-52-71GHz-04] #2; Document for: Discussion and Decision.

R1-2102128; 3GPP TSG RAN WG1 Meeting #104-e; e-Meeting, Jan. 25-Feb. 5, 2021; Title: LS on the maximum/minimum channel bandwidth and channelization for NR operation in 52.6 to 71 GHz; Response to:; Release: Rel-17; Work Item: NR_ext_to_71GHz.

R1-2102144; 3GPP TSG RAN WG1 #104-e; e-Meeting, Jan. 25-Feb. 5, 2021; Agenda Item: 8.2.4; Source: Moderator (InterDigital, Inc.); Title: Discussion summary #4 of [104-e-NR-52-71GHz-04]; Document for: Discussion and Decision.

R1-2102237; 3GPP TSG RAN WG1 Meeting #104-e; E-meeting, Jan. 25-Feb. 5, 2021; Source: Moderator (vivo); Title: Discussion summary #3 of [104-e-NR-52-71GHz-05]; Agenda item: 8.2.5; Document for: Discussion and decision.

R1-2102243; 3GPP TSG RAN WG1 #104-e; e-Meeting, Jan. 25-Feb. 5, 2021; Agenda Item: 8.2.4; Source: Moderator (InterDigital, Inc.); Title: Discussion summary #5 of [104-e-NR-52-71GHz-04]; Document for: Discussion and Decision.

R1-2100286; 3GPP TSG RAN WG1 Meeting #104-e; e-Meeting, Jan. 25-Feb. 5, 2021; Source: ZTE; Title: Enhancements on Multi-TRP for PDCCH, PUCCH and PUSCH; Agenda Item: 8.1.2.1; Document for: Discussion and Decision.

R1-2101654; 3GPP TSG-RAN WG1 Meeting #104e; Jan. 26-Feb. 12, 2021; Agenda Item: 8.1.2.1; Source: Ericsson; Title: On PDCCH, PUCCH and PUSCH enhancements; Document for: Discussion and Decision.

International Search Report and Written Opinion of the International Searching authority dated Jul. 12, 2022, in International Application No. PCT/US2022/021657.

3GPP TS 38.211 V16.3.0 (Sep. 2020); Technical Specification; 3rd Generation Partnership Project; Technical Specification Group Radio Access Network; NR; Physical channels and modulation; (Release 16).

3GPP TS 38.212 V16.3.0 (Sep. 2020); Technical Specification; 3rd Generation Partnership Project; Technical Specification Group Radio Access Network; NR; Multiplexing and channel coding; (Release 16).

(56) References Cited

OTHER PUBLICATIONS

3GPP TS 38.213 V16.4.0 (Dec. 2020); Technical Specification; 3rd Generation Partnership Project; Technical Specification Group Radio Access Network; NR; Physical layer procedures for control; (Release 16).
3GPP TS 38.214 V16.4.0 (Dec. 2020); Technical Specification; 3rd Generation Partnership Project; Technical Specification Group Radio Access Network; NR; Physical layer procedures for data; (Release 16).
3GPP TS 38.300 V16.3.0 (Sep. 2020); Technical Specification; 3rd Generation Partnership Project; Technical Specification Group Radio Access Network; NR; NR and NG-RAN Overall Description; Stage 2; (Release 16).
3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).
3GPP TS 38.331 V16.3.1 (Jan. 2021); Technical Specification; 3rd Generation Partnership Project; Technical Specification Group Radio Access Network; NR; Radio Resource Control (RRC) protocol specification; (Release 16).
R1-2100050; 3GPP TSG RAN WG1 #104-e; e-Meeting, Jan. 25-Feb. 5, 2021; Agenda Item: 8.2.5; Source: Futurewei; Title: Considerations for higher SCS support in beyond 52.6GHz; Document for: Discussion/Decision.
R1-2100052; 3GPP TSG RAN WG1 Meeting #104-e; e-Meeting, Jan. 25-Feb. 5, 2021; Agenda Item: 8.2.4; Source: Futurewei; Title: Beam management for shared spectrum access in beyond 52.6GHz; Document for: Discussion and decision.
R1-2100060; 3GPP TSG RAN WG1 #104-e; e-meeting, Jan. 25-Feb. 5, 2021; Source: Lenovo, Motorola Mobility; Title: Beam-management enhancements for NR from 52.6 GHz to 71GHz; Agenda Item: 8.2.4; Document for: Discussion.
R1-2100061; 3GPP TSG RAN WG1 #104-e; e-meeting, Jan. 25-Feb. 5, 2021; Source: Lenovo, Motorola Mobility; Title: PDSCH/PUSCH scheduling enhancements for NR from 52.6 GHz to 71GHz; Agenda Item: 8.2.5; Document for: Discussion.
R1-2100076; 3GPP TSG RAN WG1 #104-e; e-Meeting, Jan. 25-Feb. 5, 2021; Title: Discussion on the beam management for 52.6 to 71 GHz; Source: ZTE, Sanechips; Agenda Item: 8.2.4; Document for: Discussion and Decision.
R1-2100077; 3GPP TSG RAN WG1 #104-e; e-Meeting, Jan. 25-Feb. 5, 2021; Title: Discussion on the data channel enhancements for 52.6 to 71GHz; Source: ZTE, Sanechips; Agenda Item: 8.2.5; Document for: Discussion and Decision.
R1-2100152; 3GPP TSG RAN WG1 #104-e; e-Meeting, Jan. 25-Feb. 5, 2021; Source: OPPO; Title: Discussion on beam management; Agenda Item: 8.2.4; Document for: Discussion and Decision.
R1-2100153; 3GPP TSG RAN WG1 #104-e; e-Meeting, Jan. 25-Feb. 5, 2021; Source: OPPO; Title: Discussion on PDSCH/PUSCH enhancements; Agenda Item: 8.2.5; Document for: Discussion and Decision.
R1-2100201; 3GPP TSG RAN WG1 Meeting #104-e; E-meeting, Jan. 25-Feb. 5, 2021; Agenda Item: 8.2.5; Source: Huawei, HiSilicon; Title: PDSCH/PUSCH enhancements for 52-71GHz band; Document for: Discussion and Decision.
R1-2100203; 3GPP TSG RAN WG1 Meeting #104-e; E-meeting, Jan. 25-Feb. 5, 2021; Agenda Item: 8.2.4; Source: Huawei, HiSilicon; Title: Discussion on the beam management procedures for 52-71GHz band; Document for: Discussion and Decision.
R1-2100260; 3GPP TSG RAN WG1 #104; e-Meeting, Jan. 25-Feb. 5, 2021; Agenda item: 8.2.4; Source: Nokia, Nokia Shanghai Bell; Title: Beam Management Aspects; Document for: Discussion and Decision.
R1-2100261; 3GPP TSG RAN WG1 #104-e; e-Meeting, Jan. 25-Feb. 5, 2021; Agenda item: 8.2.5; Source: Nokia, Nokia Shanghai Bell; Title: PDSCH/PUSCH enhancements; Document for: Discussion and Decision.
R1-2100300; 3GPP TSG RAN WG1 #104-e; e-Meeting, Jan. 25-Feb. 5, 2021; Source: CAICT; Title: Discussions on PDSCH and PUSCH enhancements for 52.6-71GHz; Agenda Item: 8.2.5; Document for: Discussion / Decision.
R1-2100373; 3GPP TSG RAN WG1 #104e; e-Meeting, Jan. 25-Feb. 5, 2021; Source: CATT; Title: Beam management for new SCSs for up to 71GHz operation; Agenda Item: 8.2.4; Document for: Discussion and Decision.
R1-2100374; 3GPP TSG RAN WG1 #104-e; e-Meeting, Jan. 25-Feb. 5, 2021; Source: CATT; Title: PDSCH/PUSCH enhancements for up to 71GHz operation; Agenda Item: 8.2.5; Document for: Discussion and Decision.
R1-2100432; 3GPP TSG RAN WG1 #104-e; e-Meeting, Jan. 25-Feb. 5, 2021; Source: vivo; Title: Discussions on beam management for new SCSs for NR operation from 52.6GHz to 71GHz; Agenda Item: 8.2.4; Document for: Discussion and Decision.
R1-2100433; 3GPP TSG RAN WG1 #104-e; e-Meeting, Jan. 25-Feb. 5, 2021; Source: vivo; Title: Discussions on PDSCH PUSCH enhancements for NR operation from 52.6GHz to 71GHz; Agenda Item: 8.2.5; Document for: Discussion and Decision.
R1-2100553; 3GPP TSG RAN WG1 #104-e; e-Meeting, Jan. 25-Feb. 5, 2021; Source: Mitsubishi Electric; Title: PT-RS enhancements for NR from 52.6GHz to 71GHz; Agenda Item: 8.2.5—PDSCH/PUSCH enhancements; Document for: Discussion/Decision.
R1-2100605; 3GPP TSG RAN WG1 #104-e; e-Meeting, Jan. 25-Feb. 5, 2021; Agenda item: 8.2.5; Title: On Enhancements of PDSCH Reference Signals; Source: MediaTek Inc.; Document for: Discussion.
R1-2100646; 3GPP TSG RAN WG1 Meeting #104-e; e-Meeting, Jan. 25-Feb. 5, 2021; Source: Intel Corporation; Title: Discussion on Beam management aspects for extending NR up to 71 GHz; Agenda item: 8.2.4; Document for: Discussion/Decision.
R1-2100647; 3GPP TSG RAN WG1 Meeting #104-e; e-Meeting, Jan. 25-Feb. 5, 2021; Source: Intel Corporation; Title: Discussion on PDSCH/PUSCH enhancements for extending NR up to 71 GHz; Agenda item: 8.2.5; Document for: Discussion/Decision.
R1-2100741; 3GPP TSG RAN WG1 #104-e; e-Meeting, Jan. 25-Feb. 5, 2021; Agenda Item: 8.2.5; Source: Fujitsu; Title: Considerations on multi-PDSCH/PUSCH with a single DCI and HARQ for NR from 52.6 GHz to 71 GHz; Document for: Discussion/Decision.
R1-2100820; 3GPP TSG RAN WG1#104-e; e-Meeting, Jan. 25-Feb. 5, 2021; Agenda Item: 8.2.5; Source: Spreadtrum Communications; Title: Discussion on PDSCH and PUSCH enhancements for above 52.6GHz; Document for: Discussion and decision.
R1-2100839; 3GPP TSG RAN WG1 #104-e; e-Meeting, Jan. 25-Feb. 5, 2021; Agenda Item: 8.2.4; Source: InterDigital, Inc.; Title: Discussions on beam management for new SCSs; Document for: Discussion and Decision.
R1-2100840; 3GPP TSG RAN WG1 #104-e; e-Meeting, Jan. 25-Feb. 5, 2021; Agenda Item: 8.2.5; Source: InterDigital, Inc.; Title: Discussions on PDSCH/PUSCH enhancements; Document for: Discussion and Decision.
R1-2100852; 3GPP TSG RAN WG1#104e; E-meeting, Jan. 25-Feb. 5, 2021; Agenda Item: 8.2.4; Source: Sony; Title: Beam management enhancement for NR from 52.6GHz to 71GHz; Document for: Discussion.
R1-2100853; 3GPP Tsg Ran WG1 #104-e; e-Meeting, Jan. 25-Feb. 5, 2021; Agenda Item: 8.2.5; Source: Sony; Title: PDSCH/PUSCH enhancements for NR from 52.6 GHz to 71 GHz; Document for: Discussion / Decision.
R1-2100895; 3GPP TSG RAN WG1 #104-e; e-Meeting, Jan. 25-Feb. 5, 2021; Agenda Item: 8.2.4; Source: LG Electronics; Title: Enhancements for beam management to support NR above 52.6 GHz; Document for: Discussion and decision.
R1-2100896; 3GPP TSG RAN WG1 #104-e; e-Meeting, Jan. 25-Feb. 5, 2021; Agenda Item: 8.2.5; Source: LG Electronics; Title: PDSCH/PUSCH enhancements to support NR above 52.6 GHz; Document for: Discussion and decision.
R1-2100940; 3GPP TSG RAN WG1 #104-e; e-Meeting, Jan. 25-Feb. 5, 2021; Source: NEC; Title: PDSCH enhancements on supporting NR from 52.6GHz to 71 GHZ; Agenda Item: 8.2.5; Document for: Discussion and Decision.

(56) References Cited

OTHER PUBLICATIONS

R1-2101111; 3GPP TSG RAN WG1 #104-e; e-Meeting, Jan. 25-Feb. 5, 2021; Agenda item: 8.2.4; Source: Xiaomi; Title: Discussion on beam management in NR from 52.6 GHz to 71GHZ; Document for: Discussion.
R1-2101112; 3GPP TSG RAN WG1 #104; e-Meeting, Jan. 25-Feb. 5, 2021; Agenda item: 8.2.5; Source: Xiaomi; Title: PDSCH/PUSCH for NR 52.6-71 GHZ; Document for: Discussion.
R1-2101197; 3GPP TSG RAN WG1 #104-e; e-Meeting, Jan. 25-Feb. 5, 2021; Agenda item: 8.2.4; Source: Samsung; Title: Beam management for new SCSs for NR from 52.6 GHz to 71 GHz; Document for: Discussion and Decision.
R1-2101198; 3GPP TSG RAN WG1 #104-e; e-Meeting, Jan. 25-Feb. 5, 2021; Agenda item: 8.2.5; Source: Samsung; Title: PDSCH/PUSCH enhancements for NR from 52.6 GHz to 71 GHZ; Document for: Discussion and Decision.
R1-2101309; 3GPP TSG-RAN WG1 Meeting #104-e; Online, Jan. 25-Feb. 5, 2021; Agenda Item: 8.2.4; Source: Ericsson; Title: Beam management for new SCSs; Document for: Discussion, Decision.
R1-2101310; 3GPP TSG-RAN WG1 Meeting #104-e; Online, Jan. 25-Feb. 5, 2021; Agenda Item: 8.2.5; Source: Ericsson; Title: PDSCH/PUSCH enhancements; Document for: Discussion, Decision.
R1-2101320; 3GPP TGS RAN WG1 #104-e; e-meeting, Jan. 25-Feb. 5, 2021; Source: CEWiT; Title: Enhancements on Reference signals for PDSCH/PUSCH for NR beyond 52.6 GHz; Agenda Item: 8.2.5; Document for: Discussion.
R1-2101330; 3GPP TSG-RAN WG1 Meeting #104-e; eMeeting, Jan. 25-Feb. 5, 2021; Agenda item: 8.2.5; Source: Charter Communications; Title: PDSCH-PUSCH Enhancement Aspects for NR beyond 52.6 GHz; Document for: Discussion.
R1-2101375; 3GPP TSG-RAN WG1 #104-e; e-Meeting, Jan. 25-Feb. 5, 2021; Source: Apple Inc.; Title: On beam management for new SCSs; Agenda item: 8.2.4; Document for: Discussion and Decision.
R1-2101376; 3GPP TSG Ran WG1 #104-e; e-Meeting, Jan. 25-Feb. 5, 2021; Agenda Item: 8.2.5; Source:Apple Inc.; Title: PDSCH/PUSCH enhancements for NR between 52.6GHz and 71 GHZ; Document for: Discussion/Decision.
R1-2101419; 3GPP TSG-RAN WG1 #104; e-Meeting, Jan. 25-Feb. 5, 2021; Agenda item: 8.2.4; Title: On Beam Management for Supporting NR from 52.6 GHz to 71 GHz; Source: Convida Wireless; Document for: Discussion.
R1-2101456; 3GPP TSG RAN WG1 Meeting #104-e; Jan. 25-Feb. 5, 2020; Agenda item: 8.2.4; Source: Qualcomm Incorporated; Title: Beam management for new SCSs; Document for: Discussion/Decision.
R1-2101457; 3GPP TSG-RAN WG1 #104-e; e-Meeting, Jan. 25-Feb. 5, 2021; Agenda item: 8.2.5; Source: Qualcomm Incorporated; Title: PDSCH and PUSCH enhancements for 52.6-71GHz band; Document for: Discussion/Decision.
Korean Office Action, mailed Feb. 20, 2024, in KR Patent Application No. 2023-7035416.
R1-1803271; 3GPP TSG RAN WG1 Meeting #92; Athens, Greece, Feb. 26-Mar. 2, 2018; Source: CATT; Title: Remaining issues on PT-RS; Agenda Item: 7.1.2.3.4; Document for: Discussion and Decision.
R1-2009480; 3GPP TSG RAN WG1 #103; e-Meeting, Oct. 26-Nov. 13, 2020; Agenda item: 8.1.2.1; Source: Moderator (Nokia, Nokia Shanghai Bell); Title: Summary of Multi-TRP URLLC for PUCCH and PUSCH; Document for: Discussion and Decision.

* cited by examiner

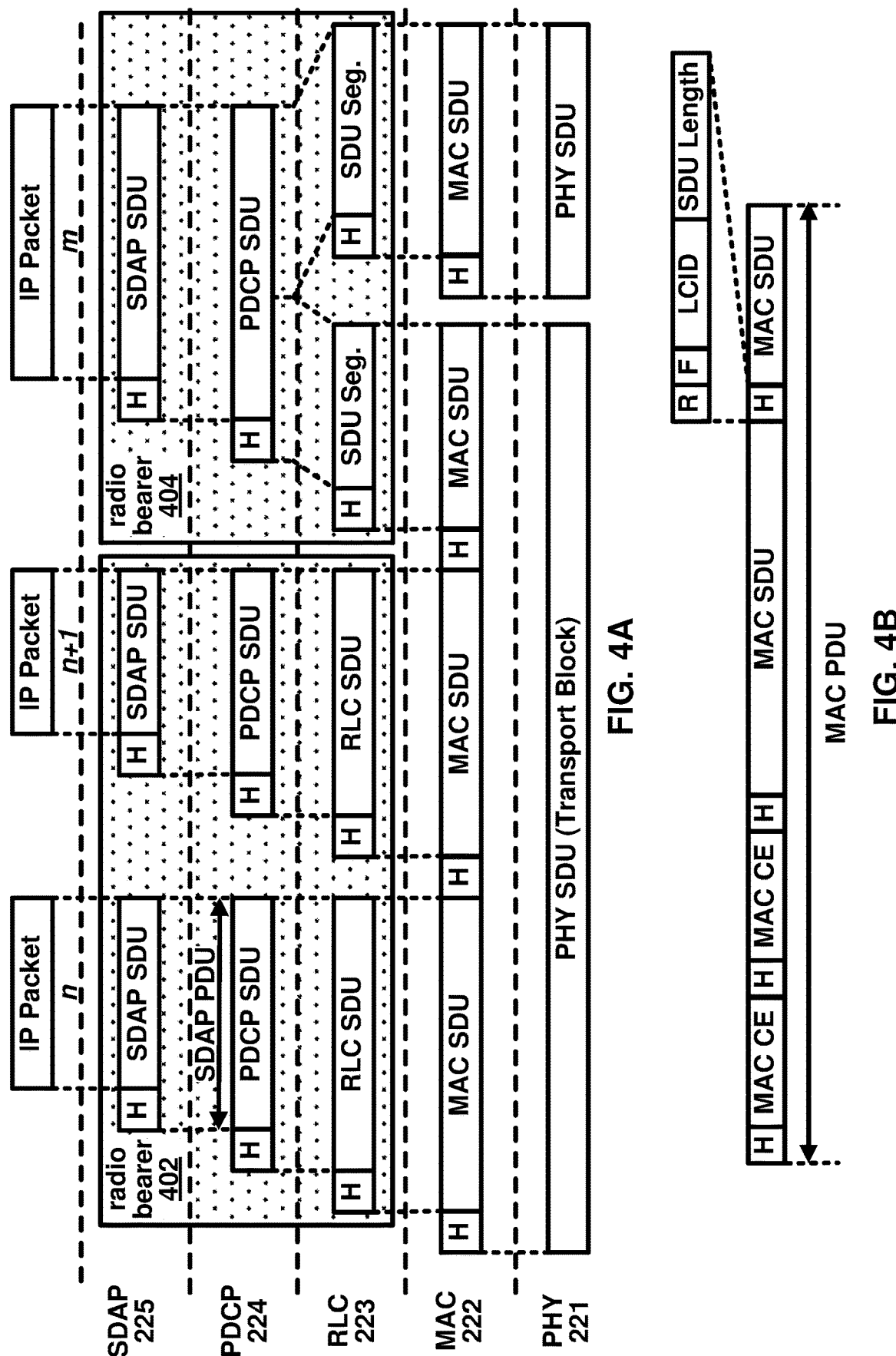

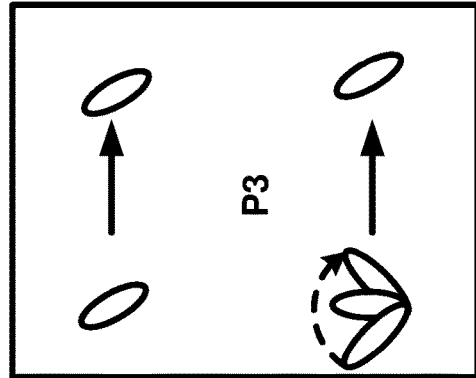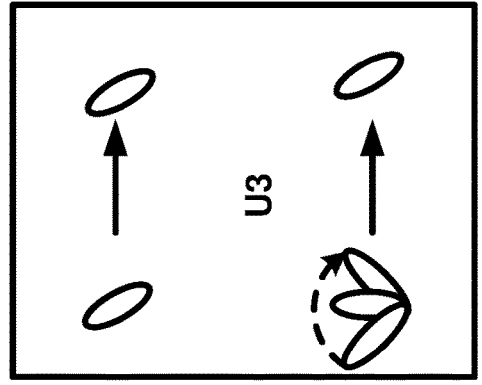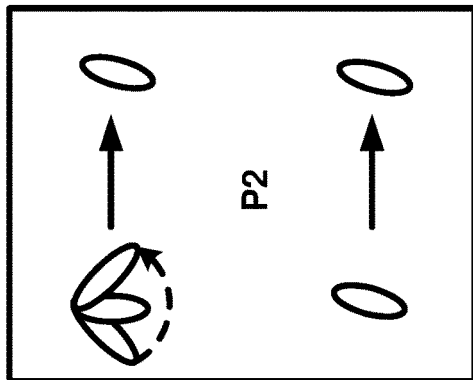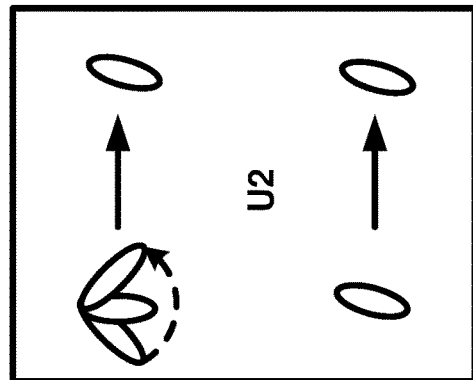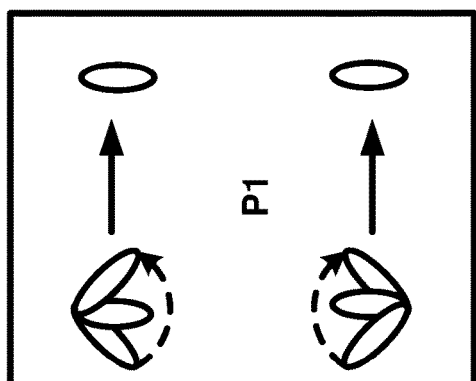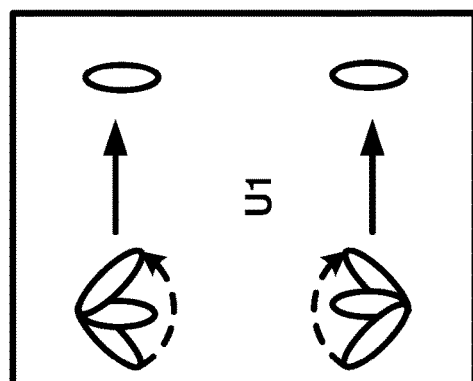
FIG. 12A
FIG. 12B

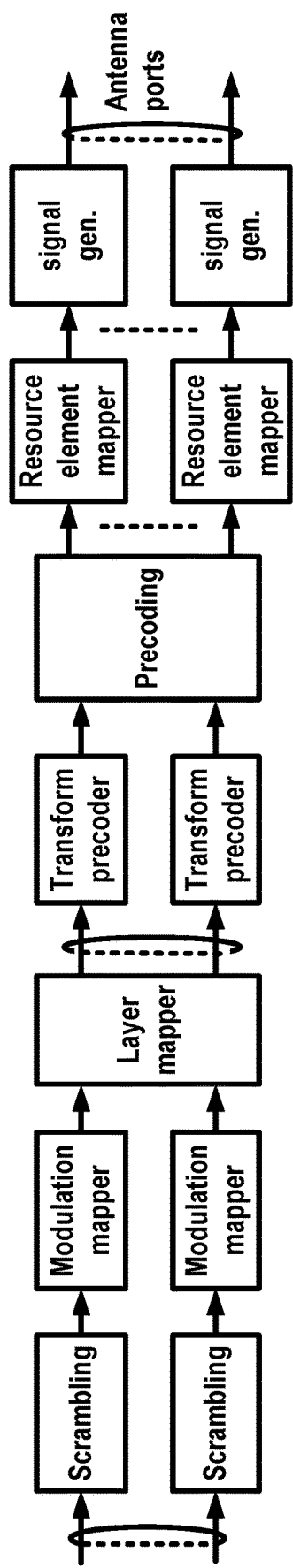
FIG. 16A
FIG. 16B
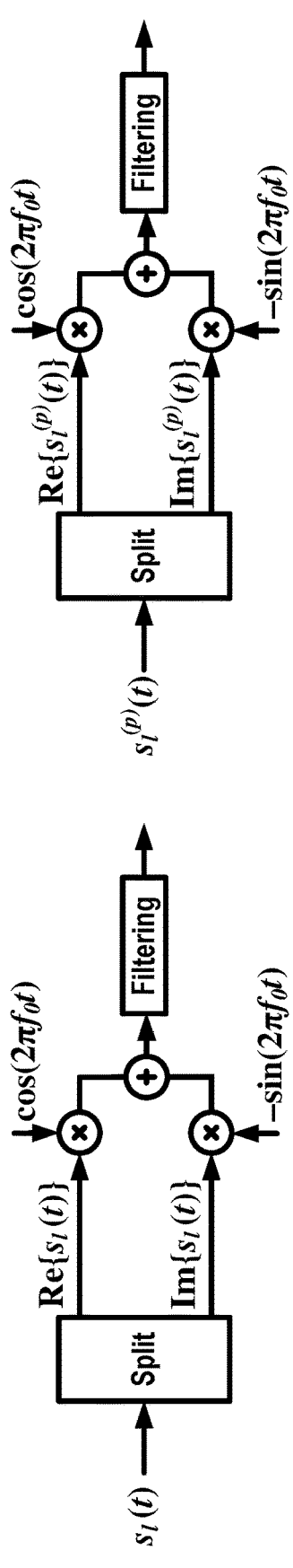
FIG. 16D
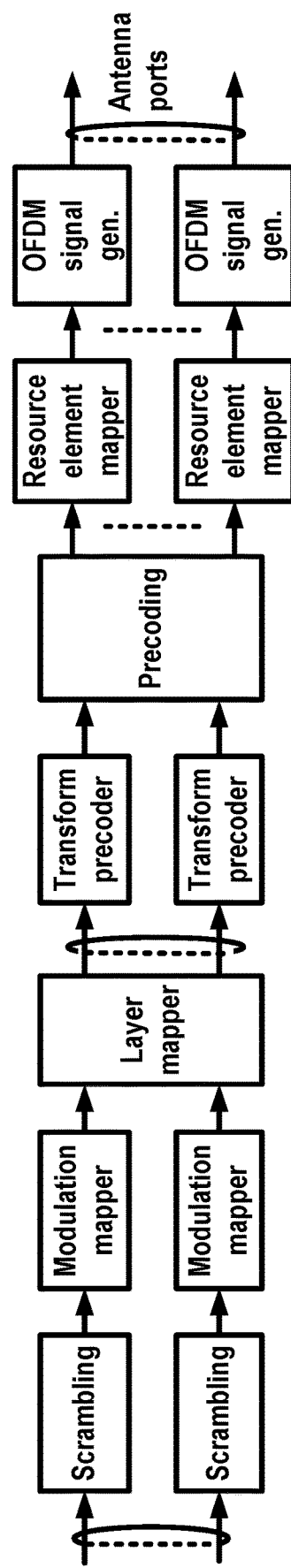
FIG. 16C

*PUSCH-Config* information element

```
PUSCH-Config ::=          SEQUENCE {
...
pusch-TimeDomainAllocationListForMultiPUSCH-r16  SetupRelease {
                             PUSCH- TimeDomainResourceAllocationList-r16 }}

PUSCH-TimeDomainResourceAllocationList ::= SEQUENCE (SIZE(1..maxNrofUL-Allocations))
                                              OF PUSCH-TimeDomainResourceAllocation PUSCH-TimeDomainResourceAllocation ::= SEQUENCE {
  k2                    INTEGER(0..32)
  puschAllocationList   SEQUENCE (SIZE(1..maxNrofMultiplePUSCHs)) OF PUSCH-Allocation}

PUSCH-Allocation ::= SEQUENCE {
  mappingType           ENUMERATED {typeA, typeB}
  startSymbolAndLength  INTEGER (0..127)
  startSymbol           INTEGER (0..13)
  length                INTEGER (1..14)
  numberOfRepetitions   ENUMERATED {n1, n2, n3, n4, n7, n8, n12, n16}}
```

FIG. 17

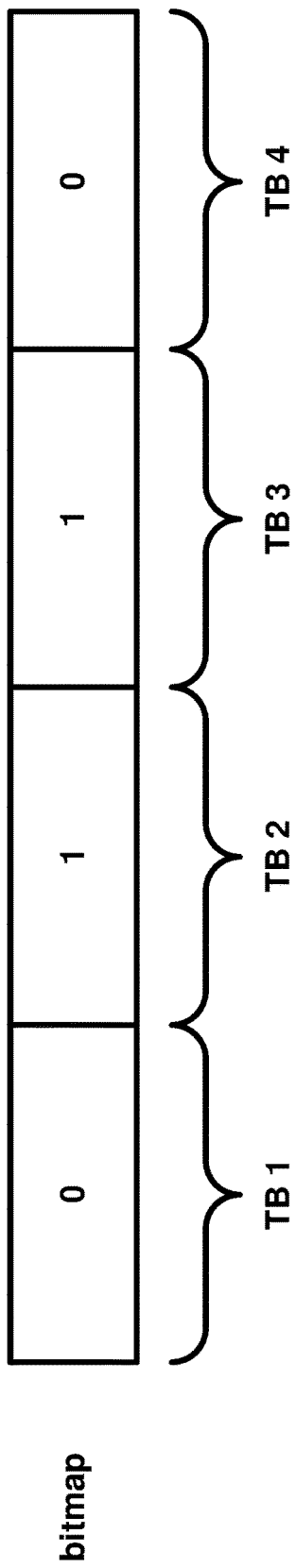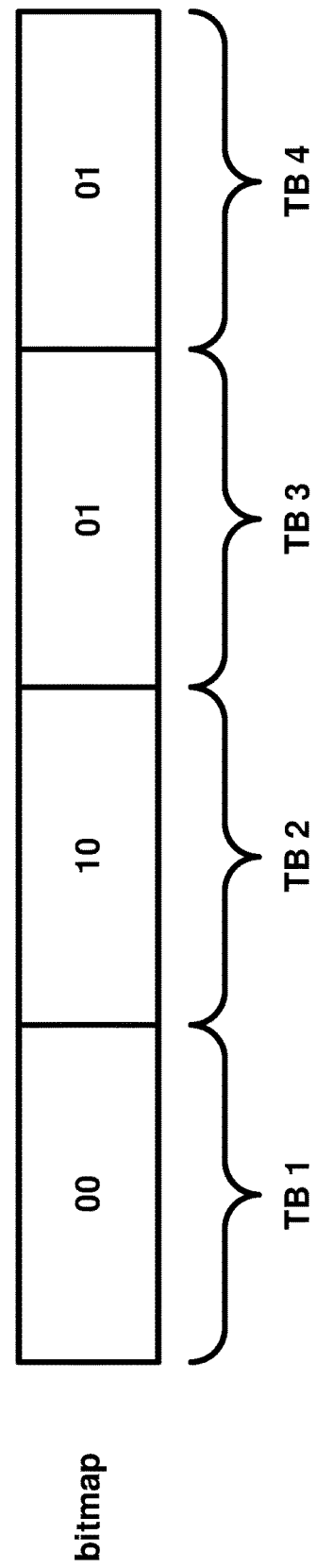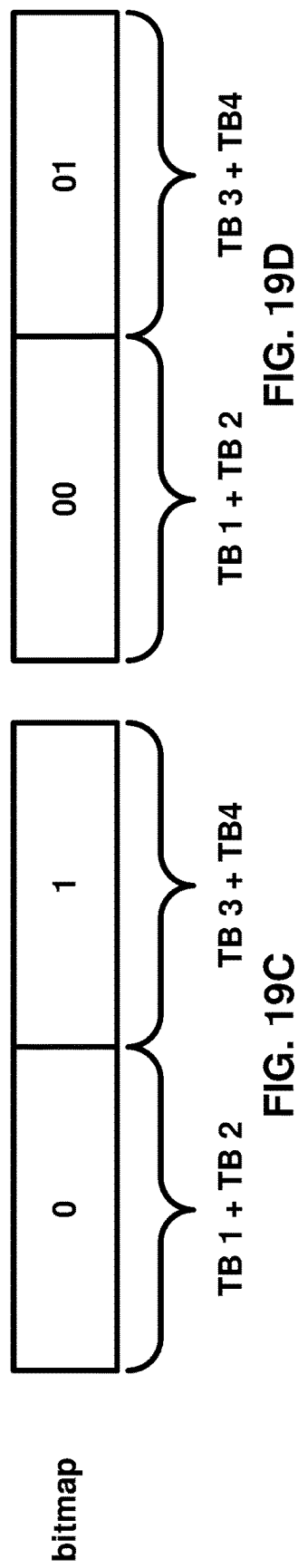

POWER CONTROL IN MULTIPLE DATA SCHEDULING

CROSS-REFERENCE TO RELATED APPLICATIONS

This application is a continuation of International Application No. PCT/US2022/021657, filed Mar. 24, 2022, which claims the benefit of U.S. Provisional Application No. 63/165,526, filed Mar. 24, 2021, which is hereby incorporated by reference in its entirety.

BRIEF DESCRIPTION OF THE DRAWINGS

Examples of several of the various embodiments of the present disclosure are described herein with reference to the drawings.

FIG. 4A illustrates an example downlink data flow through the NR user plane protocol stack of FIG. 2A.

FIG. 4B illustrates an example format of a MAC subheader in a MAC PDU.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 17 illustrates an example of configuration of time domain resource allocation table as per an aspect of an embodiment of the present disclosure.

FIG. 19A, FIG. 19B, FIG. 19C and FIG. 19D illustrate examples of a bitmap as per an aspect of an embodiment of the present disclosure.

DETAILED DESCRIPTION

Figure 1A:
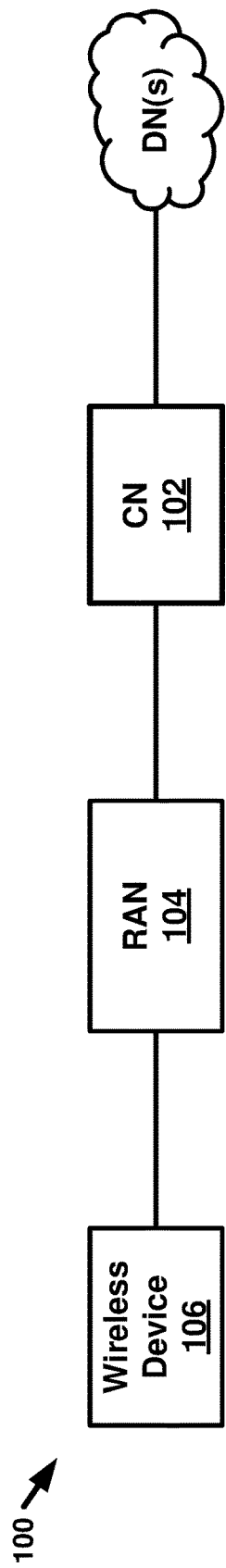
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
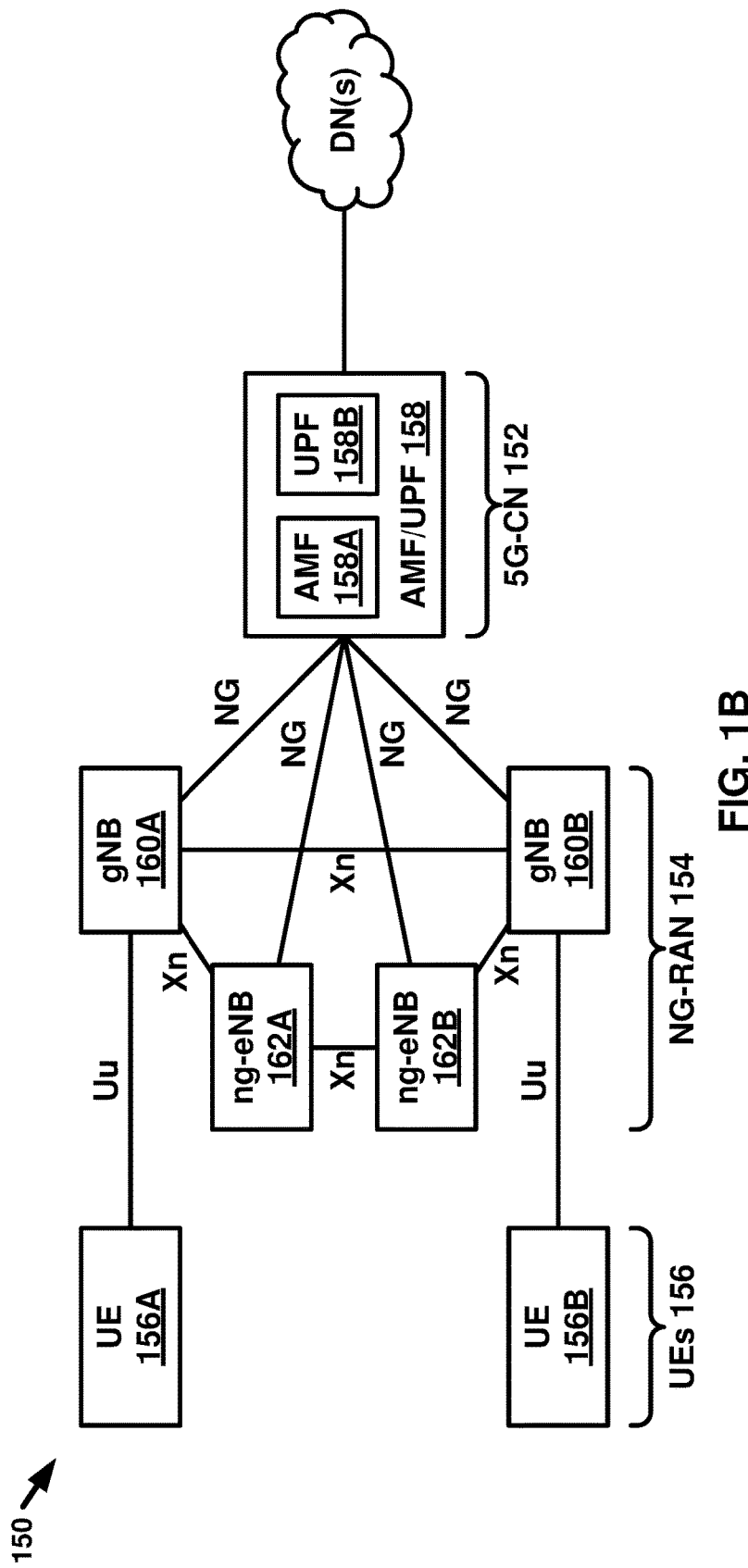

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
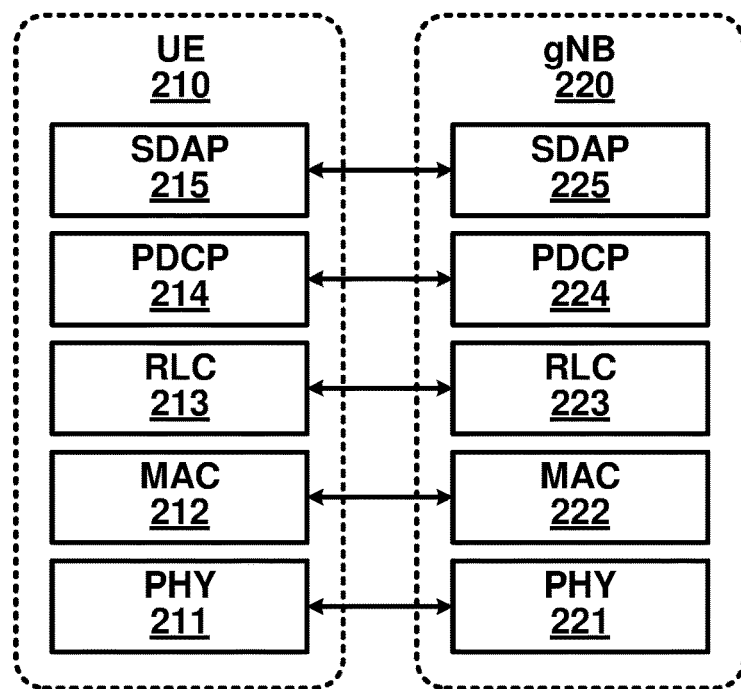
FIG. 2A and FIG. 2B respectively illustrate a New Radio (NR) user plane and control plane protocol stack.
Figure 2B:
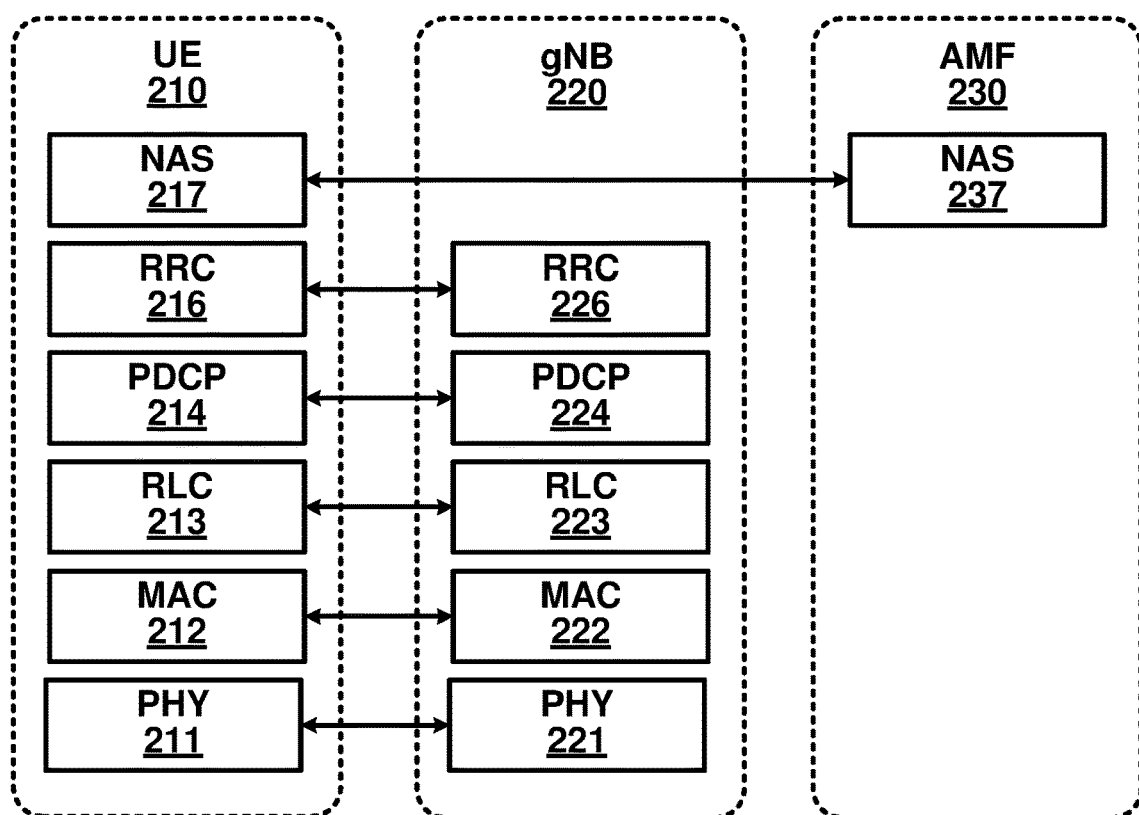

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
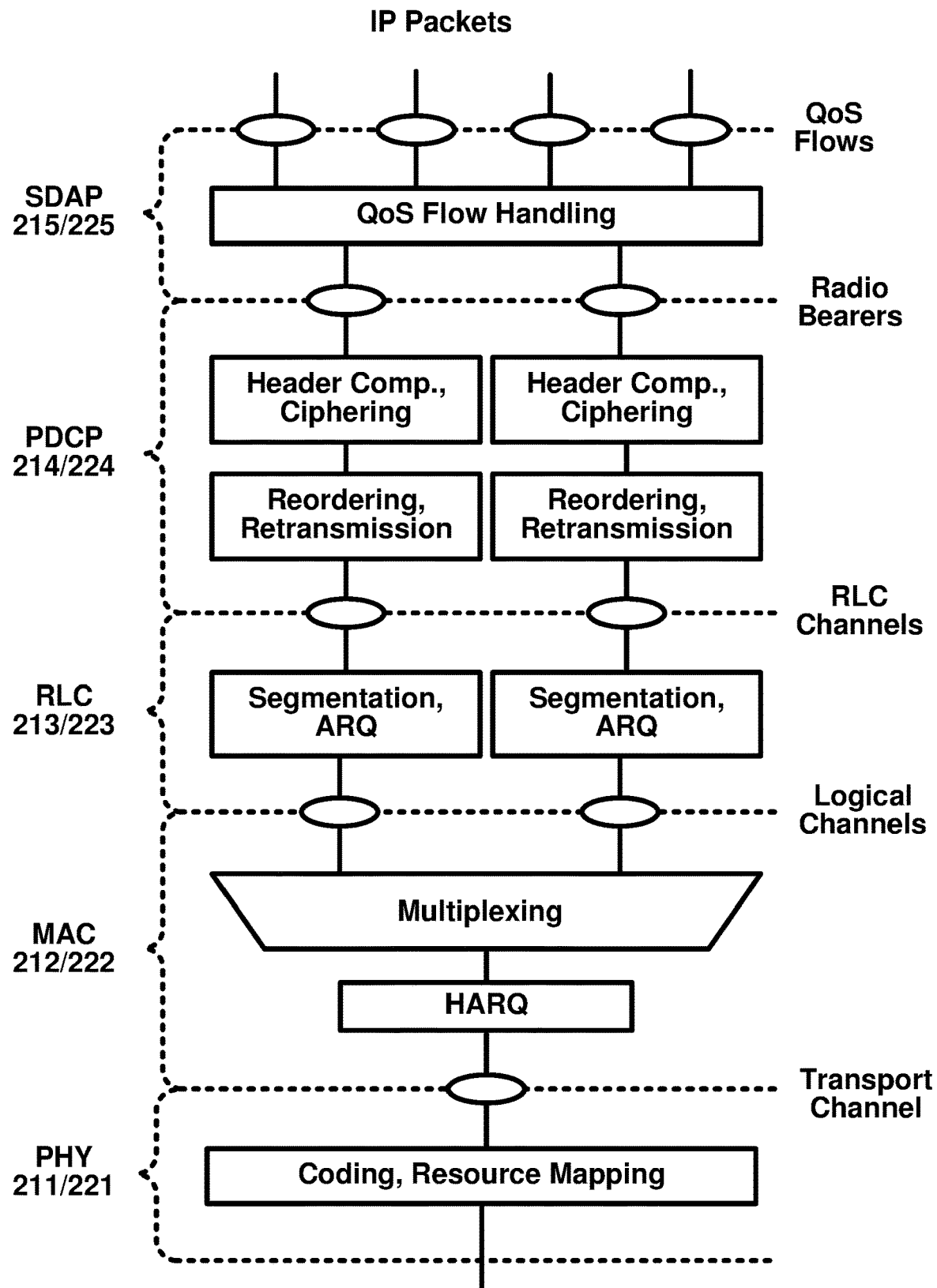
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
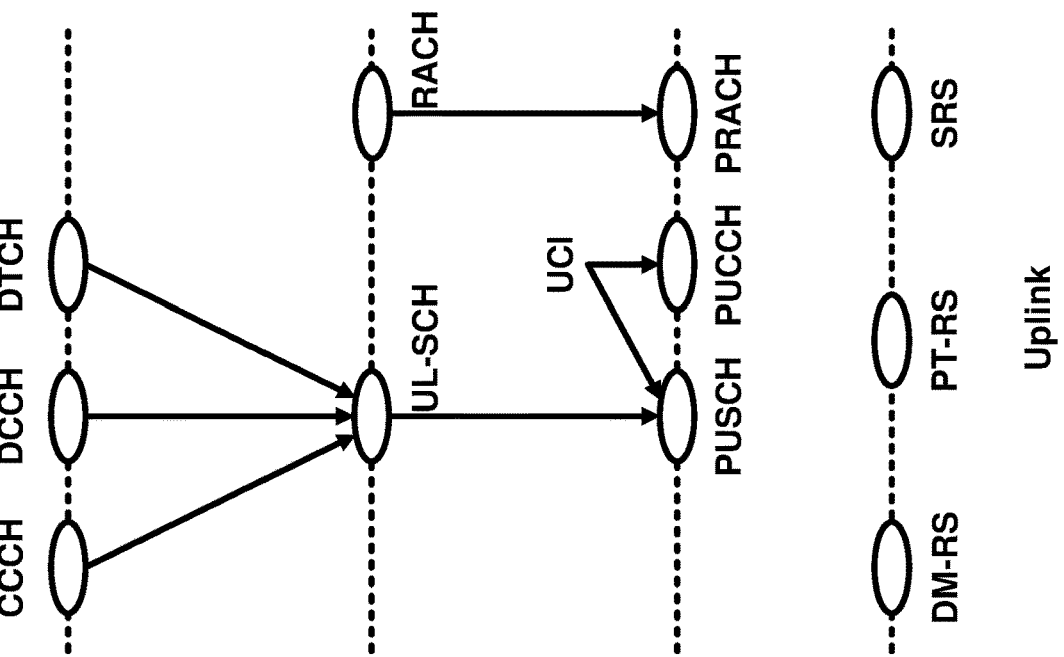
FIG. 5A and FIG. 5B respectively illustrate a mapping between logical channels, transport channels, and physical channels for the downlink and uplink.
Figure 5A:
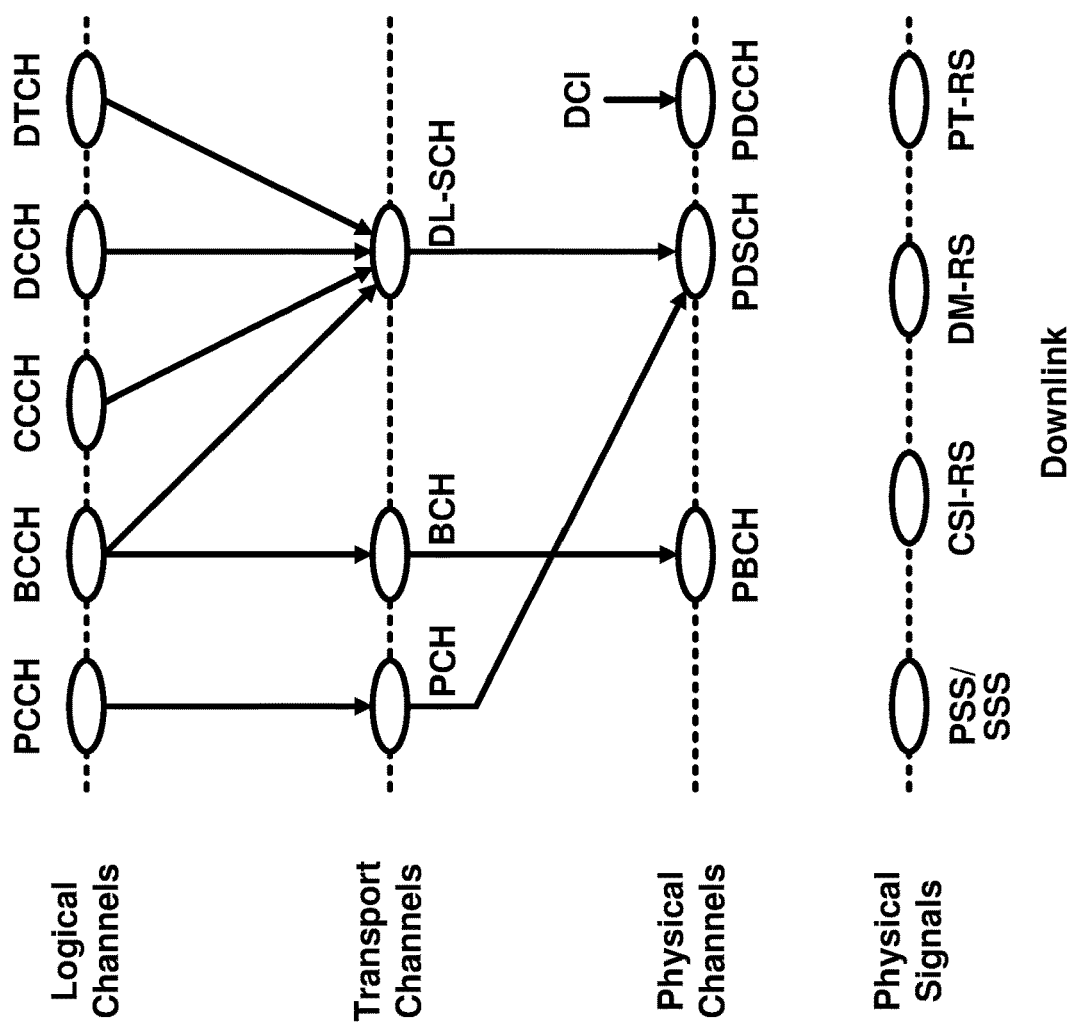

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;
a broadcast control channel (BCCH) for carrying system information messages in the form of a master information block (MIB) and several system information blocks (SIBs), wherein the system information messages may be used by the UEs to obtain information about how a cell is configured and how to operate within the cell;
a common control channel (CCCH) for carrying control messages together with random access;
a dedicated control channel (DCCH) for carrying control messages to/from a specific the UE to configure the UE; and
a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;
a broadcast channel (BCH) for carrying the MIB from the BCCH;
a downlink shared channel (DL-SCH) for carrying downlink data and signaling messages, including the SIBs from the BCCH;
an uplink shared channel (UL-SCH) for carrying uplink data and signaling messages; and
a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;
a physical downlink shared channel (PDSCH) for carrying downlink data and signaling messages from the DL-SCH, as well as paging messages from the PCH;
a physical downlink control channel (PDCCH) for carrying downlink control information (DCI), which may include downlink scheduling commands, uplink scheduling grants, and uplink power control commands;
a physical uplink shared channel (PUSCH) for carrying uplink data and signaling messages from the UL-SCH and in some instances uplink control information (UCI) as described below;
a physical uplink control channel (PUCCH) for carrying UCI, which may include HARQ acknowledgments, channel quality indicators (CQI), pre-coding matrix indicators (PMI), rank indicators (RI), and scheduling requests (SR); and
a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
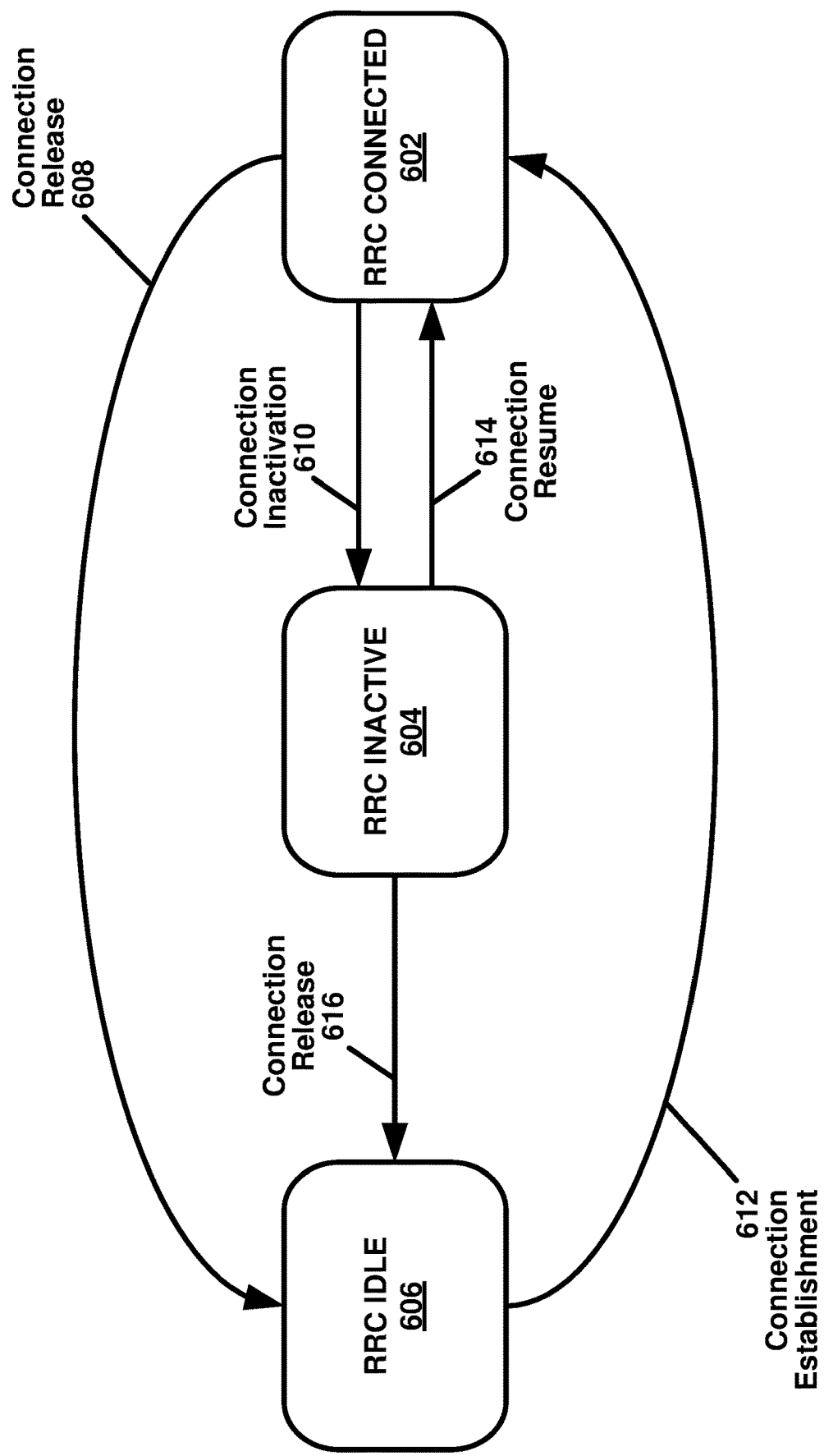
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
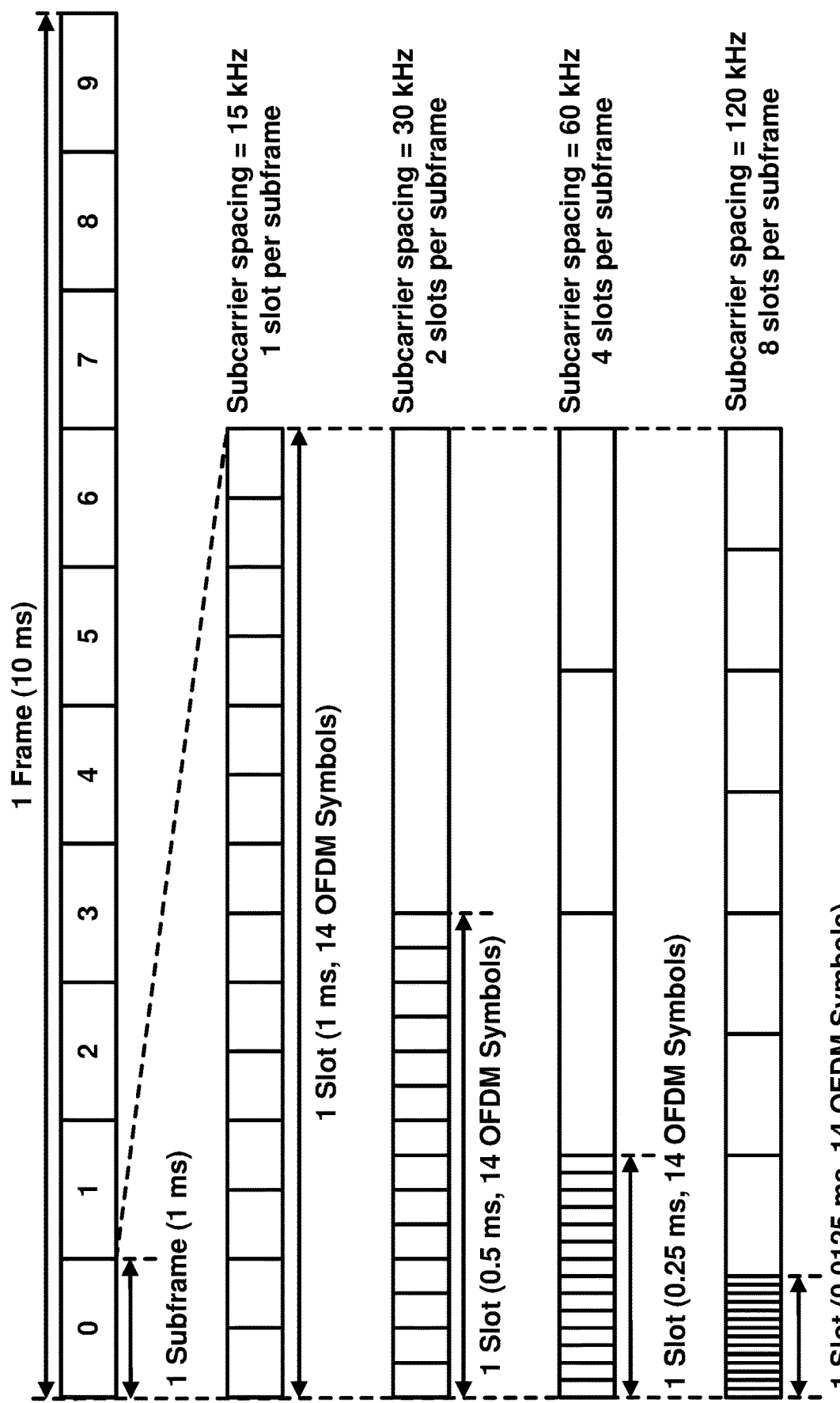
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 s. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
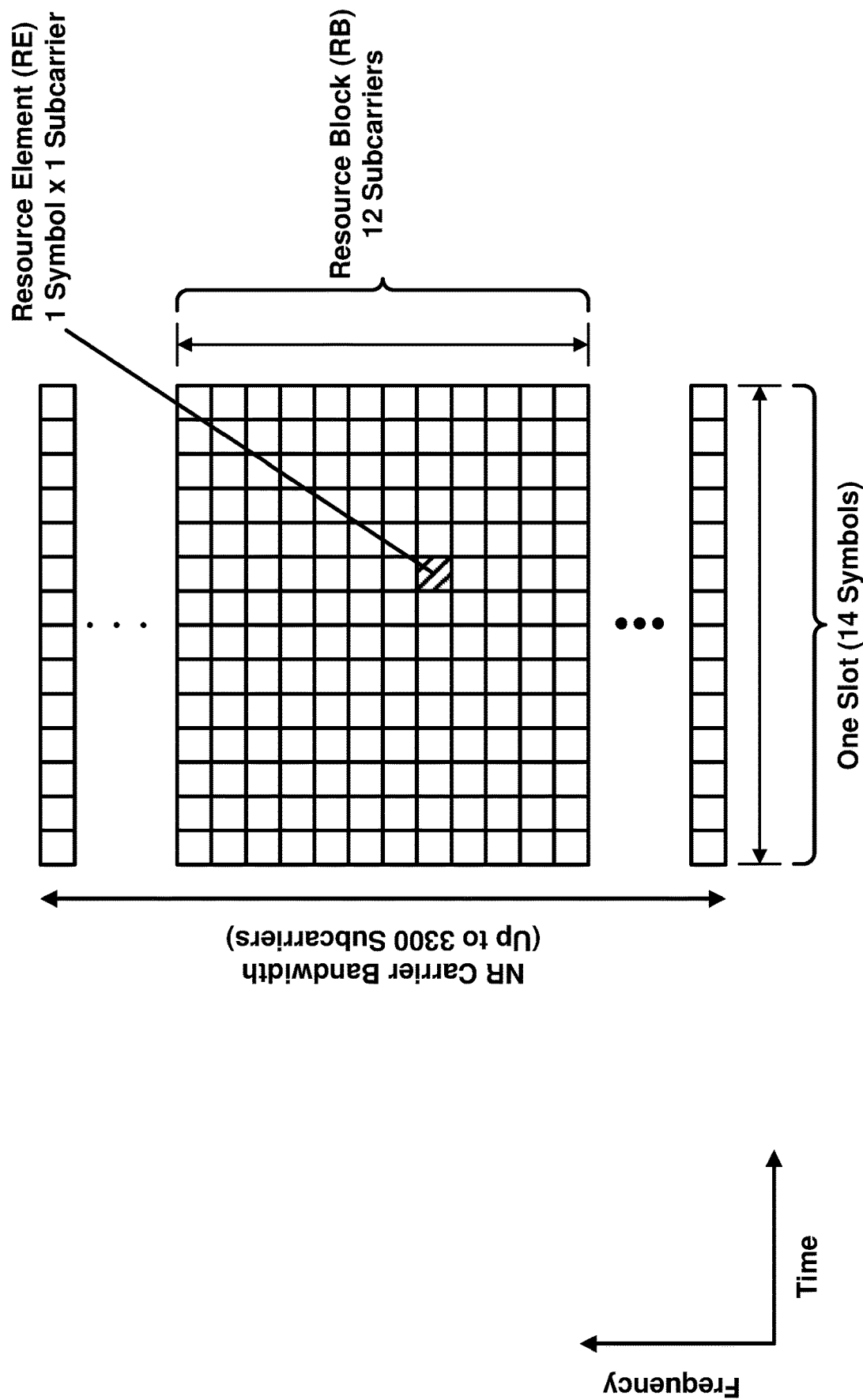
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
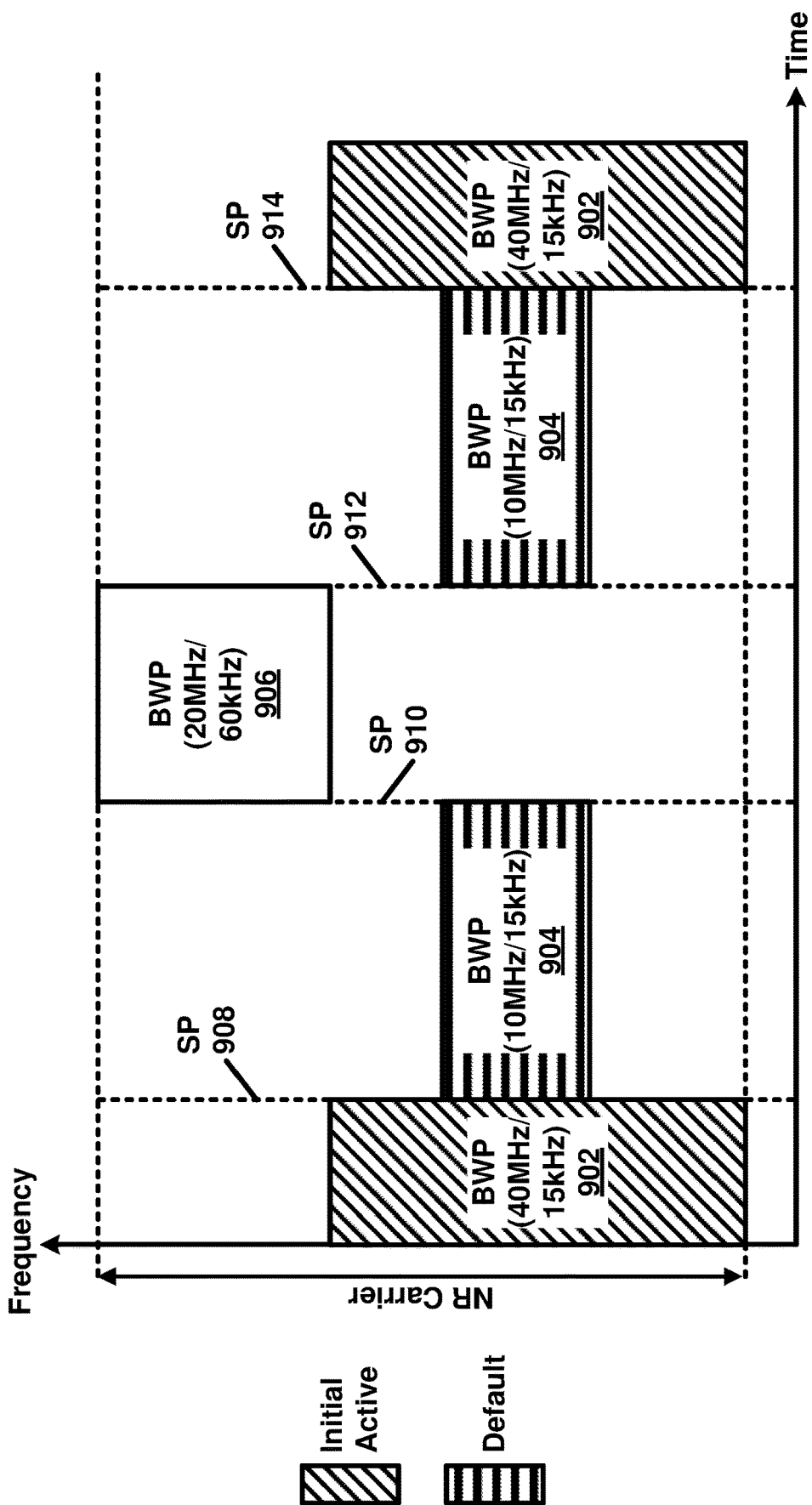
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
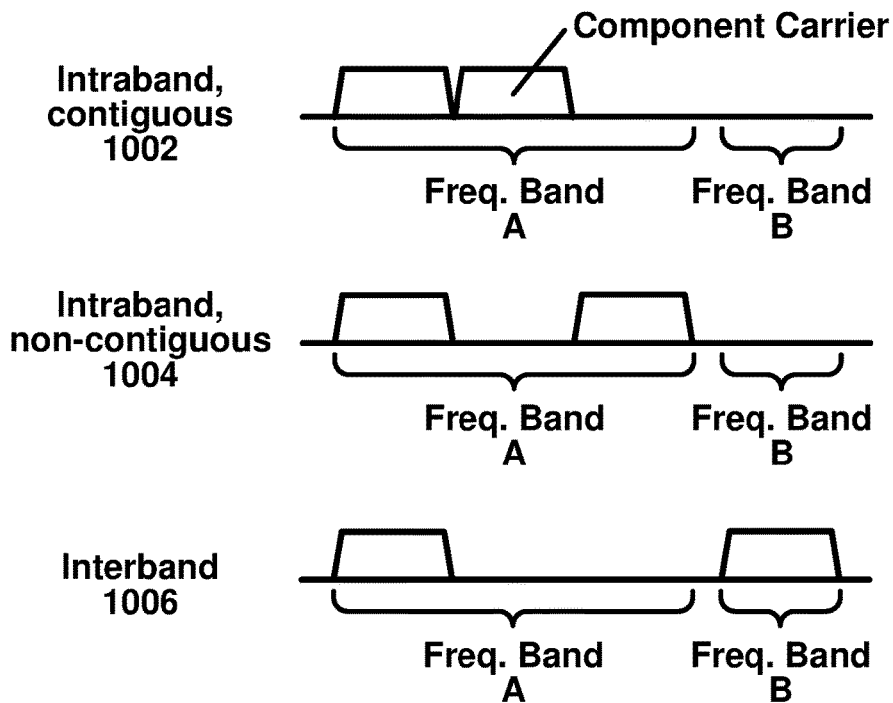
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
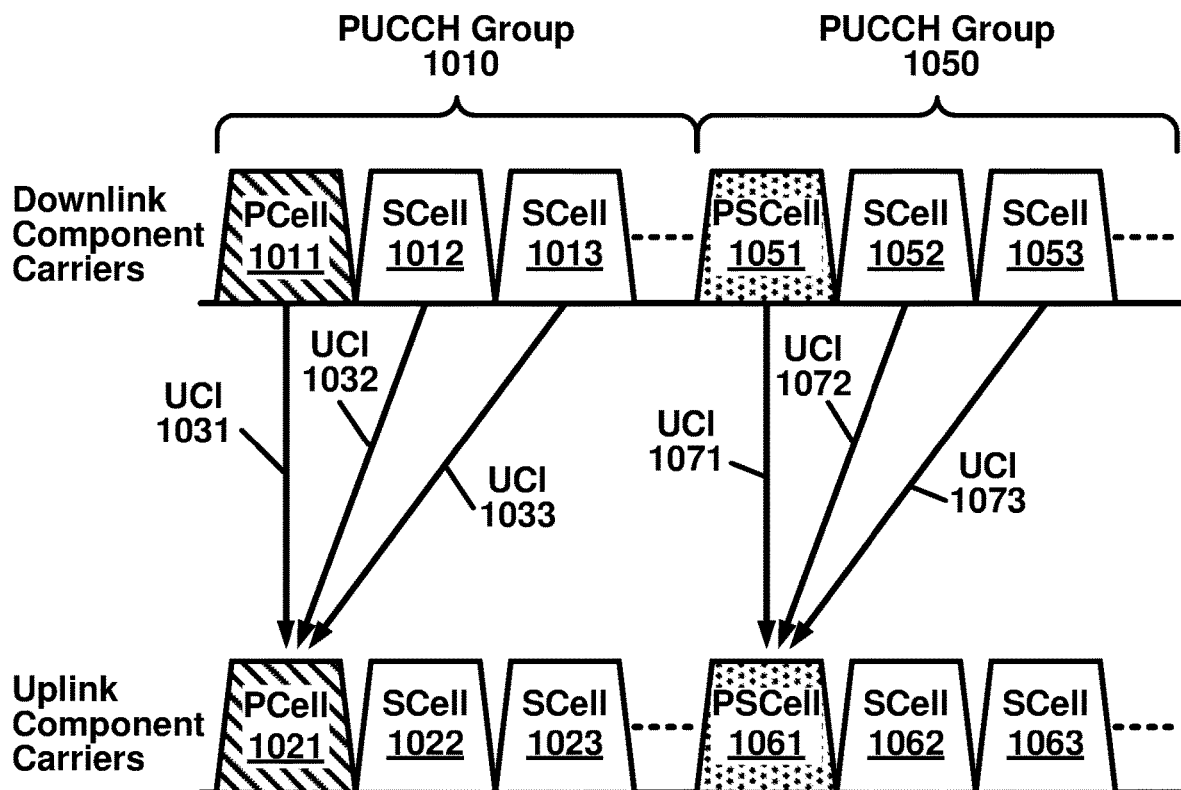
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
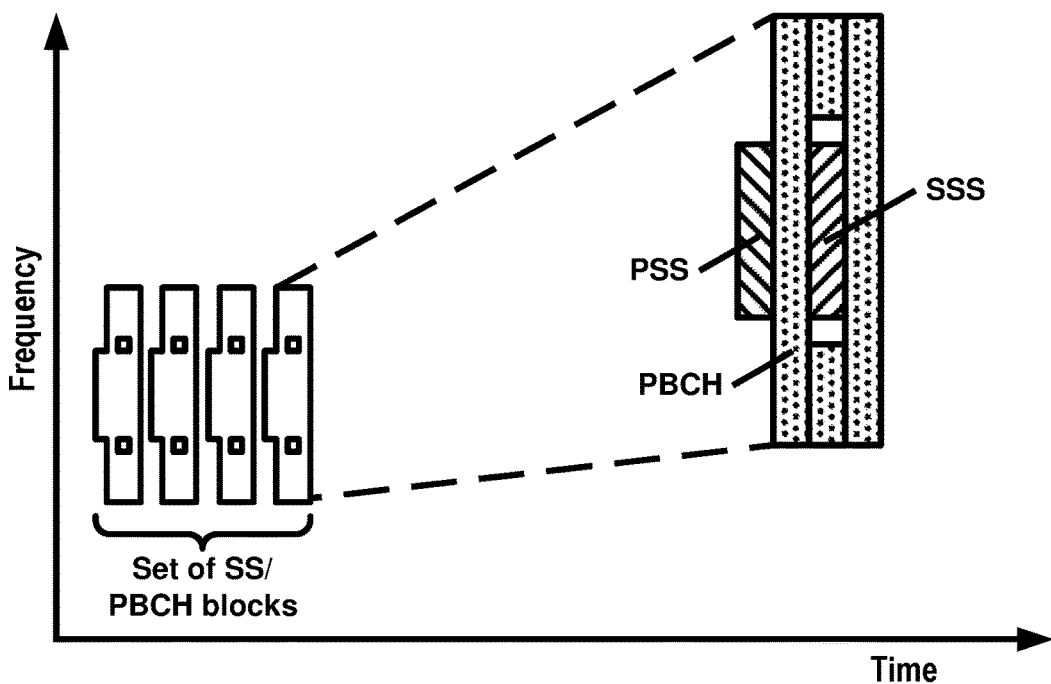
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM)

a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
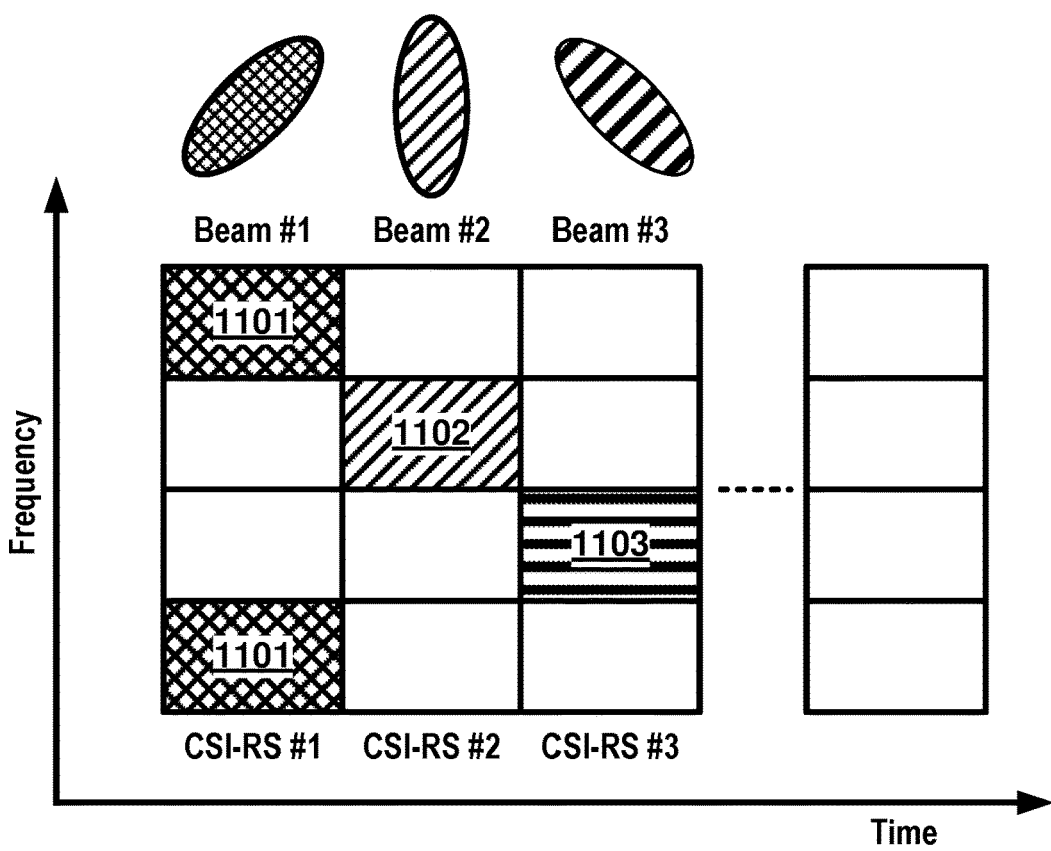
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
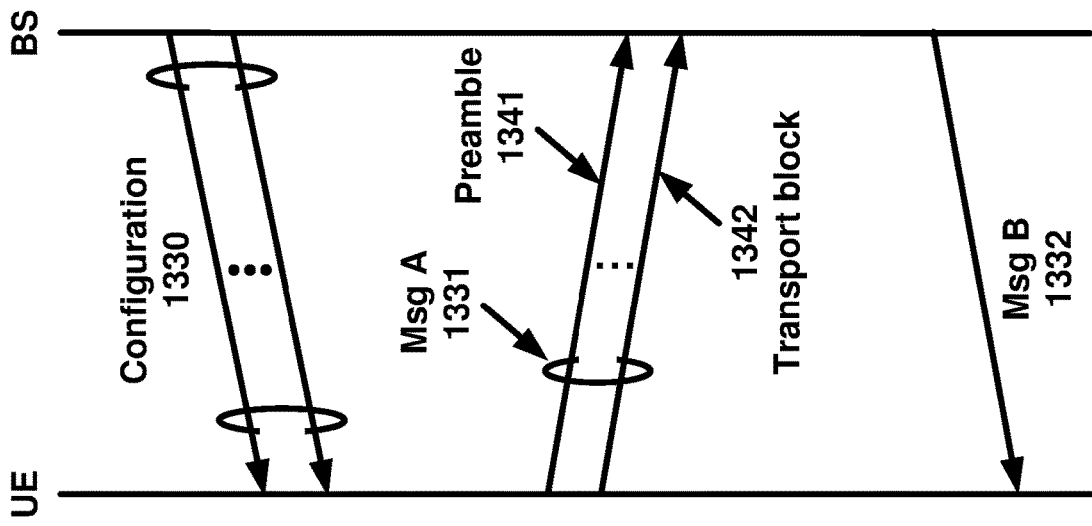
FIG. 13A, FIG. 13B, and FIG. 13C respectively illustrate a four-step contention-based random access procedure, a two-step contention-free random access procedure, and another two-step random access procedure.
Figure 13B:
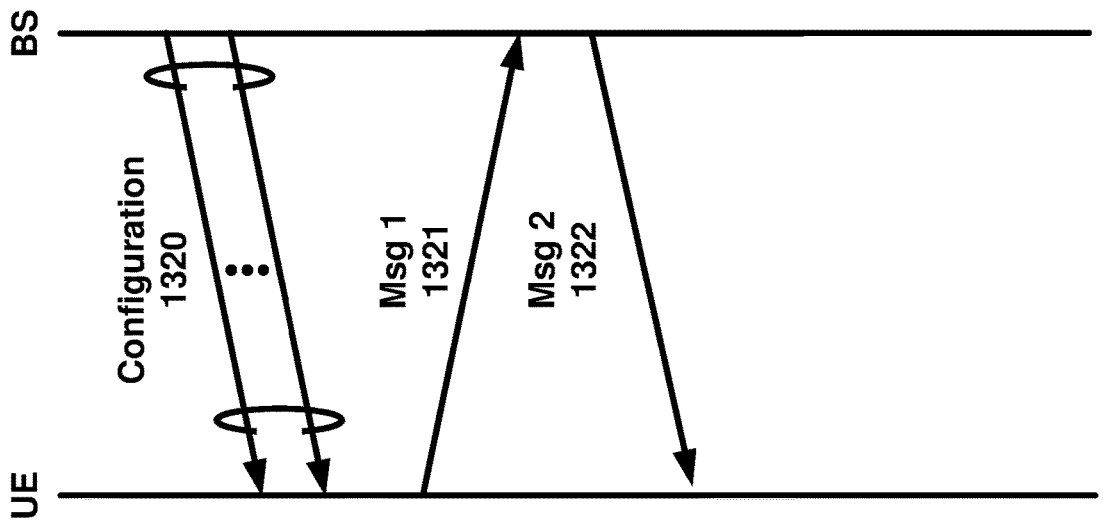
Figure 13A:
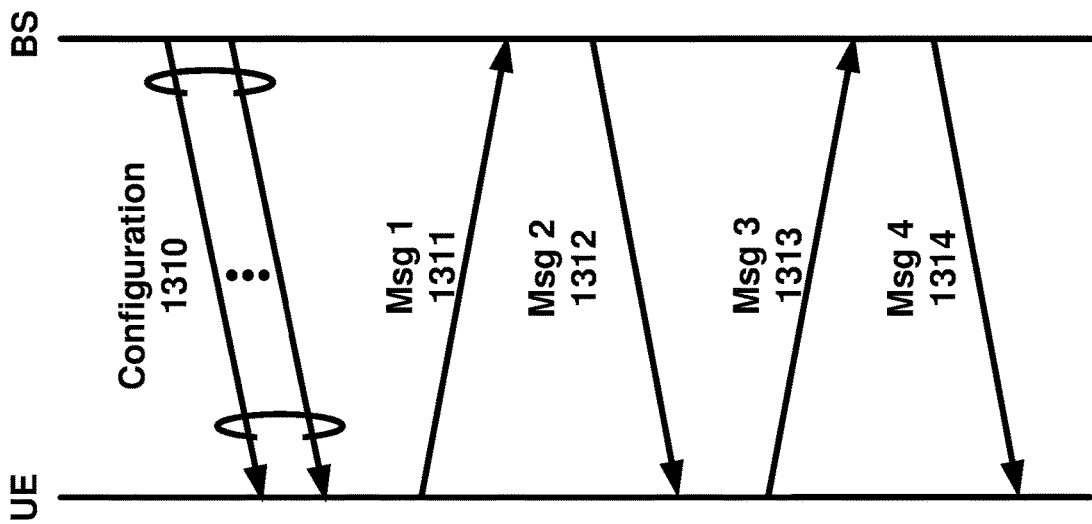

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI}=1+s\_id+14\times t\_id+14\times 80\times f\_id+14\times 80\times 8\times ul\_carrier\_id,$$

where s_id may be an index of a first OFDM symbol of the PRACH occasion (e.g., $0<s\_id<14$), t_id may be an index of a first slot of the PRACH occasion in a system frame (e.g., $0<t\_id<80$), f_id may be an index of the PRACH occasion in the frequency domain (e.g., $0<f\_id<8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 00 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
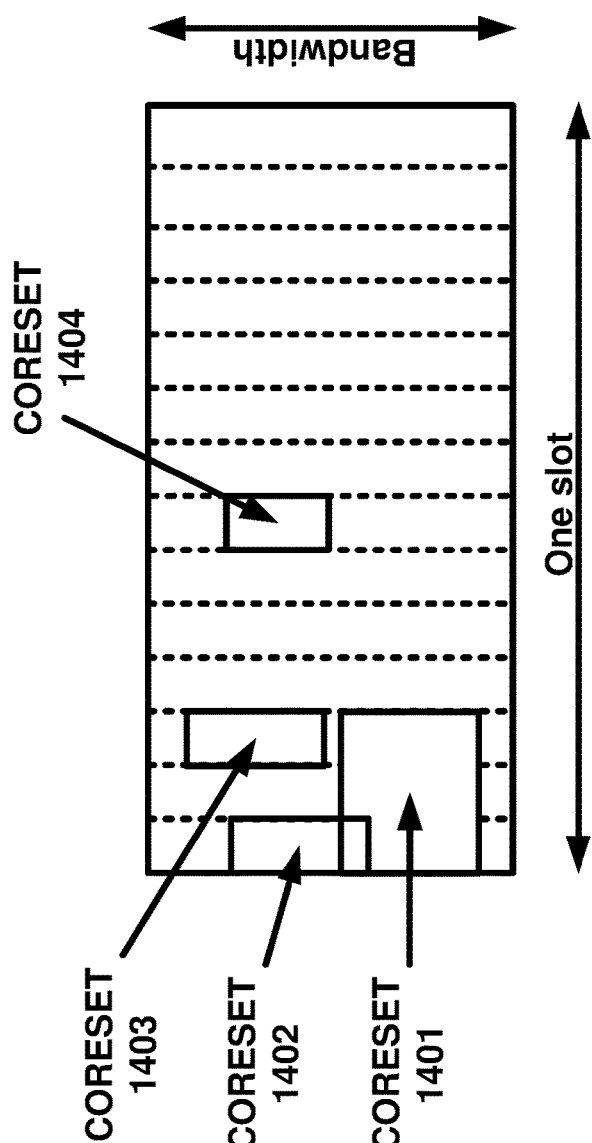
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
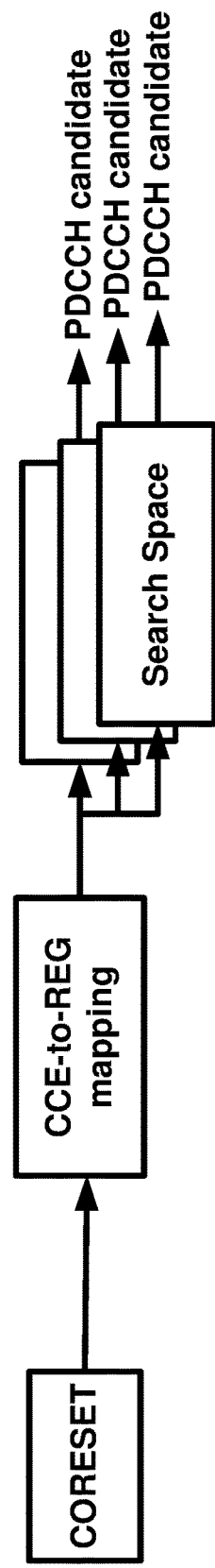
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
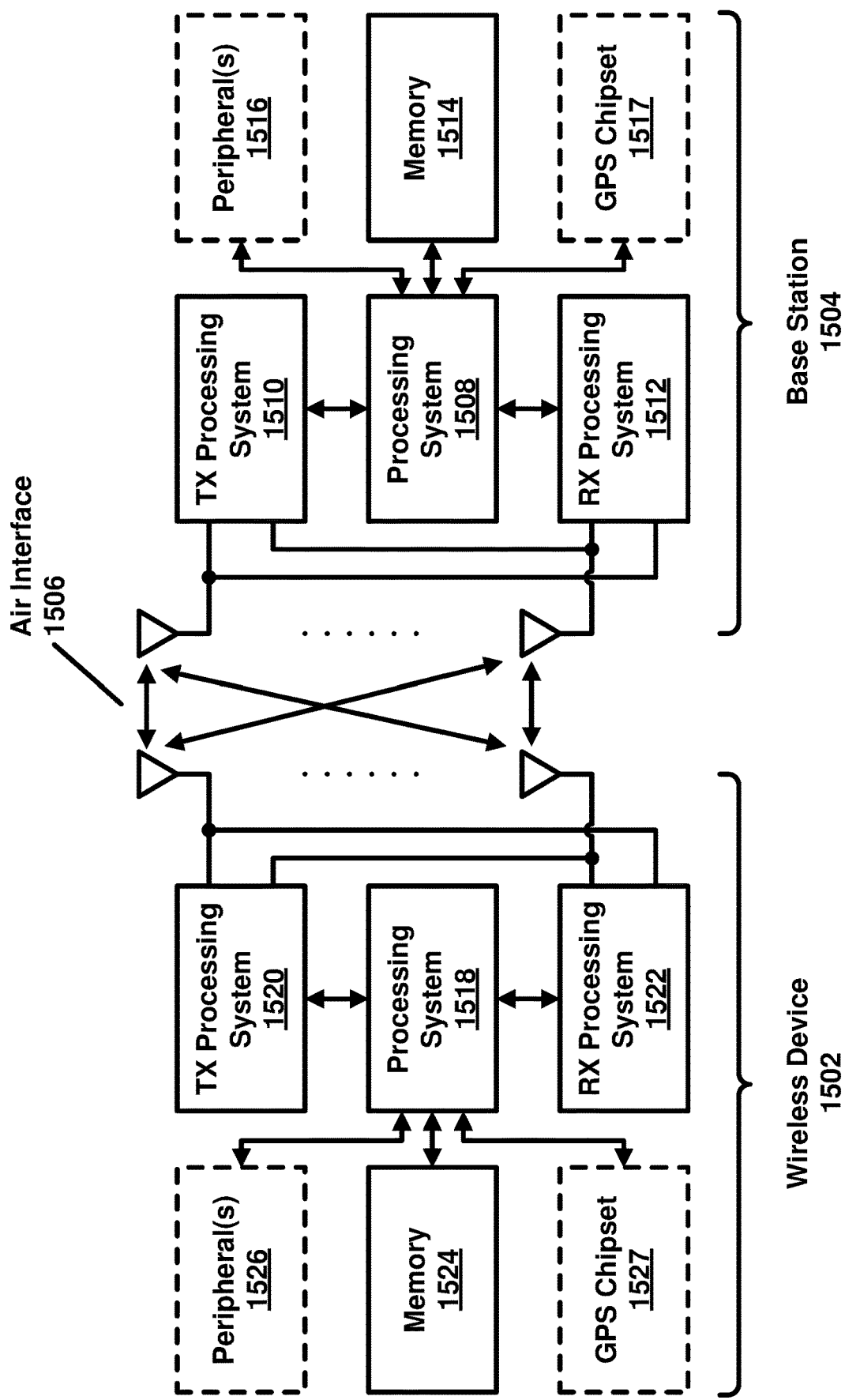
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A wireless device may receive, e.g., from a base station, a downlink control information (DCI). The DCI may schedule a plurality of transport blocks (e.g., PDSCH, PUSCH) for/on a cell.

The plurality of transport blocks may not be a repetition of a transport block. The DCI may not schedule a repetition of the plurality of transport blocks. Each transport block of the plurality of transport blocks may be different. The repetition of a transport block may increase robustness and/or coverage. Scheduling of the plurality of transport blocks may reduce signaling overhead and/or complexity of downlink control channel monitoring.

In an example, the cell may operate in a high frequency band (e.g., higher than 20 GHz, higher than 40 GHz, higher than 52 GHz, between 52 GHz and 71 GHz, higher than 71 GHz, and the like). As a slot duration may get shorter in the high frequency band (e.g., due to larger subcarrier spacings (e.g., 240 kHz, 480 kHz and 960 kHz, and the like), the existing per-slot level transport block (e.g., PDSCH/PUSCH) scheduling may lead to excessive CORESET/search space overheads and redundant UE power consumptions on blind detections of PDCCHs, for example, when the base station wants to schedule a plurality of transport blocks. Reduction of the slot duration in the high frequency band may result in increased complexity of PDCCH monitoring with a shorter slot duration. Scheduling the plurality of transport blocks with the (single) DCI may reduce PDCCH monitoring burden.

In an example, the cell may operate in an unlicensed band. Scheduling the plurality of transport blocks with the (single) DCI may reduce a number of performed listen-before-talk (LBT) procedure, for example at the base station, compared to scheduling the plurality of transport blocks with a plurality of DCIs.

In an example, the DCI may comprise a sounding reference signal resource indicator (SRI) field. The wireless device may transmit the plurality of transport blocks with a transmission power determined based on the SRI field. The wireless device may transmit each transport block of the plurality of transport blocks with the transmission power.

In an example, the DCI may comprise a transmit power control (TPC) field. The wireless device may transmit the plurality of transport blocks with a transmission power determined based on the TPC field. The wireless device may transmit each transport block of the plurality of transport blocks with the transmission power.

In an example, the DCI may comprise a transmitted precoding matrix indicator (TPMI) field. The wireless device may transmit the plurality of transport blocks with a transmission precoder determined based on the TPMI field. The wireless device may transmit each transport block of the plurality of transport blocks with the transmission precoder.

In an example, the DCI may comprise a phase tracking reference signals (PTRS)-DMRS field. The wireless device may transmit a PTRS on/in/over a DMRS port, of the plurality of transport blocks, indicated by the PTRS-DMRS field. The wireless device may transmit the PTRS on/in/over the DMRS port, of each transport block of the plurality of transport blocks, indicated by the PTRS-DMRS field.

In an example, the wireless device may be served by (e.g., transmit/receive to/from) a plurality of TRPs comprising a first TRP and a second TRP. The wireless device may transmit/receive the plurality of transport blocks to/from the plurality of TRPs. The wireless device may transmit/receive each transport block of the plurality of transport blocks to/from a respective TRP of the plurality of TRPs. The plurality of TRPs may receive/transmit the plurality of transport blocks. Each TRP of the plurality of TRPs may receive/transmit respective transport block(s) of the plurality of transport block.

The first TRP and the second TRP may not be co-located. The locations/directions of the first TRP and the second TRP may be different. The first TRP and the second TRP may be subject to different channel conditions (e.g., channel fading, distance, pathloss blockage, etc.). The DCI scheduling the plurality of transport blocks may indicate at least two fields (e.g., at least two SRI fields, at least two TPC fields, at least two TPMI fields, at least two PTRS-DMRS fields, and the like). In the implementation of the existing technologies, the wireless device may not know which of the plurality of transport blocks to transmit based on a first field (or a second field) of the at least two fields of the DCI. Receiving/transmitting a transport block of the plurality transport blocks based on misaligned fields (e.g., SRI fields, TPC fields, TPMI fields, PTRS-DMRS fields) may result in increased error rate, reduced data rate, increased retransmissions, and/or increased power consumption.

Example embodiments may reduce misalignment on the field when a wireless device receives a DCI i) scheduling a plurality of transport blocks (e.g., PDSCH, PUSCH) and comprises at least two fields (e.g., at least two SRI fields, at least two TPC fields, at least two TPMI fields, at least two PTRS-DMRS fields, and the like). In an example, the DCI may comprise a bitmap field indicating which of the plurality of transport blocks to receive based on a first field (or a second field) of the at least two fields. In an example, the wireless device may receive one or more messages comprising one or more configuration parameters indicating a bitmap field indicating which of the plurality of transport blocks to receive based on a first field (or a second field) of the at least two fields. A TDRA field may, for example, comprise the bitmap field. For example, when a bit, in the bitmap field, corresponding to a transport block of the plurality of transport blocks is equal to zero/one, the wireless device may transmit/receive the transport block based on a first/second field of the at least two fields. In an example embodiment, the wireless device may receive/transmit the first N transport block(s) of the plurality of transport blocks based on the first field and the second N transport block(s) of the plurality of transport blocks based on the second field. This pattern may continue, if any, in the remaining transport block(s) of the plurality of transport blocks (e.g., sequential beam mapping). For example, the DCI may indicate a value of N (e.g., N=2, 3, 4, 5, 8, and the like). The DCI may comprise a field (e.g., TDRA, TCI) indicating the value of N. For example, the wireless device may receive one or more messages comprising one or more configuration parameters indicating a value of N.

Implementation of the example embodiments may result in reduced error rate, increased data rate, reduced retransmissions, and/or reduced power consumption.

In an example, a wireless device may receive one or more messages. In an example, the wireless device may receive the one or more messages from a base station. The one or more messages may comprise one or more configuration parameters. In an example, the one or more configuration parameters may be RRC configuration parameter(s). In an example, the one or more configuration parameters may be RRC reconfiguration parameter(s).

In an example, the one or more configuration parameters may be for one or more cells.

The one or more cells may comprise a cell. In an example, at least one configuration parameter of the one or more configuration parameters may be for a cell. In an example, the cell may be a primary cell (PCell). In an example, the cell may be a secondary cell (SCell). The cell may be a secondary cell configured with PUCCH (e.g., PUCCH SCell). In an example, the cell may be an unlicensed cell, e.g., operating in an unlicensed band. In an example, the cell may be a licensed cell, e.g., operating in a licensed band. In an example, the cell may operate in a first frequency range (FR1). The FR1 may, for example, comprise frequency bands below 6 GHz. In an example, the cell may operate in a second frequency range (FR2). The FR2 may, for example, comprise frequency bands from 24 GHz to 52.6 GHz. In an example, the cell may operate in a third frequency range (FR3). The FR3 may, for example, comprise frequency bands from 52.6 GHz to 71 GHz. The FR3 may, for example, comprise frequency bands starting from 52.6 GHz.

In an example, the wireless device may perform uplink transmissions (e.g., PUSCH, PUCCH, SRS) via the cell in a first time and in a first frequency. The wireless device may perform downlink receptions (e.g., PDCCH, PDSCH) via the cell in a second time and in a second frequency. In an example, the cell may operate in a time-division duplex (TDD) mode. In the TDD mode, the first frequency and the second frequency may be the same. In the TDD mode, the first time and the second time may be different. In an example, the cell may operate in a frequency-division duplex (FDD) mode. In the FDD mode, the first frequency and the second frequency may be different. In the FDD mode, the first time and the second time may be the same.

In an example, the wireless device may be in an RRC connected mode. In an example, the wireless device may be in an RRC idle mode. In an example, the wireless device may be in an RRC inactive mode.

In an example, the cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

In an example, a BWP of the plurality of BWPs may be in one of an active state and an inactive state. In an example, in the active state of a downlink BWP of the one or more downlink BWPs, the wireless device may monitor a downlink channel/signal (e.g., PDCCH, DCI, CSI-RS, PDSCH) on/for/via the downlink BWP. In an example, in the active state of a downlink BWP of the one or more downlink BWPs, the wireless device may receive a PDSCH on/via/for the downlink BWP. In an example, in the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In an example, in the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

In an example, in the active state of an uplink BWP of the one or more uplink BWPs, the wireless device may transmit an uplink signal/channel (e.g., PUCCH, preamble, PUSCH, PRACH, SRS, etc) on/via the uplink BWP. In an example, in the inactive state of an uplink BWP of the one or more uplink BWPs, the wireless device may not transmit an uplink signal/channel (e.g., PUCCH, preamble, PUSCH, PRACH, SRS, etc) on/via the uplink BWP.

In an example, the wireless device may activate the downlink BWP of the one or more downlink BWPs of the cell. In an example, the activating the downlink BWP may comprise that the wireless device sets (or switches to) the downlink BWP as an active downlink BWP of the cell. In an example, the activating the downlink BWP may comprise that the wireless device sets the downlink BWP in the active state. In an example, the activating the downlink BWP may comprise switching the downlink BWP from the inactive state to the active state.

In an example, the wireless device may activate the uplink BWP of the one or more uplink BWPs of the cell. In an example, the activating the uplink BWP may comprise that the wireless device sets (or switches to) the uplink BWP as an active uplink BWP of the cell. In an example, the activating the uplink BWP may comprise that the wireless device sets the uplink BWP in the active state. In an example, the activating the uplink BWP may comprise switching the uplink BWP from the inactive state to the active state.

In an example, the one or more configuration parameters may be for the (active) downlink BWP of the cell. In an example, at least one configuration parameter of the one or more configuration parameters may be for the downlink BWP of the cell.

In an example, the one or more configuration parameters may be for the (active) uplink BWP of the cell. In an example, at least one configuration parameter of the one or more configuration parameters may be for the uplink BWP of the cell.

The one or more configuration parameters may indicate a subcarrier spacing (or a numerology) for the downlink BWP.

The one or more configuration parameters may indicate a subcarrier spacing (or a numerology) for the uplink BWP.

A value of the subcarrier spacing (of the downlink BWP and/or the uplink BWP) may be/indicate, for example, 15 kHz (=0). A value of the subcarrier spacing may be/indicate, for example, 30 kHz (=1). A value of the subcarrier spacing may be/indicate, for example, 60 kHz (=2). A value of the subcarrier spacing may be/indicate, for example, 120 kHz (=3). A value of the subcarrier spacing may be/indicate, for example, 240 kHz (=4). A value of the subcarrier spacing may be/indicate, for example, 480 kHz (=5). A value of the subcarrier spacing may be/indicate, for example, 960 kHz (=6). For example, 480 kHz may be valid/applicable in FR3. For example, 960 kHz may be valid/applicable in FR3. For example, 240 kHz may be valid/applicable in FR3. For example, 120 kHz may be valid/applicable in FR3.

FIG. 17 illustrates an example of configuration of time domain resource allocation table as per an aspect of an embodiment of the present disclosure.

The one or more configuration parameters may indicate/comprise a list/table of time domain resource allocation (e.g., pusch-TimeDomainAllocationListForMultiPUSCH, pdsch-TimeDomainAllocationListForMultiPDSCH). The list/table of time domain resource allocation (e.g., TDRA table) may comprise one or more rows (or one or more time domain resource allocations (TDRAs) (e.g., PUSCH-TimeDomainResourceAllocation, PDSCH-TimeDomainResourceAllocation).

Each row of the one or more rows (or each TDRA of the one or more TDRAs) may indicate a respective number of scheduled transport block(s). A row of the one or more rows (or a TDRA of the one or more TDRAs) may indicate a number of scheduled transport block(s) (e.g., scheduled PDSCH receptions/transmissions, scheduled PUSCH transmissions, etc.). For example, in FIG. 17, a size/length of puschAllocationList may indicate (or be equal to) a number of scheduled transport block(s). A maximum value of the number of scheduled transport block(s) may be equal to a max value (e.g., 4, 8, 16, 32, and the like). The one or more configuration parameters may indicate the max value (e.g., maxNrofMultiplePUSCHs, maxNrofMultiplePDSCHs).

Each row of the one or more rows (or each TDRA of the one or more TDRAs) may indicate one or more respective slot offsets (e.g., k2 for PUSCH, k0 for PDSCH). The row of the one or more rows (or the TDRA of the one or more TDRAs) may indicate one or more slot offsets. Each slot offset of the one or more slot offsets may be for (or be associated with or be configured for) a respective transport block of the scheduled transport block(s).

In an example, the row of the one or more rows may indicate a first slot offset (e.g., m1), a second slot offset (e.g., m2), and a third slot offset (e.g., m3). The wireless device may transmit/receive a first/starting/earliest transport block of the scheduled transport block(s) at time slot n+m1. The wireless device may transmit/receive a second/second starting/second earliest transport block of the scheduled transport block(s) at time slot n+m2. The wireless device may transmit/receive a third/third starting/third earliest transport block of the scheduled transport block(s) at time slot n+m3, and so on. The wireless device may receive, in time slot n, DCI scheduling the first/starting/earliest transport block, the second/second starting/second earliest transport block, and the third/third starting/third earliest transport block. A slot offset may be, for example, an offset in terms of slots between a first time slot that the wireless device receives DCI scheduling a transport block and a second time slot that the wireless device receives/transmits the transport block. The scheduled transport block(s) may comprise the transport block. A downlink/uplink resource to receive/transmit the transport block may be within (or occur in) the second time slot. The slot offset may be between the DCI and the downlink/uplink resource.

In an example, the row of the one or more rows may indicate a single slot offset. A value of the single slot offset may be applicable for the scheduled transport block(s). For example, when the value of the single slot offset is equal to k, the wireless device may transmit/receive a first/starting/earliest transport block of the scheduled transport block(s) at time slot n+k. The wireless device may transmit/receive a second/second starting/second earliest transport block of the scheduled transport block(s) at time slot n+k+1. The wireless device may transmit/receive a third/third starting/third earliest transport block of the scheduled transport block(s) at time slot n+k+2, and so on. The wireless device may receive, in time slot n, DCI scheduling the first/starting/earliest transport block, the second/second starting/second earliest transport block, and the third/third starting/third earliest transport block. The single slot offset may be, for example, an offset in terms of slots between a first time slot that the wireless device receives DCI scheduling the scheduled transport block(s) and a second time slot that the wireless device receives/transmits the first/starting/earliest transport block. The wireless device may determine slot offset(s) of remaining transport block(s) of the scheduled transport block(s) based on the single slot offset. The remaining transport block(s) may not comprise the first/starting/earliest transport block. A downlink/uplink resource to receive/transmit the first/starting/earliest transport block may be within (or occur in) the second time slot. The single slot offset may be between the DCI and the downlink/uplink resource.

Each row of the one or more rows (or each TDRA of the one or more TDRAs) may indicate one or more respective mapping types (e.g., mappingType, TypeA, TypeB). The row of the one or more rows (or the TDRA of the one or more TDRAs) may indicate one or more mapping types. Each mapping type of the one or more mapping types may be for (or be associated with or be configured for) a respective transport block of the scheduled transport block(s).

Each row of the one or more rows (or each TDRA of the one or more TDRAs) may indicate one or more respective SLIVs (e.g., startSymbolAndLength). The row of the one or more rows (or the TDRA of the one or more TDRAs) may indicate one or more SLIVs. Each SLIV of the one or more SLIVs may be for (or be associated with or be configured for) a respective transport block of the scheduled transport block(s). The wireless device may determine a starting symbol and a length of a transport block of the scheduled transport block(s) based on a SLIV associated with (or configured for) the transport block. The one or more SLIVs may comprise the SLIV associated with (or configured for) the transport block. The length of the transport block may be/comprise a number of symbols (e.g., OFDM symbols) allocated for the transport block. The SLIV associated with (or configured for) the transport block may indicate index giving/providing valid combinations of start symbol and length (jointly encoded) of the transport block.

Each row of the one or more rows (or each TDRA of the one or more TDRAs) may indicate one or more respective starting symbols (e.g., startSymbol). The row of the one or more rows (or each TDRA of the one or more TDRAs) may indicate one or more starting symbols. Each starting symbol of the one or more starting symbols may be for (or be associated with or be configured for) a respective transport block of the scheduled transport block(s). The wireless device may determine a starting symbol of a transport block of the scheduled transport block(s) based on a starting symbol associated with (or configured for) the transport block. The one or more starting symbols may comprise the starting symbol associated with (or configured for) the transport block. The starting symbol of the transport block may indicate an index of a start symbol of the transport block.

Each row of the one or more rows (or each TDRA of the one or more TDRAs) may indicate one or more respective lengths (e.g., length). The row of the one or more rows (or the TDRA of the one or more TDRAs) may indicate one or more lengths. Each length of the one or more lengths may be for (or be associated with or be configured for) a respective transport block of the scheduled transport block(s). The wireless device may determine a length of a transport block of the scheduled transport block(s) based on a length associated with (or configured for) the transport block. The one or more lengths may comprise the length associated with (or configured for) the transport block. The length of the transport block may be/comprise a number of symbols (e.g., OFDM symbols) allocated for the transport block.

Each row of the one or more rows (or each TDRA of the one or more TDRAs) may indicate one or more respective repetition numbers (e.g., numberOfRepetitions). The row of the one or more rows (or the TDRA of the one or more TDRAs) may indicate one or more repetition numbers. Each repetition number of the one or more repetition numbers may be for (or be associated with or be configured for) a respective transport block of the scheduled transport block(s). In an example, a row of the one or more rows may indicate a first repetition number (e.g., n=2), a second repetition number (e.g., n=4), and a third repetition number (e.g., n=12). The wireless device may repeat transmission/reception of a first/starting/earliest transport block of the scheduled transport block(s) the first repetition number times (e.g., n=2 times). The wireless device may repeat transmission/reception of a second/second starting/second earliest transport block of the scheduled transport block(s) the second repetition number times (e.g., n=4 times). The wireless device may repeat transmission/reception of a third/third starting/third earliest transport block of the scheduled transport block(s) the third repetition number times (e.g., n=12 times), and so on.

Each row of the one or more rows (or each TDRA of the one or more TDRAs) may indicate a respective bitmap (e.g., or TRP bitmap or coreset pool bitmap, antenna panel bitmap, DMRS port bitmap, SRS resource set bitmap). The row of the one or more rows (or the TDRA of the one or more TDRAs) may indicate a bitmap comprising one or more bits. Each bit of the one or more one or more bits may be for (or be associated with or be configured for) a respective transport block of the scheduled transport block(s). Each bit of the one or more bits may indicate a respective coreset pool index. Each bit of the one or more bits may indicate a respective TRP. Each bit of the one or more bits may indicate a respective antenna panel. For example, when a bit (in the pdschAllocation, puschAllocation in FIG. 17) of the one or more bits is equal to a first value (e.g., 0), a transport block, of the plurality of transport blocks, associated with the bit may be associated with a first TRP of the plurality of TRPs. For example, when a bit (in the pdschAllocation, puschAllocation in FIG. 17) of the one or more bits is equal to a second value (e.g., 1), a transport block, of the plurality of transport blocks, associated with the bit may be associated with a second TRP of the plurality of TRPs. For example, when a bit (in the pdschAllocation, puschAllocation in FIG. 17) of the one or more bits is equal to a third value (e.g., 10), a transport block, of the plurality of transport blocks, associated with the bit may be associated with a first TRP of the plurality of TRPs and a second TRP of the plurality of TRPs. The wireless device may transmit/receive a transport block of the scheduled transport block(s), for example, based on a value of a bit associated with the transport block. The wireless device may determine, for transmissions/reception of the transport block, a transmission power based on the value of the bit. The wireless device may adjust, for transmissions/reception of the transport block, a transmission power based on the value of the bit. The wireless device may determine, for transmissions/reception of the transport block, a transmission precoder based on the value of the bit. The wireless device may determine, for transmissions/reception of the transport block, a number of layers of the transport block based on the value of the bit. The wireless device may determine an association between a DMRS port of the transport block and a PTRS port based on the value of the bit.

In an example, each transport block of the scheduled transport block(s) may be different/separate/individual (e.g., not a repetition).

Figure 18:
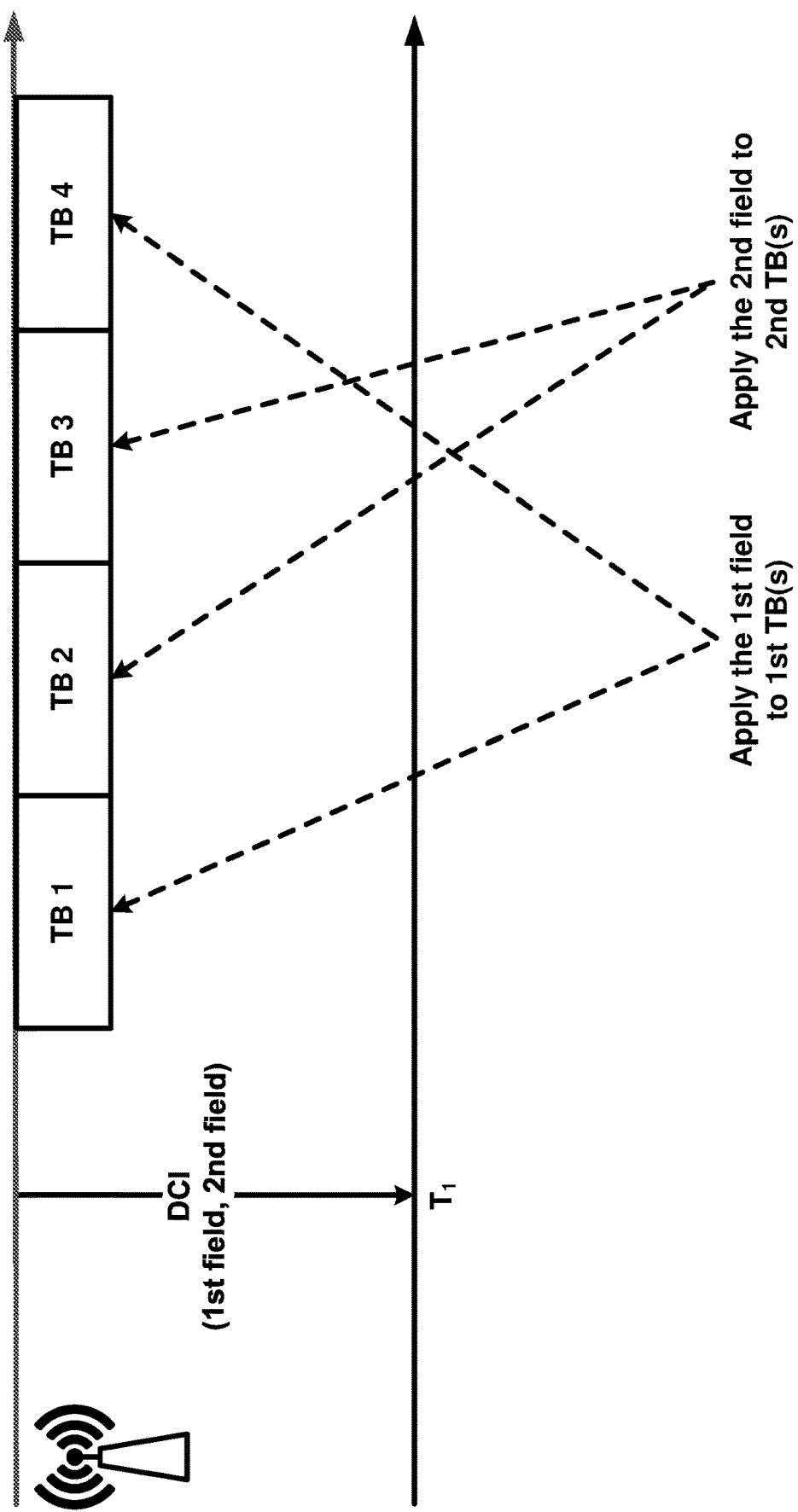
FIG. 18 illustrates an example of scheduling of a plurality of transport blocks as per an aspect of an embodiment of the present disclosure.
Figure 23:
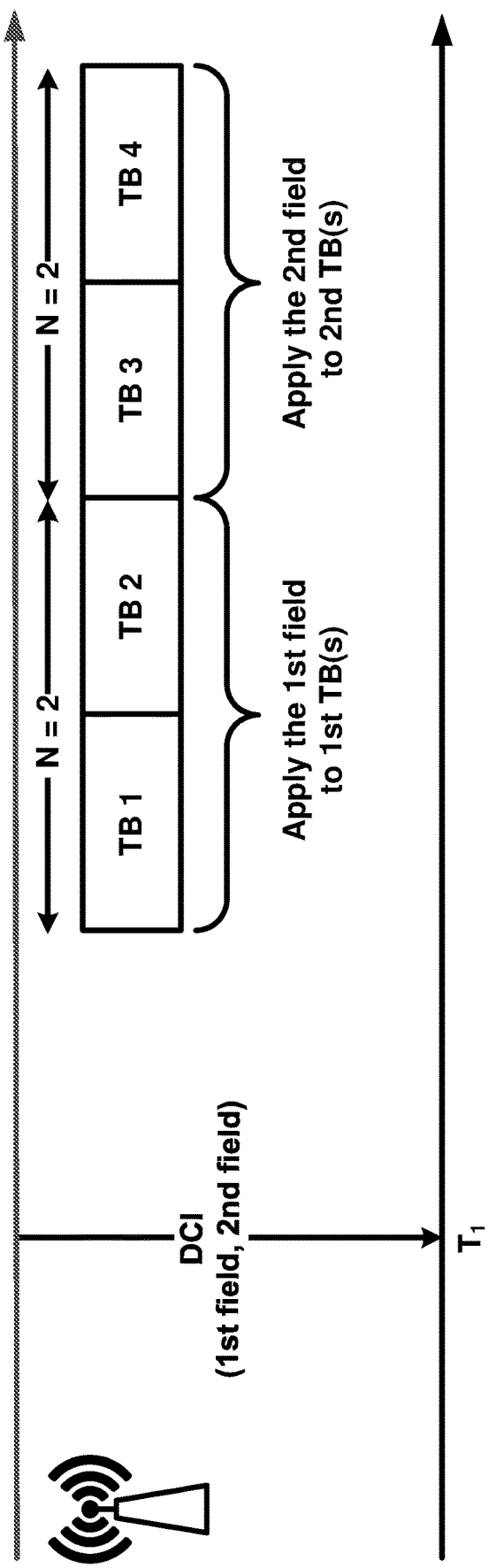
FIG. 23 illustrates an example of scheduling of a plurality of transport blocks as per an aspect of an embodiment of the present disclosure.

FIG. 18 and FIG. 23 illustrate examples of scheduling of a plurality of transport blocks as per an aspect of an embodiment of the present disclosure.

The wireless device may receive DCI (e.g., at time T1 in FIG. 18 and FIG. 23). The DCI may schedule a plurality of transport blocks. The (single) DCI may schedule the plurality of transport blocks. In FIG. 18 and FIG. 23, the plurality of transport blocks are/comprise a first transport block (TB 1), a second transport block (TB 2), a third transport block (TB 3), and a fourth transport block (TB 4).

The DCI may schedule the plurality of transport blocks for the cell. The DCI may schedule each transport block of the plurality of transport blocks for the cell. In an example, the DCI may schedule the plurality of transport blocks for the downlink BWP of the cell. The DCI may schedule each transport block of the plurality of transport blocks for the downlink BWP of the cell. In an example, the DCI may schedule the plurality of transport blocks for the uplink BWP of the cell. The DCI may schedule each transport block of the plurality of transport blocks for the uplink BWP of the cell.

The wireless device may receive, via a second cell, the DCI. The cell and the second cell may be, for example, the same (e.g., self-scheduling). The cell and the second cell may be, for example, different (e.g., cross-carrier scheduling).

In an example, each transport block of the plurality of transport blocks may be different/separate/individual. The DCI may not schedule the plurality of transport blocks for repetition of a transport block, for example, based on each transport block of the plurality of transport blocks being different/separate/individual. Transmitting the DCI scheduling the plurality of transport blocks may reduce PDCCH monitoring burden leading to power saving and may result in less LBT procedure leading to lower delay. Repetition of a transport block may increase robustness and reliability.

In an example, the plurality of transport blocks may be continuous. The plurality of transport blocks may be/occur/scheduled in consecutive time slots. For example, the first transport block (TB 1) may be/occur/scheduled in time slot n. The second transport block (TB 2) may be/occur/scheduled in time slot n+1. The third transport block (TB 3) may be/occur/scheduled in time slot n+2. The fourth transport block (TB 4) may be/occur/scheduled in time slot n+3.

In an example, the plurality of transport blocks may be non-continuous. The plurality of transport blocks may be/occur/scheduled in non-consecutive time slots. For example, the first transport block (TB 1) may be/occur/scheduled in time slot n. The second transport block (TB 2) may be/occur/scheduled in time slot n+2. The third transport block (TB 3) may be/occur/scheduled in time slot n+5. The fourth transport block (TB 4) may be/occur/scheduled in time slot n+7.

In an example, the plurality of transport blocks may be continuous and non-continuous. At least two transport blocks of the plurality of transport blocks may be, for example, continuous. At least two transport blocks of the plurality of transport blocks may be, for example, non-continuous. At least two transport blocks of the plurality of transport blocks may be/occur/scheduled, for example, in consecutive time slots. At least two transport blocks of the plurality of transport blocks may be/occur/scheduled, for example, in non-consecutive time slots. For example, the first transport block (TB 1) may be/occur/scheduled in time slot n. The second transport block (TB 2) may be/occur/scheduled in time slot n+1. The third transport block (TB 3) may be/occur/scheduled in time slot n+3. The fourth transport block (TB 4) may be/occur/scheduled in time slot n+4.

The DCI may schedule the plurality of transport blocks in one or more time slots. The DCI may schedule each transport block of the plurality of transport blocks in respective time slot(s) of the one or more time slots.

In an example, each time slot of the one or more time slots may be different. For example, the first transport block (TB 1) may be/occur/scheduled in time slot n. The second transport block (TB 2) may be/occur/scheduled in time slot n+1. The third transport block (TB 3) may be/occur/scheduled in time slot n+2. The fourth transport block (TB 4) may be/occur/scheduled in time slot n+3.

In an example, at least two transport blocks of the plurality of transport blocks may be/occur/scheduled in a same time slot of the plurality of transport blocks. For example, the first transport block (TB 1) may be/occur/scheduled in time slot n. The second transport block (TB 2) may be/occur/scheduled in time slot n. The third transport block (TB 3) may be/occur/scheduled in time slot n+1. The fourth transport block (TB 4) may be/occur/scheduled in time slot n+1.

In an example, each transport block of the transport blocks may be confined/scheduled within a respective time slot of the one or more time slots. For example, the first transport block (TB 1) may be/occur/scheduled/confined in time slot n. The second transport block (TB 2) may be/occur/scheduled/confined in time slot n+1. The third transport block (TB 3) may be/occur/scheduled/confined in time slot n+2. The fourth transport block (TB 4) may be/occur/scheduled/confined in time slot n+3.

In an example, a transport block of the transport blocks may be scheduled across time slots of the one or more time slots. For example, the first transport block (TB 1) may be/occur/scheduled/confined in time slot n and time slot n+1. The second transport block (TB 2) may be/occur/scheduled/confined in time slot n+2 and time slot n+3. The third transport block (TB 3) may be/occur/scheduled/confined in time slot n+3 and time slot n+4. The fourth transport block (TB 4) may be/occur/scheduled/confined in time slot n+5 and time slot n+6.

In an example, the DCI scheduling the plurality of transport blocks may comprise the DCI scheduling a plurality of PDSCH receptions/transmissions. The plurality of PDSCH receptions/transmissions may comprise/be the plurality of transport blocks. Each PDSCH reception/transmission of the plurality of PDSCH receptions/transmissions may comprise/be a respective transport block of the plurality of transport blocks. For example, in FIG. 18 and FIG. 23, a first PDSCH reception/transmission may comprise/be the first transport block (TB 1), a second PDSCH reception/transmission may comprise/be the second transport block (TB 2), a third PDSCH reception/transmission may comprise/be the third transport block (TB 3), and a fourth PDSCH reception/transmission may comprise/be the fourth transport block (TB 4). The plurality of PDSCH receptions/transmissions may comprise the first PDSCH reception/transmission, the second PDSCH reception/transmission, the third PDSCH reception/transmission, and the fourth PDSCH reception/transmission.

In an example, the DCI scheduling the plurality of transport blocks may comprise the DCI scheduling a plurality of PUSCH transmissions. The plurality of PUSCH transmissions may comprise/be the plurality of transport blocks. Each PUSCH transmission of the plurality of PUSCH transmissions may comprise/be a respective transport block of the plurality of transport blocks. For example, in FIG. 18 and FIG. 23, a first PUSCH transmission may comprise/be the first transport block (TB 1), a second PUSCH transmission may comprise/be the second transport block (TB 2), a third PUSCH transmission may comprise/be the third transport block (TB 3), and a fourth PUSCH transmission may comprise/be the fourth transport block (TB 4). The plurality of PUSCH transmissions may comprise the first PUSCH transmission, the second PUSCH transmission, the third PUSCH transmission, and the fourth PUSCH transmission.

The DCI may comprise at least two fields. The at least two fields may comprise a first field and a second field. The DCI may comprise the at least two fields, for example, for transmission/reception of the plurality of transport blocks. The at least two fields may be, for example, at least two sounding reference signal resource indicator/index (SRI)

fields. The first field and the second field may be a first SRI field and a second SRI field, respectively. The at least two fields may be, for example, at least two transmit power control (TPC) fields. The first field and the second field may be a first TPC field and a second TPC field, respectively. The at least two fields may be, for example, at least two phase tracking reference signals (PTRS)-DMRS fields. The first field and the second field may be a first PTRS-DMRS field and a second PTRS-DMRS field, respectively. The at least two fields may be, for example, at least two transmitted precoding matrix indicator (TPMI) fields. The first field and the second field may be a first TPMI field and a second TPMI field, respectively.

For example, the at least two fields may be at least two SRI fields. The at least two SRI fields may indicate (or be mapped to) at least two power control parameter sets (e.g., SRI-PUSCH-PowerControl). Each SRI field of the at least two SRI fields may indicate (or be mapped to) a respective power control parameter set of the at least two power control parameter sets. A first SRI field of the at least two SRI fields may indicate (or be mapped to) a first power control parameter set of the at least two power control parameter sets. A second SRI field of the at least two SRI fields may indicate (or be mapped to) a second power control parameter set of the at least two power control parameter sets. The one or more configuration parameters may indicate the at least two power control parameter sets. A first field of the at least two fields and a second field of the at least two fields may be the first SRI field and the second SRI field, respectively.

An SRI field indicating (or being mapped to) a power control parameter set may comprise a value of the SRI field indicating (or being mapped) to the power control parameter set. For example, the one or more configuration parameters may indicate a mapping between the value of the SRI field and the power control parameter set. A value of the field may be, for example, equal to a power control parameter set index/identifier/identity (e.g., sri-PUSCH-PowerControlId) identifying/indicating the power control parameter set. For example, the one or more configuration parameters may indicate a mapping between the value of the SRI field and the power control parameter set index/identifier/identity. The one or more configuration parameters may indicate, for the power control parameter set, the power control parameter set index/identifier/identity.

For example, the one or more configuration parameters may indicate, for the at least two power control parameter sets, at least two indexes (e.g., SRS resource set indexes, TRP indexes, coreset pool indexes, antenna panel indexes). The one or more configuration parameters may indicate, for each power control parameter set of the at least two power control parameter sets, a respective index of the at least two indexes. The one or more configuration parameters may indicate, for the first power control parameter set, a first index (e.g., 0) of the at least two indexes. The one or more configuration parameters may indicate, for the second power control parameter set, a second index (e.g., 1) of the at least two indexes. The first SRI field (or a value of the first SRI field) may indicate the first power control parameter set, for example, based on the one or more configuration parameters indicating, for the first power control parameter set, the first index. The second SRI field (or a value of the second SRI field) may indicate the second power control parameter set, for example, based on the one or more configuration parameters indicating, for the second power control parameter set, the second index. The first SRI field may indicate a first SRS resource among/in/from a first SRS resource set indicated/identified by the first index (e.g., a first SRS resource set index). The second SRI field may indicate a second SRS resource among/in/from a second SRS resource set indicated/identified by the second index (e.g., a second SRS resource set index).

For example, the one or more configuration parameters may indicate at least two power control parameter set lists (e.g., sri-PUSCH-MappingToAddModList). The first SRI field may indicate the first power control parameter set configured/in a first power control parameter set list (e.g., $1^{st}$ sri-PUSCH-MappingToAddModList) of the at least two power control parameter set lists. The second SRI field may indicate the second power control parameter set configured/in a second power control parameter set list (e.g., $2^{nd}$ sri-PUSCH-MappingToAddModList) of the at least two power control parameter set lists.

The first power control parameter set indicated by the first SRI field may indicate/comprise one or more first transmission power control parameters. The one or more first transmission power control parameters may comprise/indicate (or be mapped to) at least one of: a first pathloss reference signal (e.g., CSI-RS, SSB indicated/identified by or mapped to sri-PUSCH-PathlossReferenceRS-Id, pusch-PathlossReferenceRS-Id), a first target received power (e.g., p0, P_0-PUSCH), a first pathloss compensation factor (e.g., alpha), and a first closed-loop process number/index (e.g., 1, sri-PUSCH-ClosedLoopIndex). The second power control parameter set indicated by the second SRI field may indicate/comprise one or more second transmission power control parameters. The one or more second transmission power control parameters may comprise/indicate at least one of: a second pathloss reference signal (e.g., CSI-RS, SSB indicated/identified by or mapped to sri-PUSCH-PathlossReferenceRS-Id, pusch-PathlossReferenceRS-Id), a second target received power (e.g., p0, P_0-PUSCH), a second pathloss compensation factor (e.g., alpha), and a second closed-loop process number/index (e.g., 1, sri-PUSCH-ClosedLoopIndex).

The base station may transmit the DCI comprising the at least two SRI fields for a power control (e.g., open-power control). Each SRI field of the at least two SRI fields may be for a respective power control of a TRP of a plurality of TRPs. The first SRI field may be for a first power control of a first TRP of the plurality of TRPs. The second SRI field may be for a second power control of a second TRP of the plurality of TRPs. A TRP may comprise an antenna panel. A TRP and an antenna panel may be used interchangeably.

For example, the at least two fields may be at least two TPC fields (or TPC command fields). The at least two TPC fields may indicate at least two TPC command values (e.g., $\delta_{PUSCH,b,f,c}(i,l)$). Each TPC field of the at least two TPC fields may indicate a respective TPC command value of the at least two TPC command values. A first TPC field of the at least two TPC fields may indicate a first TPC command value of the at least two TPC command values. A second TPC field of the at least two TPC fields may indicate a second TPC command value of the at least two TPC command values. The wireless device may use the at least two TPC command values for a power control adjustment (e.g., PUSCH power control adjustment state $f_{b,f,c}(i,l)$). The base station may transmit the DCI comprising the at least two TPC fields for a closed-power control. Each TPC field of the at least two TPC fields may be for a respective closed-power control of a TRP of a plurality of TRPs. The first TPC field may be for a first closed-power control of a first TRP of the plurality of TRPs. The second TPC field may be for a second closed-power control of a second TRP of the plurality of TRPs. A TRP may comprise an antenna panel. A TRP and an antenna panel may be used interchangeably. A first field of the at least two fields and a second field of the at least two fields may be the first TPC field and the second TPC field, respectively.

A TPC field indicating a TPC command value may comprise a value of the TPC field indicating the TPC command value. For example, the one or more configuration parameters may indicate a mapping between the value of the TPC field and the TPC command value. For example, a mapping between the value of the TPC field and the TPC command value may be determined based on a table. The table may be, for example, fixed/predefined/preconfigured. For example, when the value of the TPC field is equal to 0, the TPC command value may be equal to a first value (e.g., −1 dB, −4 dB). When the value is equal to 1, the TPC command value may be equal to a second value (e.g., 0 dB, −1 dB). When the value is equal to 2, the TPC command value may be equal to a third value (e.g., 1 dB, 1 dB). When the value is equal to 3, the TPC command value may be equal to a fourth value (e.g., 3 dB, 4 dB).

For example, the at least two fields may be at least two PTRS-DMRS fields (PTRS-DMRS association fields). The at least two PTRS-DMRS fields may indicate at least two PTRS-DMRS associations/values. Each PTRS-DMRS field of the at least two PTRS-DMRS fields may indicate a respective PTRS-DMRS association/value of the at least two PTRS-DMRS associations. A first PTRS-DMRS field of the at least two PTRS-DMRS fields may indicate a first PTRS-DMRS association of the at least two PTRS-DMRS associations. A second PTRS-DMRS field of the at least two PTRS-DMRS fields may indicate a second PTRS-DMRS association of the at least two PTRS-DMRS associations. The at least two PTRS-DMRS associations may indicate association(s) between PTRS port(s) (e.g., uplink PTRS port(s)) and DMRS port(s). The wireless device may determine/estimate/track/indicate/report phase noise, for example, based on the association(s) between the PTRS port(s) and the DMRS port(s). The DCI may comprise an antenna port field indicating the DMRS port(s). The antenna port field may indicate an antenna port that is mapped to the DMRS port(s). The one or more configuration parameters (e.g., maxNrofPorts in PTRS-UplinkConfig) may indicate, for example, a number of the PTRS port(s) (or a maximum number of the PTRS port(s)). The DCI may indicate, for example, a number of the PTRS port(s) (or an actual number of the PTRS port(s)). One or more SRI fields in the DCI may, for example, indicate the number of the PTRS port(s) (or an actual number of the PTRS port(s)).

Each PTRS-DMRS field of the at least two PTRS-DMRS fields may be for (or may indicate) a respective PTRS-DMRS association of a TRP of a plurality of TRPs. The first PTRS-DMRS field may be for a first PTRS-DMRS association of a first TRP of the plurality of TRPs. The second PTRS-DMRS field may be for a second PTRS-DMRS association of a second TRP of the plurality of TRPs. A TRP may comprise an antenna panel. A TRP and an antenna panel may be used interchangeably. A first field of the at least two fields and a second field of the at least two fields may be the first PTRS-DMRS field and the second PTRS-DMRS field, respectively.

A PTRS-DMRS field indicating a PTRS-DMRS association may comprise a value of the PTRS-DMRS field indicating the PTRS-DMRS association. For example, the one or more configuration parameters may indicate a mapping between the value of the PTRS-DMRS field and the PTRS-DMRS association. For example, a mapping between the value of the PTRS-DMRS field and the PTRS-DMRS association may be determined based on a table. The table may be, for example, fixed/predefined/preconfigured.

For example, the number of the PTRS port(s) may be equal to one (e.g., uplink PTRS port 0). A transmission rank (or number of layers) of a transport block of the plurality of transport blocks may be up to (and including) four (e.g., maxRank=4). When the value of the PTRS-DMRS field is equal to 0, the PTRS-DMRS association may indicate/associate $1^{st}$ scheduled DMRS port for/with an uplink PTRS port 0. When the value is equal to 1, the PTRS-DMRS association may indicate/associate $2^{nd}$ scheduled DMRS port for/with an uplink PTRS port 0. When the value is equal to 2, the PTRS-DMRS association may indicate/associate $3^{rd}$ scheduled DMRS port for/with an uplink PTRS port 0. When the value is equal to 3, the PTRS-DMRS association may indicate/associate $4^{th}$ scheduled DMRS port for/with an uplink PTRS port 0.

For example, the number of the PTRS port(s) may be equal to two (e.g., uplink PTRS port 0 and uplink PTRS port 1). A transmission rank (or number of layers) of a transport block of the plurality of transport blocks may be up to (and including) four (e.g., maxRank=4). When a first/starting/earliest/MSB bit of the value of the PTRS-DMRS field is equal to 0, the PTRS-DMRS association may indicate/associate $1^{st}$ DMRS port for/with an uplink PTRS port 0 (or $1^{st}$ DMRS port that shares/mapped to the uplink PTRS port 0). When a first/starting/earliest/MSB bit of the value is equal to 1, the PTRS-DMRS association may indicate/associate $2^{nd}$ DMRS port for/with an uplink PTRS port 0 (or $2^{nd}$ DMRS port that shares/mapped to the uplink PTRS port 0). When a second/second starting/second earliest/last/ending/LSB bit of the value is equal to 0, the PTRS-DMRS association may indicate/associate $3^{rd}$ DMRS port for/with an uplink PTRS port 1 (or $1^{st}$ DMRS port that shares/mapped to the uplink PTRS port 1). When a second/second starting/second earliest/last/ending/LSB bit of the value is equal to 1, the PTRS-DMRS association may indicate/associate $4^{th}$ DMRS port for/with an uplink PTRS port 1 (or $2^{nd}$ DMRS port that shares/mapped to the uplink PTRS port 1).

For example, the wireless device may send/transmit a PTRS on a layer (e.g., the strongest layer, the best direction, etc) based on a DMRS port associated with a PTRS port. Sending/transmitting the PTRS on the layer (e.g., the strongest layer, the best direction, etc) may improve phase tracking performance. For example, the wireless device may send/transmit a PTRS on layers (e.g., strongest layers) based on the DMRS ports associated with the PTRS ports. Each DMRS port of the DMRS ports may be associated with a respective PTRS port of the PTRS ports The wireless device may send/transmit the PTRS on a first layer of the layers based on a first DMRS port associated with a first PTRS port. The wireless device may send/transmit the PTRS on a second layer of the layers based on a second DMRS port associated with a second PTRS port. The DMRS ports may comprise the first DMRS port and the second DMRS port. The PTRS ports may comprise the first PTRS DMRS port and the second PTRS DMRS port.

In an example, a PTRS-DMRS association may not be needed/required when a transmission rank (or a number of layers or a maximum transmission rank/layer) of a transport block of the plurality of transport blocks is equal to one.

The wireless device may transmit/report a UE capability message/information indicating a maximum number of PTRS ports. The one or more configuration parameters (e.g., maxNrofPorts in PTRS-UplinkConfig) may indicate one PTRS port or two PTRS ports, for example, based on the UE capability message/information indicating the maximum number of PTRS ports. In an example, two PTRS ports may be used for non/partial-coherent uplink transmission. In an example, one PTRS port may be used for a full-coherent uplink transmission. The UE capability message/information may indicate a capability of supporting the full-coherent uplink transmission.

For example, the at least two fields may be at least two TPMI fields (or Precoding information and number of layers fields). The at least two TPMI fields may indicate at least two TPMI values. Each TPMI field of the at least two TPMI fields may indicate a respective TPMI value of the at least two TPMI values. A first TPMI field of the at least two TPMI fields may indicate a first TPMI value of the at least two TPMI values. A second TPMI field of the at least two TPMI fields may indicate a second TPMI value of the at least two TPMI values. The wireless device may determine at least two transmission precoders, for example, based on the at least two TPMI values. The wireless device may determine each transmission precoder of the at least two transmission precoders based on a respective TPMI value of the at least two TPMI values. The wireless device may determine a first transmission precoder of the at least two transmission precoders based on the first TPMI value. The wireless device may determine a second transmission precoder of the at least two transmission precoders based on the second TPMI value. The wireless device may apply the first transmission precoder over one or more first layers of a first transport block of the plurality of transport blocks. The first TPMI value may indicate, for example, a number of the one or more first layers. The wireless device may apply the second transmission precoder over one or more second layers of a second transport block of the plurality of transport blocks. The second TPMI value may indicate, for example, a number of the one or more second layers. The first TPMI value may indicate, for example, a number of the one or more second layers. The wireless device may determine the number of the one or more second layers based on the number of the one or more first layers. A first field of the at least two fields and a second field of the at least two fields may be the first TPMI field and the second TPMI field, respectively.

A TPMI field indicating a TPMI value may comprise a value of the TPMI field indicating the TPMI value. In an example, the TPMI value may indicate a number of layers (or transmission rank) and a TPMI index (e.g., precoding matrix information). The number of layers and the TPMI index may be, for example, jointly encoded. The number of layers and the TPMI index (e.g., precoding matrix information) may be both indicated by a state in the (single) TPMI field. For example, the one or more configuration parameters may indicate a mapping between the value of the TPMI field and the TPMI value. For example, a mapping between the value of the TPMI field and the TPMI value may be determined based on a table. The table may be, for example, fixed/predefined/preconfigured. For example, when the value of the TPMI field is equal to 0, the TPMI value may be equal to a first value (e.g., 1 layer, TPMI=0). When the value is equal to 3, the TPMI value may be equal to a second value (e.g., 1 layer, TPMI=3). When the value is equal to 20, the TPMI value may be equal to a third value (e.g., 2 layers, TPMI=6). When the value is equal to 29, the TPMI value may be equal to a fourth value (e.g., 3 layers, TPMI=2).

A TPMI field indicating a TPMI value may comprise a value of the TPMI field indicating the TPMI value. In an example, the TPMI value may indicate a TPMI index (e.g., precoding information). The TPMI value may not indicate a number of layers (or transmission rank). The wireless device may determine a number of layers, for example, based on a first TPMI value indicated by a first TPMI field. This may reduce the size/length of the TPMI field. For example, the one or more configuration parameters may indicate a mapping between the value of the TPMI field and the TPMI value. For example, a mapping between the value of the TPMI field and the TPMI value may be determined based on a table. The table may be, for example, fixed/predefined/preconfigured. For example, when the value of the TPMI field is equal to 0, the TPMI value may be equal to a first value (e.g., TPMI=0). When the value is equal to 3, the TPMI value may be equal to a second value (e.g., TPMI=3). When the value is equal to 20, the TPMI value may be equal to a third value (e.g., TPMI=6). When the value is equal to 29, the TPMI value may be equal to a fourth value (e.g., TPMI=2).

In an example, the first TPMI field (or the first TPMI value) may indicate/comprise a first TPMI index and a first number of layers (e.g., first rank information). The second TPMI field (or the second TPMI value) may indicate/comprise a second TPMI index and a second number of layers (e.g., second rank information). Number of layers of/for one or more first transport blocks of the plurality of transport blocks may be equal to the first number of layers. Number of layers of/for each transport block of the one or more first transport blocks may be equal to the first number of layers. Number of layers of/for one or more second transport blocks of the plurality of transport blocks may be equal to the second number of layers. Number of layers of/for each transport block of the one or more second transport blocks may be equal to the second number of layers.

In an example, the first TPMI field (or the first TPMI value) may indicate/comprise a first TPMI index and a first number of layers. The second TPMI field (or the second TPMI value) may indicate/comprise a second TPMI index. The second TPMI may not indicate/comprise a second number of layers. Number of layers of/for the plurality of transport blocks may be equal to the first number of layers. Number of layers of/for each transport block of the plurality of transport blocks may be equal to the first number of layers.

In an example, the one or more configuration parameters may indicate a plurality of SRS resource sets. The plurality of SRS resource sets may comprise a first SRS resource set and a second SRS resource set. The one or more configuration parameters may indicate, for the plurality of SRS resource sets, for example, "codebook". The one or more configuration parameters may indicate "codebook" for each SRS resource set of the plurality of SRS resource sets. The DCI may comprise the at least two fields, for example, based on the one or more configuration parameters indicating, for the plurality of SRS resource sets, "codebook. The one or more configuration parameters may indicate, for the plurality of SRS resource sets, for example, "non-codebook". The one or more configuration parameters may indicate "non-codebook" for each SRS resource set of the plurality of SRS resource sets. The one or more configuration parameters may indicate, for the plurality of SRS resource sets, a plurality of SRS resource set indexes. The one or more configuration parameters may indicate, for each SRS resource set of the plurality of SRS resource sets, a respective SRS resource set index of the plurality of SRS resource set indexes. The one or more configuration parameters may indicate, for the first SRS resource set, a first SRS resource set index of the plurality of SRS resource set indexes. The one or more configuration parameters may indicate, for the second SRS resource set, a second SRS resource set index of the plurality of SRS resource set indexes. The DCI may comprise the at least two fields, for example, based on the one or more configuration parameters indicating, for the plurality of SRS resource sets, "non-codebook. The at least two SRI fields of the DCI may indicate at least two SRS resources. Each SRI field of the at least two SRI fields may indicate a respective SRS resource of the at least two SRS resources. A first SRI field of the at least two SRI fields may indicate a first SRS resource of the at least two SRS resources. A second SRI field of the at least two SRI fields may indicate a second SRS resource of the at least two SRS resources. The first SRS resource set of the plurality of SRS resource sets may comprise the first SRS resource indicated by (or mapped to) the first SRI field. The second SRS resource set of the plurality of SRS resource sets may comprise the second SRS resource indicated by (or mapped to) the second SRI field.

In an example, the DCI may comprise a field (e.g., TDRA field). The field (or a value of the field) may indicate a row of the one or more rows (or a TDRA of the one or more TDRAs) in the list/table of time domain resource allocation.

The row may indicate a number of the plurality of transport blocks (or the plurality of PDSCH transmissions/receptions or the plurality of PUSCH transmissions). For example, the row may indicate one or more SLIVs. Each SLIV of the one or more SLIVs may be for (or be associated with or be configured for) a respective transport block of the plurality of transport blocks. The number of the plurality of transport blocks may be equal to a number of the one or more SLIVs. The one or more SLIVs may be valid. Each SLIV of the one or more SLIVs may be valid. The number of the plurality of transport blocks may be equal to a number of the one or more (valid) SLIVs.

The row may comprise/indicate a resource allocation list (e.g., pdschAllocationList, puschAllocationList in FIG. 17). The resource allocation list may comprise/indicate a plurality of resource allocations (e.g., pdschAllocation, puschAllocation in FIG. 17).

In an example, the DCI scheduling the plurality of transport blocks may comprise the DCI indicating the plurality of resource allocations. In an example, the DCI scheduling the plurality of transport blocks may comprise the DCI indicating the plurality of resource allocations for transmissions/receptions of the plurality of transport blocks. Each resource allocation of the plurality of resource allocations may comprise at least one of: a slot offset, a mapping type, a SLIV, a starting symbol, a length, and a repetition number. Each resource allocation of the plurality of resource allocations may comprise at least one of: a respective slot offset, a respective mapping type, a respective SLIV, a respective starting symbol, a respective length, and a respective repetition number. Each resource allocation of the plurality of resource allocations may be associated with a respective transport block of the transport blocks. For example, in FIG. 18 and FIG. 23, the plurality of resource allocations may be/comprise a first resource allocation, a second resource allocation, a third resource allocation, and a fourth resource allocation. The first resource allocation may indicate/comprise at least one of: a first slot offset, a first mapping type, a first SLIV, a first starting symbol, a first length, and a first repetition number. The second resource allocation may indicate/comprise at least one of: a second slot offset, a second mapping type, a second SLIV, a second starting symbol, a second length, and a second repetition number. The third resource allocation may indicate/comprise at least one of: a third slot offset, a third mapping type, a third SLIV, a third starting symbol, a third length, and a third repetition number. The fourth resource allocation may indicate/comprise at least one of: a fourth slot offset, a fourth mapping type, a fourth SLIV, a fourth starting symbol, a fourth length, and a fourth repetition number.

The wireless device may transmit/receive the plurality of transport blocks based on the plurality of resource allocations. The wireless device may transmit/receive each transport block of the plurality of transport blocks based on a respective resource allocation of the plurality of resource allocations. For example, the wireless device may transmit/receive the first transport block (TB 1) based on the first resource allocation. The wireless device may transmit/receive the second transport block (TB 2) based on the second resource allocation. The wireless device may transmit/receive the third transport block (TB 3) based on the third resource allocation. The wireless device may transmit/receive the fourth transport block (TB 4) based on the fourth resource allocation.

The wireless device may apply the first field of the at least two fields to one or more first transport blocks of the plurality of transport blocks. The wireless device may apply the first field to each transport block of the one or more first transport blocks.

The wireless device may apply the second field of the at least two fields to one or more second transport blocks of the plurality of transport blocks. The wireless device may apply the second field to each transport block of the one or more second transport blocks.

For example, in FIG. 18, the wireless device applies the first field (e.g., $1^{st}$ field) to the first transport block (TB 1) and the fourth transport block (TB 4). The one or more first transport blocks comprise/are the first transport block (TB 1) and the fourth transport block (TB 4). The wireless device applies the second field (e.g., $2^{nd}$ field) to the second transport block (TB 2) and the third transport block (TB 3). The one or more second transport blocks comprise/are the second transport block (TB 2) and the third transport block (TB 3).

For example, in FIG. 23, the wireless device applies the first field (e.g., $1^{st}$ field) to the first transport block (TB 1) and the second transport block (TB 2). The one or more first transport blocks comprise/are the first transport block (TB 1) and the second transport block (TB 2). The wireless device applies the second field (e.g., $2^{nd}$ field) to the third transport block (TB 3) and the fourth transport block (TB 4). The one or more second transport blocks comprise/are the third transport block (TB 3) and the fourth transport block (TB 4).

In an example, the wireless device may apply the first field and the second field to one or more third transport blocks of the plurality of transport blocks. The wireless device may apply the first field and the second field to each transport block of the one or more third transport blocks. A transport block of the one or more third transport blocks may belong to the one or more first transport blocks and the one or more second transport blocks. The one or more first transport blocks may comprise the transport block of the one or more third transport blocks. The one or more second transport blocks may comprise the transport block of the one or more third transport blocks. For example, the wireless device may apply the first field (e.g., $1^{st}$ field) and the second field (e.g., $2^{nd}$ field) to the second transport block (TB 2).

In an example, the one or more first transport blocks and the one or more second transport blocks may be orthogonal. The one or more first transport blocks and the one or more second transport blocks may not comprise/share a common transport block of the plurality of transport blocks. The one or more first transport blocks may comprise a first transport block. The one or more second transport blocks may not comprise the first transport block. The one or more second transport blocks may comprise a second transport block. The one or more first transport blocks may not comprise the second transport block. For example, the one or more first transport blocks may be/comprise the first transport block (TB 1) and the second transport block (TB 2). The one or more second transport blocks may be/comprise the third transport block (TB 3) and the fourth transport block (TB 4). For example, the one or more first transport blocks may be/comprise the first transport block (TB 1). The one or more second transport blocks may be/comprise the second transport block (TB 2), the third transport block (TB 3) and the fourth transport block (TB 4). For example, the one or more first transport blocks may be/comprise the second transport block (TB 2) and the fourth transport block (TB 4). The one or more second transport blocks may be/comprise the first transport block (TB 1) and the third transport block (TB 3).

In an example, the one or more first transport blocks and the one or more second transport blocks may not be orthogonal. The one or more first transport blocks and the one or more second transport blocks may comprise/share at least one common transport block of the plurality of transport blocks. The one or more first transport blocks may comprise a first transport block. The one or more second transport blocks may comprise the first transport block. For example, the one or more first transport blocks may be/comprise the first transport block (TB 1) and the second transport block (TB 2). The one or more second transport blocks may be/comprise the first transport block (TB 1), the third transport block (TB 3) and the fourth transport block (TB 4). For example, the one or more first transport blocks may be/comprise the second transport block (TB 2) and the fourth transport block (TB 4). The one or more second transport blocks may be/comprise the first transport block (TB 1), the third transport block (TB 3), and the fourth transport block (TB 4).

For example, the at least two fields may be the at least two SRI fields. Applying a field (or an SRI field) to a transport block may comprise, for example, receiving the transport block based on the field (or the SRI field). Applying a field (or an SRI field) to a transport block may comprise, for example, transmitting the transport block based on the field (or the SRI field). Applying an SRI field to a transport block may comprise, for example, transmitting the transport block with/using a transmission power that is determined/computed/calculated based on a power control parameter set indicated by (or mapped to) the SRI field. The wireless device may determine/compute/calculate a transmission power based on the SRI field. The wireless device may determine the transmission power, for example, based on a power control parameter set indicated by (or mapped to) the SRI field. The at least two fields may comprise the field. The at least two SRI fields may comprise the SRI field. The plurality of transport blocks may comprise the transport block. For example, the wireless device may determine a first transmission power based on the first power control parameter set indicated by (or mapped to) the first SRI field of the at least two SRI fields. The wireless device may transmit, with/using the first transmission power, the one or more first transport blocks. The wireless device may determine a second transmission power based on the second power control parameter set indicated by (or mapped to) the second SRI field of the at least two SRI fields. The wireless device may transmit, with/using the second transmission power, the one or more second transport blocks.

Determining, for transmission of a transport block, a transmission power based on a power control parameter set may comprise determining/computing/calculating a transmission power based on a pathloss reference signal indicated by (or mapped to) the power control parameter set. The determining/computing/calculating the transmission power based on the pathloss reference signal may comprise determining/computing/calculating a downlink pathloss estimate (or a path loss measurement) for the transmission power based on one or more measurement qualities (e.g., L1-RSRP, L3-RSRP, or a higher filtered RSRP measurement(s)) of the pathloss reference signal. The wireless device may use the downlink pathloss estimate in determining/computing/calculating the transmission power for transmission of the transport block. The transmission power may comprise the downlink pathloss estimate. In an example, the wireless device may determine/calculate/compute/measure a filtered RSRP value (e.g., L1-RSRP, L3-RSRP) of the pathloss reference signal for the downlink pathloss estimate. The wireless device may determine/calculate/compute/measure the filtered RSRP value for transmission of the transport block. For example, the wireless device may determine the first transmission power based on the first pathloss reference signal indicated by (or mapped to) the first power control parameter set. The wireless device may determine the second transmission power based on the second pathloss reference signal indicated by (or mapped to) the second power control parameter set.

Determining, for transmission of a transport block, a transmission power based on a power control parameter set may comprise determining/computing/calculating a transmission power based on a target received power indicated by (or mapped to) the power control parameter set. For example, the wireless device may determine the first transmission power based on the first target received power indicated by (or mapped to) the first power control parameter set. The wireless device may determine the second transmission power based on the second target received power indicated by (or mapped to) the second power control parameter set.

Determining, for transmission of a transport block, a transmission power based on a power control parameter set may comprise determining/computing/calculating a transmission power based on a path loss compensation factor indicated by (or mapped to) the power control parameter set. For example, the wireless device may determine the first transmission power based on the first pathloss compensation factor indicated by (or mapped to) the first power control parameter set. The wireless device may determine the second transmission power based on the second pathloss compensation factor indicated by (or mapped to) the second power control parameter set.

Determining, for transmission of a transport block, a transmission power based on a power control parameter set may comprise determining/computing/calculating a transmission power based on a closed-loop process number/index indicated by (or mapped to) the power control parameter set. For example, the wireless device may determine the first transmission power based on the first closed-loop process number/index indicated by (or mapped to) the first power control parameter set. The wireless device may determine the second transmission power based on the second closed-loop process number/index indicated by (or mapped to) the second power control parameter set.

The wireless device may determine the first transmission power based on one or more power terms (e.g., by adding/subtracting/multiplying/dividing/taking a logarithm, power, and any mathematical expression of the one or more terms). The one or more power terms may comprise, for example, the first pathloss reference signal. The one or more power terms may comprise, for example, the first target received power. The one or more power terms may comprise, for example, the first pathloss compensation factor. The one or more power terms may comprise, for example, the first closed-loop process number/index.

The wireless device may determine the second transmission power based on one or more power terms (e.g., by adding/subtracting/multiplying/dividing/taking a logarithm, power, and any mathematical expression of the one or more power terms). The one or more power terms may comprise, for example, the second pathloss reference signal. The one or more power terms may comprise, for example, the second target received power. The one or more power terms may comprise, for example, the second pathloss compensation factor. The one or more power terms may comprise, for example, the second closed-loop process number/index.

For example, the at least two fields may be the at least two TPC fields. Applying a field (or a TPC field) to a transport block may comprise, for example, receiving the transport block based on the field (or the TPC field). Applying a field (or a TPC field) to a transport block may comprise, for example, transmitting the transport block based on the field (or the TPC field). Applying a TPC field to a transport block may comprise, for example, transmitting the transport block with/using a transmission power that is determined/computed/calculated based on a TPC command value indicated by (or mapped to) the TPC field. The wireless device may determine/compute/calculate a transmission power based on the TPC field. The wireless device may determine the transmission power, for example, based on a TPC command value indicated by (or mapped to) the TPC field. The at least two fields may comprise the field. The at least two TPC fields may comprise the TPC field. The plurality of transport blocks may comprise the transport block. For example, the wireless device may determine a first transmission power based on the first TPC command value indicated by (or mapped to) the first TPC field of the at least two TPC fields. The wireless device may transmit, with/using the first transmission power, the one or more first transport blocks. The wireless device may determine a second transmission power based on the second TPC command value indicated by (or mapped to) the second TPC field of the at least two TPC fields. The wireless device may transmit, with/using the second transmission power, the one or more second transport blocks.

Determining a transmission power based on a TPC command value may comprise adjusting the transmission power based on the TPC command value. Adjusting the transmission power may comprise increasing the transmission power, for example, based on the TPC command value indicating an increase in transmit power. Adjusting the transmission power may comprise decreasing/reducing the transmission power, for example, based on the TPC command value indicating a decrease in transmit power.

For example, the at least two fields may be the at least two PTRS-DMRS fields. Applying a field (or a PTRS-DMRS field) to a transport block may comprise, for example, transmitting the transport block based on the field (or the PTRS-DMRS field). Applying a PTRS-DMRS field to a transport block may comprise, for example, transmitting, in/on/over a DMRS port (or a layer, or a strongest layer, layer with highest SINR, etc) of the transport block, a PTRS for a PTRS port that is associated with the DMRS port. The PTRS-DMRS field may indicate a PTRS-DMRS association that indicates an association between the PTRS port and the DMRS port. The PTRS-DMRS field may associate the PTRS port with/to the DMRS port. The wireless device may determine an association between the PTRS port and the DMRS port based on the PTRS-DMRS field. The at least two fields may comprise the field. The at least two PTRS-DMRS fields may comprise the PTRS-DMRS field. The plurality of transport blocks may comprise the transport block.

For example, the wireless device may transmit, in/on/over a first DMRS port (or a first layer, or a first strongest layer, a first layer with highest SINR, etc) of the one or more first transport blocks, a PTRS for a first PTRS port that is associated with the first DMRS port. The first PTRS-DMRS association indicated by the first PTRS-DMRS field may indicate an association between the first PTRS port and the first DMRS port. The wireless device may transmit, in/on/over the first DMRS port of each transport block of the one or more first transport blocks, the PTRS. The wireless device may transmit, in/on/over a second DMRS port (or a second layer, or a second strongest layer, a second layer with highest SINR, etc) of the one or more second transport blocks, a PTRS for a second PTRS port that is associated with the second DMRS port. The second PTRS-DMRS association indicated by the second PTRS-DMRS field may indicate an association between the second PTRS port and the second DMRS port. The wireless device may transmit, in/on/over the second DMRS port of each transport block of the one or more second transport blocks, the PTRS. In an example, the number of the PTRS port(s) may be equal to one (e.g., uplink PTRS port 0). The first PTRS port and the second PTRS port may be the same, for example, based on the number of the PTRS port(s) being equal to one. For example, a transmission rank (or number of layers) of a transport block of the plurality of transport blocks may be up to (and including) four (e.g., maxRank=4).

For example, the wireless device may transmit, in/on/over a first DMRS port (or a first layer, or a first strongest layer, a first layer with highest SINR, etc) of the one or more first transport blocks, a PTRS for a first PTRS port that is associated with the first DMRS port. The first PTRS-DMRS association indicated by the first PTRS-DMRS field (or the first/starting/earliest/MSB bit of the value of the first PTRS-DMRS field) may indicate an association between the first PTRS port and the first DMRS port. The wireless device may transmit, in/on/over the first DMRS port of each transport block of the one or more first transport blocks, the PTRS. The wireless device may transmit, in/on/over a second DMRS port (or a second layer, or a second strongest layer, a second layer with highest SINR, etc) of the one or more first transport blocks, a PTRS for a second PTRS port that is associated with the second DMRS port. The first PTRS-DMRS association indicated by the first PTRS-DMRS field (or the second/second starting/second earliest/last/ending/LSB bit of the value of the first PTRS-DMRS field) may indicate an association between the second PTRS port and the second DMRS port. The wireless device may transmit, in/on/over the second DMRS port of each transport block of the one or more first transport blocks, the PTRS. The wireless device may transmit, in/on/over a third DMRS port (or a first layer, or a first strongest layer, a first layer with highest SINR, etc) of the one or more second transport blocks, a PTRS for the first PTRS port that is associated with the third DMRS port. The second PTRS-DMRS association indicated by the second PTRS-DMRS field (or the first/starting/earliest/MSB bit of the value of the second PTRS-DMRS field) may indicate an association between the first PTRS port and the third DMRS port. The wireless device may transmit, in/on/over the third DMRS port of each transport block of the one or more second transport blocks, the PTRS. The wireless device may transmit, in/on/over a fourth DMRS port (or a second layer, or a second strongest layer, a second layer with highest SINR, etc) of the one or more second transport blocks, a PTRS for the second PTRS port that is associated with the fourth DMRS port. The second PTRS-DMRS association indicated by the second PTRS-DMRS field (or the second/second starting/second earliest/last/ending/LSB bit of the value of the second PTRS-DMRS field) may indicate an association between the second PTRS port and the fourth DMRS port. The wireless device may transmit, in/on/over the fourth DMRS port of each transport block of the one or more second transport blocks, the PTRS. In an example, the number of the PTRS port(s) may be equal to two (e.g., uplink PTRS port 0, uplink PTRS port 1). A transmission rank (or number of layers) of a transport block of the plurality of transport blocks may be up to (and including) four (e.g., maxRank=4).

For example, the at least two fields may be the at least two TPMI fields. Applying a field (or a TPMI field) to a transport block may comprise, for example, receiving the transport block based on the field (or the TPMI field). Applying a field (or a TPMI field) to a transport block may comprise, for example, transmitting the transport block based on the field (or the TPMI field). Applying a TPMI field to a transport block may comprise, for example, transmitting the transport block with/using a transmission precoder that is determined based on a TPMI value indicated by (or mapped to) the TPMI field. The wireless device may determine a transmission precoder based on the TPMI field. The wireless device may determine the transmission precoder, for example, based on a TPMI value indicated by (or mapped to) the TPMI field. The at least two fields may comprise the field. The at least two TPMI fields may comprise the TPMI field. The plurality of transport blocks may comprise the transport block. For example, the wireless device may determine a first transmission precoder based on the first TPMI value indicated by (or mapped to) the first TPMI field of the at least two TPMI fields. The wireless device may transmit, with/using the first transmission precoder, the one or more first transport blocks. The wireless device may determine a second transmission precoder based on the second TPMI value indicated by (or mapped to) the second TPMI field of the at least two TPMI fields. The wireless device may transmit, with/using the second transmission precoder, the one or more second transport blocks.

Applying a TPMI field to a transport block may comprise, for example, determining a number of layers of the transport block based on a TPMI value indicated by (or mapped to) the TPMI field. For example, the wireless device may transmit the one or more first transport blocks over one or more first layers. The wireless device may transmit each transport block of the one or more first transport blocks over the one or more first layers. The wireless device may determine a number of the one or more first layers based on the first TPMI value indicated by (or mapped to) the first TPMI field of the at least two TPMI fields. The wireless device may transmit the one or more second transport blocks over one or more second layers. The wireless device may transmit each transport block of the one or more second transport blocks over the one or more second layers. The wireless device may determine a number of the one or more second layers, for example, based on the second TPMI value indicated by (or mapped to) the second TPMI field of the at least two TPMI fields. The wireless device may determine a number of the one or more second layers, for example, based on the first TPMI value indicated by (or mapped to) the first TPMI field of the at least two TPMI fields. The number of the one or more first layers and the number of the one or more second layers may be the same (or equal). The wireless device may determine the number of the one or more second layers based on the first TPMI value, for example, in response to the one or more first layers and the number of the one or more second layers being the same. The second TPMI value indicated by (or mapped to) the second TPMI field may not indicate the number of the one or more second layers.

FIG. 19A, FIG. 19B, FIG. 19C and FIG. 19D illustrate examples of a bitmap as per an aspect of an embodiment of the present disclosure.

In an example, the DCI may comprise a field. The field may be/comprise a bitmap.

In an example, the one or more configuration parameters (e.g., puschAllocationList) may indicate a bitmap.

The bitmap may comprise one or more bits. The bitmap may be, for example, a TRP bitmap. The bitmap may be, for example, a coreset pool bitmap. The bitmap may be, for example, a coreset pool index bitmap. The bitmap may be, for example, an antenna panel bitmap. The bitmap may be, for example, a DMRS port bitmap. The bitmap may be, for example, an antenna panel bitmap. The bitmap may be, for example, an SRS resource set bitmap.

The wireless device may determine a size/length of the field (or the bitmap) based on the max value (e.g., maximum value of a number of scheduled transport block(s) among the one or more rows in the list/table of time domain resource allocation). The size/length of the field may indicate a number of the one or more bits in the bitmap (e.g., 2, 3, 4, 5, 6, 7, 8, . . . , 16 bits). For example, when the max value is equal to 4, in FIG. 19A, the size/length of the field (or the bitmap) is equal to the max value (e.g., the number of the one or more bits is 4 bits→[0 1 1 0]). In FIG. 19B, the size/length of the field (or the bitmap) is equal to the max value*2 (e.g., the number of the one or more bits is 8 bits→[00 10 01 01]). In FIG. 19C, the size/length of the field (or the bitmap) is equal to the max value/2 (e.g., the number of the one or more bits is 2 bits→[0 1]).

In an example, each bit of the one or more bits in the bitmap may correspond to (or be associated with) a respective transport block of the plurality of transport blocks. For example, n-th bit of the one or more bits in the bitmap may correspond to (or be associated with) n-th transport block of the plurality of transport blocks. For example, in FIG. 19A, the one or more bits (or the bitmap) are equal to [0 1 1 0]. A starting/earliest/first bit (e.g., 0 in the first entry/element/position/location) of the one or more bits may correspond to (or be associated with) the first transport block (TB 1). The first transport block may be a starting/earliest/first transport block of the plurality of transport blocks. A second starting/second earliest/second bit (e.g., 1 in the second entry/element/position/location) of the one or more bits may correspond to (or be associated with) the second transport block (TB 2). The second transport block may be a second starting/second earliest/second transport block of the plurality of transport blocks. A third starting/third earliest/third bit (e.g., 1 in the third entry/element/position/location) of the one or more bits may correspond to (or be associated with) the third transport block (TB 3). The third transport block may be a third starting/third earliest/third transport block of the plurality of transport blocks. A fourth starting/fourth earliest/fourth bit (e.g., 0 in the fourth entry/element/position/location) of the one or more bits may correspond to (or be associated with) the fourth transport block (TB 4). The fourth transport block may be a fourth starting/fourth earliest/fourth transport block of the plurality of transport blocks.

For example, the one or more bits (or the bitmap) may be equal to [1 1 0 0]. A starting/earliest/first bit (e.g., 1 in the first entry/element/position/location) of the one or more bits may correspond to (or be associated with) the first transport block (TB 1). A second starting/second earliest/second bit (e.g., 1 in the second entry/element/position/location) of the one or more bits may correspond to (or be associated with) the second transport block (TB 2). A third starting/third earliest/third bit (e.g., 0 in the third entry/element/position/location) of the one or more bits may correspond to (or be associated with) the third transport block (TB 3). A fourth starting/fourth earliest/fourth bit (e.g., 0 in the fourth entry/element/position/location) of the one or more bits may correspond to (or be associated with) the fourth transport block (TB 4).

In an example, the bitmap may comprise one or more bit sets. The one or more bits may be grouped into the one or more bit sets. For example, n-th bit set of the one or more bit sets in the bitmap may correspond to (or be associated with) n-th transport block of the plurality of transport blocks. For example, in FIG. 19B, the one or more bit sets comprise a first bit set (e.g., 00), a second bit set (e.g., 10), a third bit set (e.g., 01), and a fourth bit set (e.g., 01). Each bit set of the one or more bit sets in the bitmap may correspond to (or be associated with) a respective transport block of the plurality of transport blocks. For example, in FIG. 19B, the one or more bits (or the bitmap) are equal to [00 10 01 01]. A starting/earliest/first bit set (e.g., 00 in the first entry/element/position/location/bit set) of the one or more bit sets may correspond to (or be associated with) the first transport block (TB 1). The first transport block may be a starting/earliest/first transport block of the plurality of transport blocks. A second starting/second earliest/second bit set (e.g., 10 in the second entry/element/position/location/bit set) of the one or more bit sets may correspond to (or be associated with) the second transport block (TB 2). The second transport block may be a second starting/second earliest/second transport block of the plurality of transport blocks. A third starting/third earliest/third bit set (e.g., 01 in the third entry/element/position/location/bit set) of the one or more bit sets may correspond to (or be associated with) the third transport block (TB 3). The third transport block may be a third starting/third earliest/third transport block of the plurality of transport blocks. A fourth starting/fourth earliest/fourth bit set (e.g., 01 in the fourth entry/element/position/location/bit set) of the one or more bit sets may correspond to (or be associated with) the fourth transport block (TB 4). The fourth transport block may be a fourth starting/fourth earliest/fourth transport block of the plurality of transport blocks.

For example, the one or more bits (or the bitmap) may be equal to [01 00 10 00]. A starting/earliest/first bit set (e.g., 01 in the first entry/element/position/location/bit set) of the one or more bit sets may correspond to (or be associated with) the first transport block (TB 1). A second starting/second earliest/second bit set (e.g., 00 in the second entry/element/position/location/bit set) of the one or more bit sets may correspond to (or be associated with) the second transport block (TB 2). A third starting/third earliest/third bit set (e.g., 10 in the third entry/element/position/location/bit set) of the one or more bit sets may correspond to (or be associated with) the third transport block (TB 3). A fourth starting/fourth earliest/fourth bit set (e.g., 00 in the fourth entry/element/position/location/bit set) of the one or more bit sets may correspond to (or be associated with) the fourth transport block (TB 4).

The one or more bits in the bitmap may comprise one or more first bits that are set to a first value (e.g., 0, 1). The one or more bits in the bitmap may comprise one or more second bits that are set to a second value (e.g., 0, 1). The first value may be different from the second value. For example, in FIG. 19A, the starting/earliest/first bit and the fourth starting/fourth earliest/fourth bit are set to the first value (e.g., 0). The one or more first bits are the starting/earliest/first bit and the fourth starting/fourth earliest/fourth bit. The second starting/second earliest/second bit and the third starting/third earliest/third bit are set to the second value (e.g., 1). The one or more second bits are the second starting/second earliest/second bit and the third starting/third earliest/third bit.

The one or more bit sets in the bitmap may comprise one or more first bit sets that are set to a first value (e.g., 00). The one or more bit sets in the bitmap may comprise one or more second bit sets that are set to a second value (e.g., 01). The one or more bit sets in the bitmap may comprise one or more third bit sets that are set to a third value (e.g., 10). The one or more bit sets in the bitmap may comprise one or more fourth bit sets that are set to a fourth value (e.g., 11). The first value may be different from the second value. The first value may be different from the third value. The first value may be different from the fourth value. The second value may be different from the third value. The second value may be different from the fourth value. The third value may be different from the fourth value. For example, in FIG. 19B, the starting/earliest/first bit set is set to the first value (e.g., 00). The one or more first bit sets are the starting/earliest/first bit set. The third starting/third earliest/third bit set and the fourth starting/fourth earliest/fourth bit set are set to the second value (e.g., 01). The one or more second bit sets are the third starting/third earliest/third bit set and the fourth starting/fourth earliest/fourth bit set. The second starting/second earliest/second bit set is set to the third value (e.g., 10). The one or more third bit sets are the second starting/second earliest/second bit set.

The size/length of the bitmap may increase, for example, based on each bit of the one or more bits in the bitmap corresponding to a respective transport block of the plurality of transport blocks. The size/length of the bitmap may increase, for example, based on each bit set of the one or more bit sets in the bitmap corresponding to a respective transport block of the plurality of transport blocks. In an example, consecutive transport blocks of the plurality of transport blocks may be subject to similar (or substantially same) channel conditions (e.g., delay spread, Doppler spread, Doppler shift, fading coefficients). The consecutive transport blocks of the plurality of transport blocks may be/occur/scheduled within a channel coherence time, for example, in a high frequency band (e.g., FR3). The size/length of the bitmap may be reduced, for example, based on each bit of the one or more bits in the bitmap corresponding to respective consecutive transport blocks (or consecutive transport block set) of the plurality of transport blocks. Reduction in the size/length of the bitmap may result in less transmitting/receiving beam switching (e.g., reduced beam switching latency).

In an example, consecutive transport blocks may comprise a first transport block scheduled in time slot n and a second transport block scheduled in time slot n+1. The plurality of transport blocks may comprise the consecutive transport blocks (or the first transport block and the second transport block). The consecutive transport blocks may occur (or be scheduled) in consecutive time units (e.g., time slots, mini slots, subframes, etc).

In an example, consecutive transport blocks may comprise a first transport block scheduled in time slot n, a second transport block scheduled in time slot n+1, and a third transport block scheduled in time slot n+2. The plurality of transport blocks may comprise the consecutive transport blocks (or the first transport block, the second transport block, and the third transport block). The consecutive transport blocks may occur (or be scheduled) in consecutive time units (e.g., time slots, mini slots, subframes, etc).

In an example, consecutive transport blocks may comprise a first transport block scheduled in time slot n and a second transport block scheduled in time slot n+k, k>1. The plurality of transport blocks may comprise the consecutive transport blocks (or the first transport block and the second transport block). The plurality of transport blocks may not comprise a third transport block that occurs (or is scheduled) in between time slot n and time slot n+k. The consecutive transport blocks may occur (or be scheduled) in non-consecutive time units (e.g., time slots, mini slots, subframes, etc).

In an example, consecutive transport blocks may comprise a first transport block scheduled in time slot n, a second transport block scheduled in time slot n+2, and a third transport block scheduled in time slot n+5. The plurality of transport blocks may comprise the consecutive transport blocks (or the first transport block, the second transport block, and the third transport block).

In an example, consecutive transport blocks may comprise a first transport block scheduled in time slot n, a second transport block scheduled in time slot n+2, and a third transport block scheduled in time slot n+3. The plurality of transport blocks may comprise the consecutive transport blocks (or the first transport block, the second transport block, and the third transport block).

Starting times (or symbols) of the consecutive transport blocks may be in an ascending/descending order. Consecutive transport blocks may comprise a first transport block with a first starting time, a second transport block with a second starting time, and a third transport block with a third starting time. For example, the third starting time>=the second starting time>=the first starting time. For example, the third starting time>the second starting time>the first starting time. The plurality of transport blocks may not comprise a fourth transport block with a starting time that occurs between (or within) the first starting time and the third starting time.

For example, the one or more configuration parameters may indicate a number (e.g., N=2 in FIG. 23).

For example, the DCI scheduling the plurality of transport blocks may indicate a number (e.g., N=2 in FIG. 23). The DCI may comprise a field (e.g., a new field, or existing field(s) such as HARQ process number field, TCI field, TDRA field, FDRA field, and the like) indicating the number. A size/length of the field of the DCI may be determined based on the max value. The size/length of the field of the DCI may be, for example, equal to log 2(the max value). The size/length of the field of the DCI may be, for example, equal to floor(log 2(the max value)). The size/length of the field of the DCI may be, for example, equal to ceil(log 2(the max value)). The size/length of the field of the DCI may be, for example, equal to log 2(the max value-1). The size/length of the field of the DCI may be, for example, equal to floor(log 2(the max value-1)). The size/length of the field of the DCI may be, for example, equal to ceil(log 2(the max value-1)). The size/length of the field of the DCI may be, for example, equal to log 2(the max value/2). The size/length of the field of the DCI may be, for example, equal to floor(log 2(the max value/2)). The size/length of the field of the DCI may be, for example, equal to ceil(log 2(the max value/2)). floor(x) may denote the closest integer that is equal to or less than x. For example, floor(5.3)=5, floor(2.8)=2, and floor(3)=3. ceil(x) may denote the closest integer that is equal to or higher than x. For example, ceil(5.3)=6, ceil(2.8)=3, and ceil(3)=3.

In an example, indicating the number (N) via the DCI may be dynamic. Indicating the number (N) via the DCI may be more dynamic than indicating the number (N) via the one or more configuration parameters. The base station may determine the number (N), for example, based on the channel conditions of the wireless device. The wireless device may be in a high-mobility environment (e.g., high speed train). Indicating the number (N) via the DCI may be efficient, for example, in the high-mobility environment.

In an example, indicating the number (N) via the one or more configuration parameters may be reliable/robust. Indicating the number (N) via the one or more configuration parameters may be more reliable/robust than indicating the number (N) via the DCI. The wireless device may transmit an acknowledgement message (e.g., HARQ-ACK) for a successful reception of the one or more configuration parameters. The base station may determine the number (N), for example, based on the channel conditions of the wireless device. The wireless device may be in a static environment (e.g., less movement or a low-mobility environment). Indicating the number (N) via the one or more configuration parameters may be efficient, for example, in the static environment.

The size/length of the bitmap may be, for example, based on the max value. The size/length of the bitmap may be, for example, based on the number (N). The size/length of the bitmap may be, for example, based on the max value/the number (N). The size/length of the bitmap may be, for example, equal to the max value/the number (N). The size/length of the bitmap may be, for example, equal to ceil(the max value/the number (N)). The size/length of the bitmap may be, for example, equal to floor(the max value/the number (N)). For example, when the max value is equal to 4, and the number (N) is equal to 2, the size/length of the bitmap is equal to 2. For example, when the max value is equal to 8, and the number (N) is equal to 2, the size/length of the bitmap is equal to 4. For example, when the max value is equal to 16, and the number (N) is equal to 4, the size/length of the bitmap is equal to 4. For example, when the max value is equal to 6, and the number (N) is equal to, the size/length of the bitmap is equal to 2.

The number (e.g., indicated by the one or more configuration parameters or the DCI) may indicate/be, for example, a number of consecutive transport blocks that each bit in the bitmap corresponds to (or is associated with). The number (e.g., indicated by the one or more configuration parameters or the DCI) may indicate/be, for example, a number of consecutive transport blocks that each bit set in the bitmap corresponds to (or is associated with). The number may indicate/be, for example, a number of consecutive transport blocks that are subject to similar channel conditions.

In an example, each bit of the one or more bits in the bitmap may correspond to (or be associated with) respective consecutive transport blocks of the plurality of transport blocks. The number (e.g., indicated by the one or more configuration parameters or the DCI) may indicate/be, for example, a number of the respective consecutive transport blocks. For example, n-th bit of the one or more bits in the bitmap may correspond to (or be associated with) n-th consecutive transport blocks of the plurality of transport blocks. For example, in FIG. 19C and FIG. 23, the number (N) may be equal to two. The one or more bits (or the bitmap) may be equal to [0 1]. A starting/earliest/first bit (e.g., 0 in the first entry/element/position/location) of the one or more bits may correspond to (or be associated with) the first transport block (TB 1) and the second transport block (TB 2). A second starting/second earliest/second bit (e.g., 1 in the second entry/element/position/location) of the one or more bits may correspond to (or be associated with) the third transport block (TB 3) and the fourth transport block (TB 4).

For example, the plurality of transport blocks may comprise a first transport block (TB 1), a second transport block (TB 2), a third transport block (TB 3), a fourth transport block (TB 4), a fifth transport block (TB 5), a sixth transport block (TB 6), a seventh transport block (TB 7), an eight transport block (TB 8).

In an example, the number (N) may be equal to two. The one or more bits (or the bitmap) may be equal to [1 0 0 1]. A starting/earliest/first bit (e.g., 1 in the first entry/element/position/location) of the one or more bits may correspond to (or be associated with) the first transport block (TB 1) and the second transport block (TB 2). A second starting/second earliest/second bit (e.g., 0 in the second entry/element/position/location) of the one or more bits may correspond to (or be associated with) the third transport block (TB 3) and the fourth transport block (TB 4). A third starting/third earliest/third bit (e.g., 0 in the third entry/element/position/location) of the one or more bits may correspond to (or be associated with) the fifth transport block (TB 5) and the sixth transport block (TB 6). A fourth starting/fourth earliest/fourth bit (e.g., 1 in the fourth entry/element/position/location) of the one or more bits may correspond to (or be associated with) the seventh transport block (TB 7) and the eight transport block (TB 8).

In an example, the number (N) may be equal to four. The one or more bits (or the bitmap) may be equal to [1 0]. A starting/earliest/first bit (e.g., 1 in the first entry/element/position/location) of the one or more bits may correspond to (or be associated with) the first transport block (TB 1), the second transport block (TB 2), the third transport block (TB 3) and the fourth transport block (TB 4). A second starting/second earliest/second bit (e.g., 0 in the second entry/element/position/location) of the one or more bits may correspond to (or be associated with) the fifth transport block (TB 5), the sixth transport block (TB 6), the seventh transport block (TB 7) and the eight transport block (TB 8).

In an example, the number (N) may be equal to three. The one or more bits (or the bitmap) may be equal to [1 0 1]. A starting/earliest/first bit (e.g., 1 in the first entry/element/position/location) of the one or more bits may correspond to (or be associated with) the first transport block (TB 1), the second transport block (TB 2), the third transport block (TB 3). A second starting/second earliest/second bit (e.g., 0 in the second entry/element/position/location) of the one or more bits may correspond to (or be associated with) the fourth transport block (TB 4), the fifth transport block (TB 5), and the sixth transport block (TB 6). A third starting/third earliest/third bit (e.g., 1 in the third entry/element/position/location) of the one or more bits may correspond to (or be associated with) the seventh transport block (TB 7) and the eight transport block (TB 8).

For example, the number may be equal to one (e.g., N=1). The one or more bits (or the bitmap) may be equal to [1 0 0 1]. A starting/earliest/first bit (e.g., 1 in the first entry/element/position/location) of the one or more bits may correspond to (or be associated with) the first transport block (TB 1). A second starting/second earliest/second bit (e.g., 0 in the second entry/element/position/location) of the one or more bits may correspond to (or be associated with) the second transport block (TB 2). A third starting/third earliest/third bit (e.g., 0 in the third entry/element/position/location) of the one or more bits may correspond to (or be associated with) the third transport block (TB 3). A fourth starting/fourth earliest/fourth bit (e.g., 1 in the fourth entry/element/position/location) of the one or more bits may correspond to (or be associated with) the fourth transport block (TB 4).

For example, the number may be equal to two (e.g., N=2). The one or more bits (or the bitmap) may be equal to [0 1]. A starting/earliest/first bit (e.g., 0 in the first entry/element/position/location) of the one or more bits may correspond to (or be associated with) the first transport block (TB 1) and the second transport block (TB 2). A second starting/second earliest/second bit (e.g., 1 in the second entry/element/position/location) of the one or more bits may correspond to (or be associated with) the third transport block (TB 3) and the fourth transport block (TB 4).

For example, the number may be equal to two (e.g., N=2). The one or more bits (or the bitmap) may be equal to [0 1 1]. A starting/earliest/first bit (e.g., 0 in the first entry/element/position/location) of the one or more bits may correspond to (or be associated with) the first transport block (TB 1) and the second transport block (TB 2). A second starting/second earliest/second bit (e.g., 1 in the second entry/element/position/location) of the one or more bits may correspond to (or be associated with) the third transport block (TB 3) and the fourth transport block (TB 4). A third starting/third earliest/third bit (e.g., 1 in the third entry/element/position/location) of the one or more bits may correspond to (or be associated with) a fifth transport block (TB 5) and a sixth fourth transport block (TB 6).

For example, the number may be equal to two (e.g., N=3). The one or more bits (or the bitmap) may be equal to [0 1]. A starting/earliest/first bit (e.g., 0 in the first entry/element/position/location) of the one or more bits may correspond to (or be associated with) the first transport block (TB 1), the second transport block (TB 2), and the third transport block (TB 3). A second starting/second earliest/second bit (e.g., 1 in the second entry/element/position/location) of the one or more bits may correspond to (or be associated with) the fourth transport block (TB 4), a fifth transport block (TB 5), and a sixth transport block (TB 6).

In an example, the bitmap may comprise one or more bit sets. The one or more bits may be grouped into the one or more bit sets. For example, n-th bit set of the one or more bit sets in the bitmap may correspond to (or be associated with) n-th consecutive transport blocks of the plurality of transport blocks. For example, the one or more bit sets comprise a first bit set (e.g., 00), a second bit set (e.g., 10), a third bit set (e.g., 01), and a fourth bit set (e.g., 01). Each bit set of the one or more bit sets in the bitmap may correspond to (or be associated with) respective consecutive transport blocks of the plurality of transport blocks. For example, in FIG. 19D, the one or more bits (or the bitmap) may be equal to [00 10]. The number (N) may be equal to two. A starting/earliest/first bit set (e.g., 00 in the first entry/element/position/location/bit set) of the one or more bit sets may correspond to (or be associated with) the first transport block (TB 1) and the second transport block (TB 2). A second starting/second earliest/second bit set (e.g., 10 in the second entry/element/position/location/bit set) of the one or more bit sets may correspond to (or be associated with) the third transport block (TB 3) and the fourth transport block (TB 4).

For example, the one or more bits (or the bitmap) may be equal to [00 10 01]. The number (N) may be equal to three. A starting/earliest/first bit set (e.g., 00 in the first entry/element/position/location/bit set) of the one or more bit sets may correspond to (or be associated with) the first transport block (TB 1), the second transport block (TB 2) and the third transport block (TB 3). A second starting/second earliest/second bit set (e.g., 10 in the second entry/element/position/location/bit set) of the one or more bit sets may correspond to (or be associated with) the fourth transport block (TB 4), the fifth transport block (TB 5), and the sixth transport block (TB 6). A third starting/third earliest/third bit set (e.g., 01 in the third entry/element/position/location/bit set) of the one or more bit sets may correspond to (or be associated with) the seventh transport block (TB 7), and the eight transport block (TB 8).

The wireless device may apply the first field of the at least two fields to the one or more first transport blocks that correspond to (are associated with) the one or more first bits that are set to the first value. The wireless device may apply the first field to the one or more first transport blocks, for example, based on the one or more first bits that correspond to (are associated with) the one or more first transport blocks being set to the first value.

For example, in FIG. 19A, the starting/earliest/first bit and the fourth starting/fourth earliest/fourth bit are set to the first value (e.g., 0). The starting/earliest/first bit may correspond to (or be associated with) the first transport block (TB 1). The fourth starting/fourth earliest/fourth bit may correspond to (or be associated with) the fourth transport block (TB 4). The wireless device may apply the first field to the first transport block (TB 1) and the fourth transport block (TB 4), for example, based on the starting/earliest/first bit associated with the first transport block (TB 1) and the fourth starting/fourth earliest/fourth bit associated with the fourth transport block (TB 4) being set to the first value. The wireless device may apply the first field to the first transport block (TB 1), for example, based on the starting/earliest/first bit associated with the first transport block (TB 1) being set to the first value. The wireless device may apply the first field to the fourth transport block (TB 4), for example, based on the fourth starting/fourth earliest/fourth bit associated with the fourth transport block (TB 4) being set to the first value.

For example, a bit of the one or more bits may be set to the first value (e.g., 0). The bit may correspond to (or be associated with) consecutive transport blocks (e.g., TB 1 and TB 2). The wireless device may apply the first field to the consecutive transport blocks, for example, based on the bit associated with the consecutive transport blocks being set to the first value. For example, in FIG. 19C, the starting/earliest/first bit is set to the first value (e.g., 0). The starting/earliest/first bit may correspond to (or be associated with) the first transport block (TB 1) and the second transport block (TB 2). The wireless device may apply the first field to the first transport block (TB 1) and the second transport block (TB 2), for example, based on the starting/earliest/first bit associated with the first transport block (TB 1) and the second transport block (TB 2) being set to the first value. The wireless device may apply the first field to the first transport block (TB 1), for example, based on the starting/earliest/first bit associated with the first transport block (TB 1) being set to the first value. The wireless device may apply the first field to the second transport block (TB 2), for example, based on the starting/earliest/first bit associated with the second transport block (TB 2) being set to the first value.

The wireless device may apply the second field of the at least two fields to the one or more second transport blocks that correspond to (are associated with) the one or more second bits that are set to the second value. The wireless device may apply the second field to the one or more second transport blocks, for example, based on the one or more second bits that correspond to (are associated with) the one or more second transport blocks being set to the second value.

For example, in FIG. 19A, the second starting/second earliest/second bit and the third starting/third earliest/third bit are set to the second value (e.g., 1). The second starting/second earliest/second bit may correspond to (or be associated with) the second transport block (TB 2). The third starting/third earliest/third bit may correspond to (or be associated with) the third transport block (TB 3). The wireless device may apply the second field to the second transport block (TB 2), for example, based on the second starting/second earliest/second bit associated with the second transport block (TB 2) being set to the second value. The wireless device may apply the second field to the third transport block (TB 3), for example, based on the third starting/third earliest/third bit associated with the third transport block (TB 3) being set to the second value.

For example, a bit of the one or more bits may be set to the second value (e.g., 1). The bit may correspond to (or be associated with) consecutive transport blocks (e.g., TB 3 and TB 4). The wireless device may apply the second field to the consecutive transport blocks, for example, based on the bit associated with the consecutive transport blocks being set to the second value. For example, in FIG. 19C, the second starting/second earliest/second bit is set to the second value (e.g., 1). The second starting/second earliest/second bit may correspond to (or be associated with) the third transport block (TB 3) and the fourth transport block (TB 4). The wireless device may apply the second field to the third transport block (TB 3), for example, based on the second starting/second earliest/second bit associated with the third transport block (TB 3) being set to the second value. The wireless device may apply the second field to the fourth transport block (TB 4), for example, based on the second starting/second earliest/second bit associated with the fourth transport block (TB 4) being set to the second value.

The wireless device may apply the first field of the at least two fields to the one or more first transport blocks that correspond to (are associated with) the one or more first bit sets that are set to the first value. The wireless device may apply the first field to the one or more first transport blocks, for example, based on the one or more first bit sets that correspond to (are associated with) the one or more first transport blocks being set to the first value.

For example, in FIG. 19B, the starting/earliest/first bit set is set to the first value (e.g., 00). The starting/earliest/first bit set may correspond to (or be associated with) the first transport block (TB 1). The wireless device may apply the first field to the first transport block (TB 1), for example, based on the starting/earliest/first bit set associated with the first transport block (TB 1) being set to the first value.

For example, a bit set of the one or more bit sets may be set to the first value (e.g., 00). The bit set may correspond to (or be associated with) consecutive transport blocks (e.g., TB 1 and TB 2). The wireless device may apply the first field to the consecutive transport blocks, for example, based on the bit set associated with the consecutive transport blocks being set to the first value. For example, in FIG. 19D, the starting/earliest/first bit set is set to the first value (e.g., 00). The starting/earliest/first bit set may correspond to (or be associated with) the first transport block (TB 1) and the second transport block (TB 2). The wireless device may apply the first field to the first transport block (TB 1), for example, based on the starting/earliest/first bit set associated with the first transport block (TB 1) being set to the first value. The wireless device may apply the first field to the second transport block (TB 2), for example, based on the starting/earliest/first bit set associated with the second transport block (TB 2) being set to the first value. The wireless device may apply the first field to the first transport block (TB 1) and the second transport block (TB 2), for example, based on the starting/earliest/first bit set associated with the first transport block (TB 1) and the second transport block (TB 2) being set to the first value.

The wireless device may apply the second field of the at least two fields to the one or more second transport blocks that correspond to (are associated with) the one or more second bit sets that are set to the second value. The wireless device may apply the second field to the one or more second transport blocks, for example, based on the one or more second bit sets that correspond to (are associated with) the one or more second transport blocks being set to the second value.

For example, in FIG. 19B, the third starting/third earliest/third bit set and the fourth starting/fourth earliest/fourth bit set are set to the second value (e.g., 01). The third starting/third earliest/third bit set may correspond to (or be associated with) the third transport block (TB 3). The fourth starting/fourth earliest/fourth bit set may correspond to (or be associated with) the fourth transport block (TB 4). The wireless device may apply the second field to the third transport block (TB 3), for example, based on the third starting/third earliest/third bit set associated with the third transport block (TB 3) being set to the second value. The wireless device may apply the second field to the fourth transport block (TB 4), for example, based on the fourth starting/fourth earliest/fourth bit set associated with the fourth transport block (TB 4) being set to the second value.

For example, a bit set of the one or more bit sets may be set to the second value (e.g., 01). The bit set may correspond to (or be associated with) consecutive transport blocks (e.g., TB 3 and TB 4). The wireless device may apply the second field to the consecutive transport blocks, for example, based on the bit set associated with the consecutive transport blocks being set to the second value. For example, in FIG. 19D, the second starting/second earliest/second bit set is set to the second value (e.g., 01). The second starting/second earliest/second bit set may correspond to (or be associated with) the third transport block (TB 3) and the fourth transport block (TB 4). The wireless device may apply the second field to the third transport block (TB 3), for example, based on the second starting/second earliest/second bit set associated with the third transport block (TB 3) being set to the second value. The wireless device may apply the second field to the fourth transport block (TB 4), for example, based on the second starting/second earliest/second bit set associated with the fourth transport block (TB 4) being set to the second value.

The wireless device may apply the first field and the second field of the at least two fields to the one or more third transport blocks that correspond to (are associated with) the one or more third bit sets that are set to the third value. The wireless device may apply the first field and the second field to the one or more third transport blocks, for example, based on the one or more third bit sets that correspond to (are associated with) the one or more third transport blocks being set to the third value.

For example, in FIG. 19B, the second starting/second earliest/second bit set is set to the third value (e.g., 10). The second starting/second earliest/second bit set may correspond to (or be associated with) the second transport block (TB 2). The wireless device may apply the first field and the second field to the second transport block (TB 2), for example, based on the second starting/second earliest/second bit set associated with the second transport block (TB 2) being set to the third value.

For example, a bit set of the one or more bit sets may be set to the third value (e.g., 10). The bit set may correspond to (or be associated with) consecutive transport blocks (e.g., TB 1 and TB 2). The wireless device may apply the first field and the second field to the consecutive transport blocks, for example, based on the bit set associated with the consecutive transport blocks being set to the third value.

In an example, the size/length of the bitmap may be, equal to a value. The value may be, for example, fixed/predefined/preconfigured/preset. The value may be, for example, indicated by the one or more configuration parameters. The value may be equal to, for example, two. The value may be equal to, for example, four. The value may be equal to, for example, eight.

In an example, each bit of the one or more bits in the bitmap may correspond to (or be associated with) respective half of the plurality of transport blocks. For example, n-th bit of the one or more bits in the bitmap may correspond to (or be associated with) n-th half of the plurality of transport blocks (e.g., n=1, 2). A starting/earliest/first bit (e.g., bit in the first entry/element/position/location) of the one or more bits may correspond to (or be associated with) a first half of the plurality of transport blocks. A second starting/second earliest/second bit (e.g., bit in the second entry/element/position/location) of the one or more bits may correspond to (or be associated with) a second half of the plurality of transport blocks.

For example, the plurality of transport blocks may comprise a first transport block (TB 1), a second transport block (TB 2), a third transport block (TB 3), and a fourth transport block (TB 4). The one or more bits (or the bitmap) may be equal to [0 1]. A starting/earliest/first bit (e.g., 0 in the first entry/element/position/location) of the one or more bits may correspond to (or be associated with) the first transport block (TB 1) and the second transport block (TB 2). A second starting/second earliest/second bit (e.g., 1 in the second entry/element/position/location) of the one or more bits may correspond to (or be associated with) the third transport block (TB 3) and the fourth transport block (TB 4).

For example, the plurality of transport blocks may comprise a first transport block (TB 1), a second transport block (TB 2), a third transport block (TB 3), a fourth transport block (TB 4), a fifth transport block (TB 5), a sixth transport block (TB 6), a seventh transport block (TB 7), and an eight transport block (TB 8). The one or more bits (or the bitmap) may be equal to [0 1]. A starting/earliest/first bit (e.g., 0 in the first entry/element/position/location) of the one or more bits may correspond to (or be associated with) the first transport block (TB 1), the second transport block (TB 2), the third transport block (TB 3) and the fourth transport block (TB 4). A second starting/second earliest/second bit (e.g., 1 in the second entry/element/position/location) of the one or more bits may correspond to (or be associated with)

the fifth transport block (TB 5), the sixth transport block (TB 6), the seventh transport block (TB 7), and the eight transport block (TB 8).

For example, the plurality of transport blocks may comprise a first transport block (TB 1), a second transport block (TB 2), a third transport block (TB 3), a fourth transport block (TB 4), a fifth transport block (TB 5), a sixth transport block (TB 6), and a seventh transport block (TB 7). The one or more bits (or the bitmap) may be equal to [0 1]. A starting/earliest/first bit (e.g., 0 in the first entry/element/position/location) of the one or more bits may correspond to (or be associated with) the first transport block (TB 1), the second transport block (TB 2), the third transport block (TB 3) and the fourth transport block (TB 4). A second starting/second earliest/second bit (e.g., 1 in the second entry/element/position/location) of the one or more bits may correspond to (or be associated with) the fifth transport block (TB 5), the sixth transport block (TB 6), and the seventh transport block (TB 7).

For example, the plurality of transport blocks may comprise a first transport block (TB 1), a second transport block (TB 2), a third transport block (TB 3), a fourth transport block (TB 4), a fifth transport block (TB 5), a sixth transport block (TB 6), and a seventh transport block (TB 7). The one or more bits (or the bitmap) may be equal to [0 1]. A starting/earliest/first bit (e.g., 0 in the first entry/element/position/location) of the one or more bits may correspond to (or be associated with) the first transport block (TB 1), the second transport block (TB 2), and the third transport block (TB 3). A second starting/second earliest/second bit (e.g., 1 in the second entry/element/position/location) of the one or more bits may correspond to (or be associated with) the fourth transport block (TB 4), the fifth transport block (TB 5), the sixth transport block (TB 6), and the seventh transport block (TB 7).

In an example, the bitmap may comprise one or more bit sets. The one or more bits may be grouped into the one or more bit sets. In an example, each bit set of the one or more bit sets in the bitmap may correspond to (or be associated with) respective half of the plurality of transport blocks. For example, n-th bit set of the one or more bit sets in the bitmap may correspond to (or be associated with) n-th half of the plurality of transport blocks (e.g., n=1, 2). A starting/earliest/first bit set (e.g., bit set in the first entry/element/position/location) of the one or more bit sets may correspond to (or be associated with) a first half of the plurality of transport blocks. A second starting/second earliest/second bit set (e.g., bit set in the second entry/element/position/location) of the one or more bit sets may correspond to (or be associated with) a second half of the plurality of transport blocks.

For example, the plurality of transport blocks may comprise a first transport block (TB 1), a second transport block (TB 2), a third transport block (TB 3), and a fourth transport block (TB 4). The one or more bits (or the bitmap) may be equal to [00 01]. A starting/earliest/first bit set (e.g., 00 in the first entry/element/position/location) of the one or more bit sets may correspond to (or be associated with) the first transport block (TB 1) and the second transport block (TB 2). A second starting/second earliest/second bit set (e.g., 01 in the second entry/element/position/location) of the one or more bit sets may correspond to (or be associated with) the third transport block (TB 3) and the fourth transport block (TB 4).

For example, the plurality of transport blocks may comprise a first transport block (TB 1), a second transport block (TB 2), a third transport block (TB 3), a fourth transport block (TB 4), a fifth transport block (TB 5), a sixth transport block (TB 6), a seventh transport block (TB 7), and an eight transport block (TB 8). The one or more bits (or the bitmap) may be equal to [00 01]. A starting/earliest/first bit set (e.g., 00 in the first entry/element/position/location) of the one or more bit sets may correspond to (or be associated with) the first transport block (TB 1), the second transport block (TB 2), the third transport block (TB 3) and the fourth transport block (TB 4). A second starting/second earliest/second bit set (e.g., 01 in the second entry/element/position/location) of the one or more bit sets may correspond to (or be associated with) the fifth transport block (TB 5), the sixth transport block (TB 6), the seventh transport block (TB 7), and the eight transport block (TB 8).

The wireless device may apply the first field of the at least two fields to the one or more first transport blocks that correspond to (are associated with) the one or more first bits that are set to the first value. The wireless device may apply the first field to the one or more first transport blocks, for example, based on the one or more first bits that correspond to (are associated with) the one or more first transport blocks being set to the first value.

The wireless device may apply the second field of the at least two fields to the one or more second transport blocks that correspond to (are associated with) the one or more second bits that are set to the second value. The wireless device may apply the second field to the one or more second transport blocks, for example, based on the one or more second bits that correspond to (are associated with) the one or more second transport blocks being set to the second value.

In an example, the one or more bits (or the bitmap) may be equal to [0 1]. For example, the starting/earliest/first bit (e.g., 0 in the first entry/element/position/location) of the one or more bits may correspond to (or be associated with) the first transport block (TB 1) and the second transport block (TB 2). The wireless device may apply the first field to the first transport block (TB 1) and the second transport block (TB 2), for example, based on the starting/earliest/first bit associated with the first transport block (TB 1) and the fourth transport block (TB 4) being set to the first value. The second starting/second earliest/second bit (e.g., 1 in the second entry/element/position/location) of the one or more bits may correspond to (or be associated with) the third transport block (TB 3) and the fourth transport block (TB 4). The wireless device may apply the second field to the third transport block (TB 3) and the fourth transport block (TB 4), for example, based on the second starting/second earliest/second bit associated with the third transport block (TB 3) and the fourth transport block (TB 4) being set to the second value.

For example, the starting/earliest/first bit (e.g., 0 in the first entry/element/position/location) of the one or more bits may correspond to (or be associated with) the first transport block (TB 1), the second transport block (TB 2), the third transport block (TB 3) and the fourth transport block (TB 4). The wireless device may apply the first field to the first transport block (TB 1), the second transport block (TB 2), the third transport block (TB 3) and the fourth transport block (TB 4), for example, based on the starting/earliest/first bit associated with the first transport block (TB 1), the second transport block (TB 2), the third transport block (TB 3) and the fourth transport block (TB 4) being set to the first value. The second starting/second earliest/second bit (e.g., 1 in the second entry/element/position/location) of the one or more bits may correspond to (or be associated with) the fifth transport block (TB 5), the sixth transport block (TB 6), the seventh transport block (TB 7), and the eight transport block (TB 8). The wireless device may apply the second field to the fifth transport block (TB 5), the sixth transport block (TB 6), the seventh transport block (TB 7), and the eight transport block (TB 8), for example, based on the second starting/second earliest/second bit associated with the fifth transport block (TB 5), the sixth transport block (TB 6), the seventh transport block (TB 7), and the eight transport block (TB 8) being set to the second value.

The wireless device may apply the first field of the at least two fields to the one or more first transport blocks that correspond to (are associated with) the one or more first bit sets that are set to the first value. The wireless device may apply the first field to the one or more first transport blocks, for example, based on the one or more first bit sets that correspond to (are associated with) the one or more first transport blocks being set to the first value.

The wireless device may apply the second field of the at least two fields to the one or more second transport blocks that correspond to (are associated with) the one or more second bit sets that are set to the second value. The wireless device may apply the second field to the one or more second transport blocks, for example, based on the one or more second bit sets that correspond to (are associated with) the one or more second transport blocks being set to the second value.

In an example, the one or more bits (or the bitmap) may be equal to [00 01]. The starting/earliest/first bit set (e.g., 00 in the first entry/element/position/location) of the one or more bit sets may correspond to (or be associated with) the first transport block (TB 1) and the second transport block (TB 2). The second starting/second earliest/second bit set (e.g., 01 in the second entry/element/position/location) of the one or more bit sets may correspond to (or be associated with) the third transport block (TB 3) and the fourth transport block (TB 4). The wireless device may apply the first field to the first transport block (TB 1) and the second transport block (TB 2), for example, based on the starting/earliest/first bit associated with the first transport block (TB 1) and the second transport block (TB 2) being set to the first value. The wireless device may apply the second field to the third transport block (TB 3) and the fourth transport block (TB 4), for example, based on the second starting/second earliest/second bit associated with the third transport block (TB 3) and the fourth transport block (TB 4) being set to the second value.

The wireless device may apply the first field and the second field to the first transport block (TB 1) and the second transport block (TB 2), for example, based on the starting/earliest/first bit associated with the first transport block (TB 1) and the second transport block (TB 2) being set to the third value. The wireless device may apply the first field and the second field to the third transport block (TB 3) and the fourth transport block (TB 4), for example, based on the second starting/second earliest/second bit associated with the third transport block (TB 3) and the fourth transport block (TB 4) being set to the third value.

In an example, the one or more bits (or the bitmap) may be equal to [00 01]. The starting/earliest/first bit set (e.g., 00 in the first entry/element/position/location) of the one or more bit sets may correspond to (or be associated with) the first transport block (TB 1), the second transport block (TB 2), the third transport block (TB 3) and the fourth transport block (TB 4). The second starting/second earliest/second bit set (e.g., 01 in the second entry/element/position/location) of the one or more bit sets may correspond to (or be associated with) the fifth transport block (TB 5), the sixth transport block (TB 6), the seventh transport block (TB 7), and the eight transport block (TB 8). The wireless device may apply the first field to the first transport block (TB 1), the second transport block (TB 2), the third transport block (TB 3) and the fourth transport block (TB 4), for example, based on the starting/earliest/first bit associated with the first transport block (TB 1), the second transport block (TB 2), the third transport block (TB 3) and the fourth transport block (TB 4) being set to the first value. The wireless device may apply the second field to the fifth transport block (TB 5), the sixth transport block (TB 6), the seventh transport block (TB 7), and the eight transport block (TB 8), for example, based on the second starting/second earliest/second bit associated with the fifth transport block (TB 5), the sixth transport block (TB 6), the seventh transport block (TB 7), and the eight transport block (TB 8) being set to the second value.

The wireless device may apply the first field and the second field to the first transport block (TB 1), the second transport block (TB 2), the third transport block (TB 3) and the fourth transport block (TB 4), for example, based on the starting/earliest/first bit associated with the first transport block (TB 1), the second transport block (TB 2), the third transport block (TB 3) and the fourth transport block (TB 4) being set to the third value. The wireless device may apply the first field and the second field to the fifth transport block (TB 5), the sixth transport block (TB 6), the seventh transport block (TB 7), and the eight transport block (TB 8), for example, based on the second starting/second earliest/second bit associated with the fifth transport block (TB 5), the sixth transport block (TB 6), the seventh transport block (TB 7), and the eight transport block (TB 8) being set to the third value.

In an example, the one or more first transport blocks that the first field is applied may be a first/starting/earliest half of the plurality of transport blocks. In an example, the one or more second transport blocks that the second field is applied may be a second/second starting/second earliest/last/ending half of the plurality of transport blocks.

In an example, when a number of the plurality of transport blocks is not even (or is odd), a number of transport blocks in the first/starting/earliest half of the plurality of transport blocks is ceil(the number of the plurality of transport blocks/2). A number of transport blocks in the second/second starting/second earliest/last/ending half of the plurality of transport blocks is floor(the number of the plurality of transport blocks/2). For example, when the number of the plurality of transport blocks is equal to 7, the first half of the plurality of transport blocks may comprise four transport blocks (e.g., TB 1, TB 2, TB 3, and TB 4) and the second half of the plurality of transport blocks may comprise three transport blocks (e.g., TB 5, TB 6, and TB 7).

In an example, when a number of the plurality of transport blocks is not even (or is odd), a number of transport blocks in the first/starting/earliest half of the plurality of transport blocks is floor(the number of the plurality of transport blocks/2). A number of transport blocks in the second/second starting/second earliest/last/ending half of the plurality of transport blocks is ceil(the number of the plurality of transport blocks/2). For example, when the number of the plurality of transport blocks is equal to 7, the first half of the plurality of transport blocks may comprise three transport blocks (e.g., TB 1, TB 2, and TB 3) and the second half of the plurality of transport blocks may comprise four transport blocks (e.g., TB 4, TB 5, TB 6, and TB 7).

In an example, the plurality of transport blocks may comprise a first transport block (TB 1), a second transport block (TB 2), a third transport block (TB 3), and a fourth transport block (TB 4). The first/starting/earliest half of the plurality of transport blocks may comprise/be the first transport block (TB 1) and the second transport block (TB 2). The one or more first transport blocks may be/comprise the first transport block (TB 1) and the second transport block (TB 2). The second/second starting/second earliest/last/ending half of the plurality of transport blocks may comprise the third transport block (TB 3) and the fourth transport block (TB 4). The one or more second transport blocks may be/comprise the third transport block (TB 3) and the fourth transport block (TB 4).

In an example, the plurality of transport blocks may comprise a first transport block (TB 1), a second transport block (TB 2), a third transport block (TB 3), a fourth transport block (TB 4), a fifth transport block (TB 5), a sixth transport block (TB 6), a seventh transport block (TB 7), and an eight transport block (TB 8). The first/starting/earliest half of the plurality of transport blocks may comprise/be the first transport block (TB 1), the second transport block (TB 2), the third transport block (TB 3) and the fourth transport block (TB 4). The one or more first transport blocks may be/comprise the first transport block (TB 1), the second transport block (TB 2), the third transport block (TB 3) and the fourth transport block (TB 4). The second/second starting/second earliest/last/ending half of the plurality of transport blocks may comprise the fifth transport block (TB 5), the sixth transport block (TB 6), the seventh transport block (TB 7), and the eight transport block (TB 8). The one or more second transport blocks may be/comprise the fifth transport block (TB 5), the sixth transport block (TB 6), the seventh transport block (TB 7), and the eight transport block (TB 8).

In an example, the plurality of transport blocks may comprise a first transport block (TB 1), a second transport block (TB 2), a third transport block (TB 3), a fourth transport block (TB 4), a fifth transport block (TB 5), a sixth transport block (TB 6), and a seventh transport block (TB 7). The first/starting/earliest half of the plurality of transport blocks may comprise/be the first transport block (TB 1), the second transport block (TB 2), the third transport block (TB 3) and the fourth transport block (TB 4). The one or more first transport blocks may be/comprise the first transport block (TB 1), the second transport block (TB 2), the third transport block (TB 3) and the fourth transport block (TB 4). The second/second starting/second earliest/last/ending half of the plurality of transport blocks may comprise the fifth transport block (TB 5), the sixth transport block (TB 6), and the seventh transport block (TB 7). The one or more second transport blocks may be/comprise the fifth transport block (TB 5), the sixth transport block (TB 6), and the seventh transport block (TB 7).

In an example, the plurality of transport blocks may comprise a first transport block (TB 1), a second transport block (TB 2), a third transport block (TB 3), a fourth transport block (TB 4), a fifth transport block (TB 5), a sixth transport block (TB 6), and a seventh transport block (TB 7). The first/starting/earliest half of the plurality of transport blocks may comprise/be the first transport block (TB 1), the second transport block (TB 2), and the third transport block (TB 3). The one or more first transport blocks may be/comprise the first transport block (TB 1), the second transport block (TB 2), and the third transport block (TB 3). The second/second starting/second earliest/last/ending half of the plurality of transport blocks may comprise the fourth transport block (TB 4), the fifth transport block (TB 5), the sixth transport block (TB 6), and the seventh transport block (TB 7). The one or more second transport blocks may be/comprise the fourth transport block (TB 4), the fifth transport block (TB 5), the sixth transport block (TB 6), and the seventh transport block (TB 7).

In an example, a number of the plurality of transport blocks may be two. The plurality of transport blocks may comprise a first transport block (e.g., TB 1) and a second transport block (e.g., TB 2). The wireless device may apply the first field of the at least two fields to the first transport block. The wireless device may apply the second field of the at least two fields to the second transport block.

For example, the one or more configuration parameters may indicate/enable a cyclic mapping. The cyclic mapping may enable/indicate mapping/applying of the at least two fields to the plurality of transport blocks, for example, cyclically (e.g., switching fields (or transmitting/receiving beams) cyclically). A parameter, among the one or more configuration parameters, indicating the cyclic mapping may be, for example, different from a parameter indicating a cyclic mapping for PUSCH/PUCCH repetition. A parameter, among the one or more configuration parameters, indicating the cyclic mapping may be, for example, the same as a parameter indicating a cyclic mapping for PUSCH/PUCCH repetition.

In an example, a number of the plurality of transport blocks may be larger (or more) than two. The plurality of transport blocks may comprise a first transport block (TB 1), a second transport block (TB 2), a third transport block (TB 3), a fourth transport block (TB 4), a fifth transport block (TB 5), a sixth transport block (TB 6), a seventh transport block (TB 7), and an eight transport block (TB 8). The wireless device may apply the first field of the at least two fields to the first transport block. The wireless device may apply the second field of the at least two fields to the second transport block. The (same) field mapping pattern may continue to remaining transport block(s) of the plurality of transport blocks. The (same) field mapping pattern may continue to the remaining transport block(s) of the plurality of transport blocks, for example, based on the one or more configuration parameters indicating the cyclic mapping. The (same) field mapping pattern may continue to the remaining transport block(s) of the plurality of transport blocks, for example, based on the cell operating the FR3. The (same) field mapping pattern may continue to the remaining transport block(s) of the plurality of transport blocks, for example, based on the subcarrier spacing being equal to a value (e.g., 120 kHz, 240 kHz, 480 kHz, 960 kHz, and the like). The remaining transport block(s) may not comprise the first transport block and the second transport block. The wireless device may apply the first field of the at least two fields to the third transport block, the fifth transport block and the seventh transport block. The wireless device may apply the second field of the at least two fields to the fourth transport block, sixth transport block and the eight transport block.

The wireless device may apply the first field of the at least two fields to the first transport block, the third transport block, the fifth transport block and the seventh transport block. The wireless device may apply the first field of the at least two fields to the first transport block, the third transport block, the fifth transport block and the seventh transport block, for example, based on the one or more configuration parameters indicating the cyclic mapping. The wireless device may apply the first field of the at least two fields to the first transport block, the third transport block, the fifth transport block and the seventh transport block, for example, based on the cell operating the FR3. The wireless device may apply the first field of the at least two fields to the first transport block, the third transport block, the fifth transport block and the seventh transport block, for example, based on the subcarrier spacing being equal to a value (e.g., 120 kHz, 240 kHz, 480 kHz, 960 kHz, and the like).

The wireless device may apply the second field of the at least two fields to the second transport block, the fourth transport block, the sixth transport block and the eight transport block. The wireless device may apply the first field of the at least two fields to the second transport block, the fourth transport block, the sixth transport block and the eight transport block, for example, based on the one or more configuration parameters indicating the cyclic mapping. The wireless device may apply the first field of the at least two fields to the second transport block, the fourth transport block, the sixth transport block and the eight transport block, for example, based on the cell operating the FR3. The wireless device may apply the first field of the at least two fields to the second transport block, the fourth transport block, the sixth transport block and the eight transport block, for example, based on the subcarrier spacing being equal to a value (e.g., 120 kHz, 240 kHz, 480 kHz, 960 kHz, and the like).

For example, the one or more configuration parameters may indicate/enable a sequential mapping. The sequential mapping may enable/indicate mapping/applying of the at least two fields to the plurality of transport blocks, for example, sequentially (e.g., switching fields (or transmitting/receiving beams) sequentially). A parameter, among the one or more configuration parameters, indicating the sequential mapping may be, for example, different from a parameter indicating a sequential mapping for PUSCH/PUCCH repetition. A parameter, among the one or more configuration parameters, indicating the sequential mapping may be, for example, the same as a parameter indicating a sequential mapping for PUSCH/PUCCH repetition.

In an example, a number of the plurality of transport blocks may be larger (or more) than two. The plurality of transport blocks may comprise a first transport block (TB 1), a second transport block (TB 2), a third transport block (TB 3), a fourth transport block (TB 4), a fifth transport block (TB 5), a sixth transport block (TB 6), a seventh transport block (TB 7), and an eight transport block (TB 8). The wireless device may apply the first field of the at least two fields to the first transport block and the second transport block. The wireless device may apply the second field of the at least two fields to the third transport block and the fourth transport block. The (same) field mapping pattern may continue to remaining transport block(s) of the plurality of transport blocks. The (same) field mapping pattern may continue to the remaining transport block(s) of the plurality of transport blocks, for example, based on the one or more configuration parameters indicating the sequential mapping. The (same) field mapping pattern may continue to the remaining transport block(s) of the plurality of transport blocks, for example, based on the cell operating the FR3. The (same) field mapping pattern may continue to the remaining transport block(s) of the plurality of transport blocks, for example, based on the subcarrier spacing being equal to a value (e.g., 120 kHz, 240 kHz, 480 kHz, 960 kHz, and the like). The remaining transport block(s) may not comprise the first transport block, the second transport block, the third transport block and the fourth transport block. The wireless device may apply the first field of the at least two fields to the fifth transport block and the sixth transport block. The wireless device may apply the second field of the at least two fields to the seventh transport block and the eight transport block.

The wireless device may apply the first field of the at least two fields to the first transport block, the second transport block, the fifth transport block and the sixth transport block. The wireless device may apply the first field of the at least two fields to the first transport block, the second transport block, the fifth transport block and the sixth transport block, for example, based on the one or more configuration parameters indicating the sequential mapping. The wireless device may apply the first field of the at least two fields to the first transport block, the second transport block, the fifth transport block and the sixth transport block, for example, based on the cell operating the FR3. The wireless device may apply the first field of the at least two fields to the first transport block, the second transport block, the fifth transport block and the sixth transport block, for example, based on the subcarrier spacing being equal to a value (e.g., 120 kHz, 240 kHz, 480 kHz, 960 kHz, and the like).

The wireless device may apply the second field of the at least two fields to the third transport block, the fourth transport block, the seventh transport block and the eight transport block. The wireless device may apply the second field of the at least two fields to the third transport block, the fourth transport block, the seventh transport block and the eight transport block, for example, based on the one or more configuration parameters indicating the sequential mapping. The wireless device may apply the second field of the at least two fields to the third transport block, the fourth transport block, the seventh transport block and the eight transport block, for example, based on the cell operating the FR3. The wireless device may apply the second field of the at least two fields to the third transport block, the fourth transport block, the seventh transport block and the eight transport block, for example, based on the subcarrier spacing being equal to a value (e.g., 120 kHz, 240 kHz, 480 kHz, 960 kHz, and the like).

Figure 20:
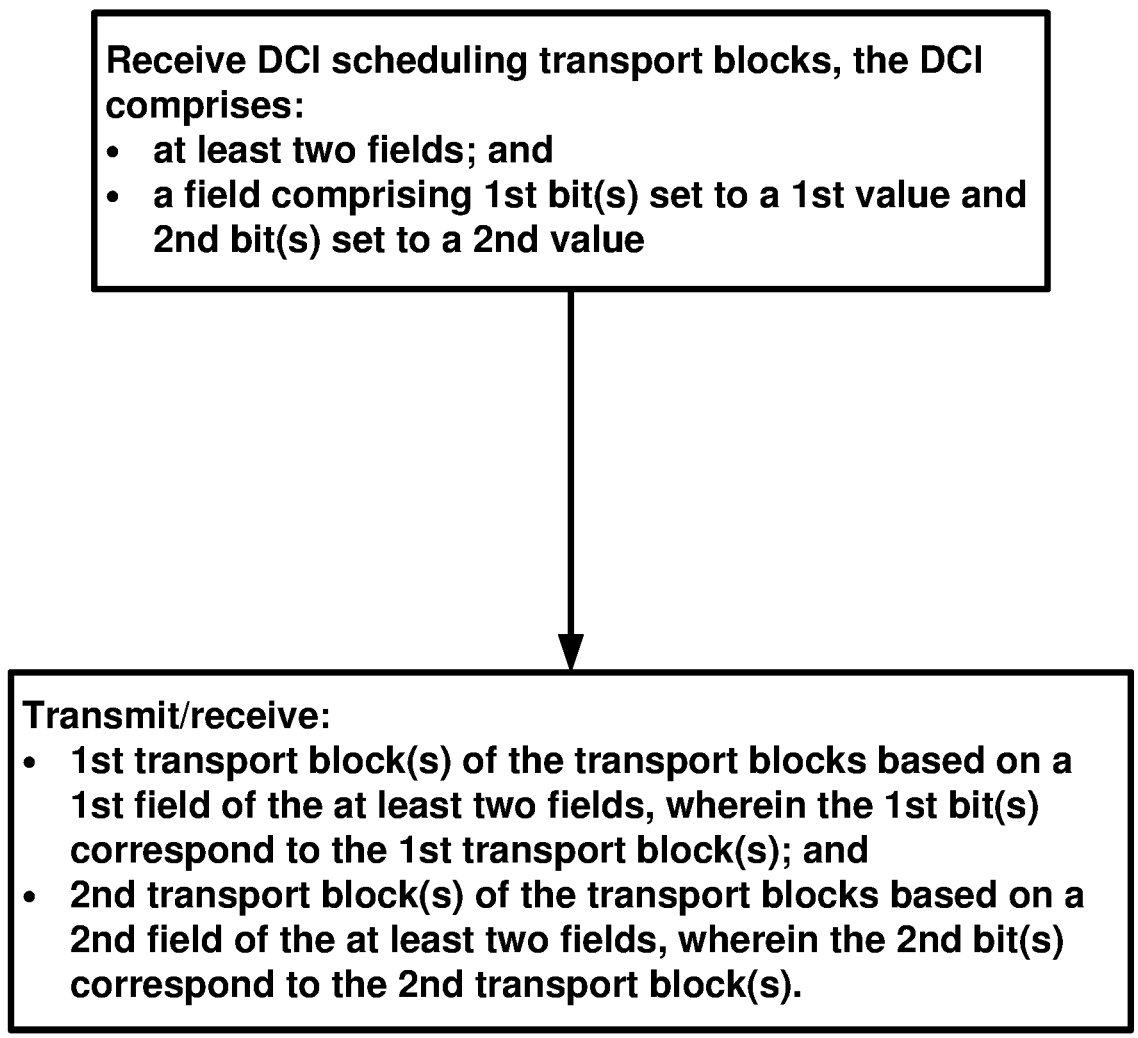
FIG. 20 illustrates an example flow diagram of scheduling of a plurality of transport blocks as per an aspect of an embodiment of the present disclosure.
Figure 21:
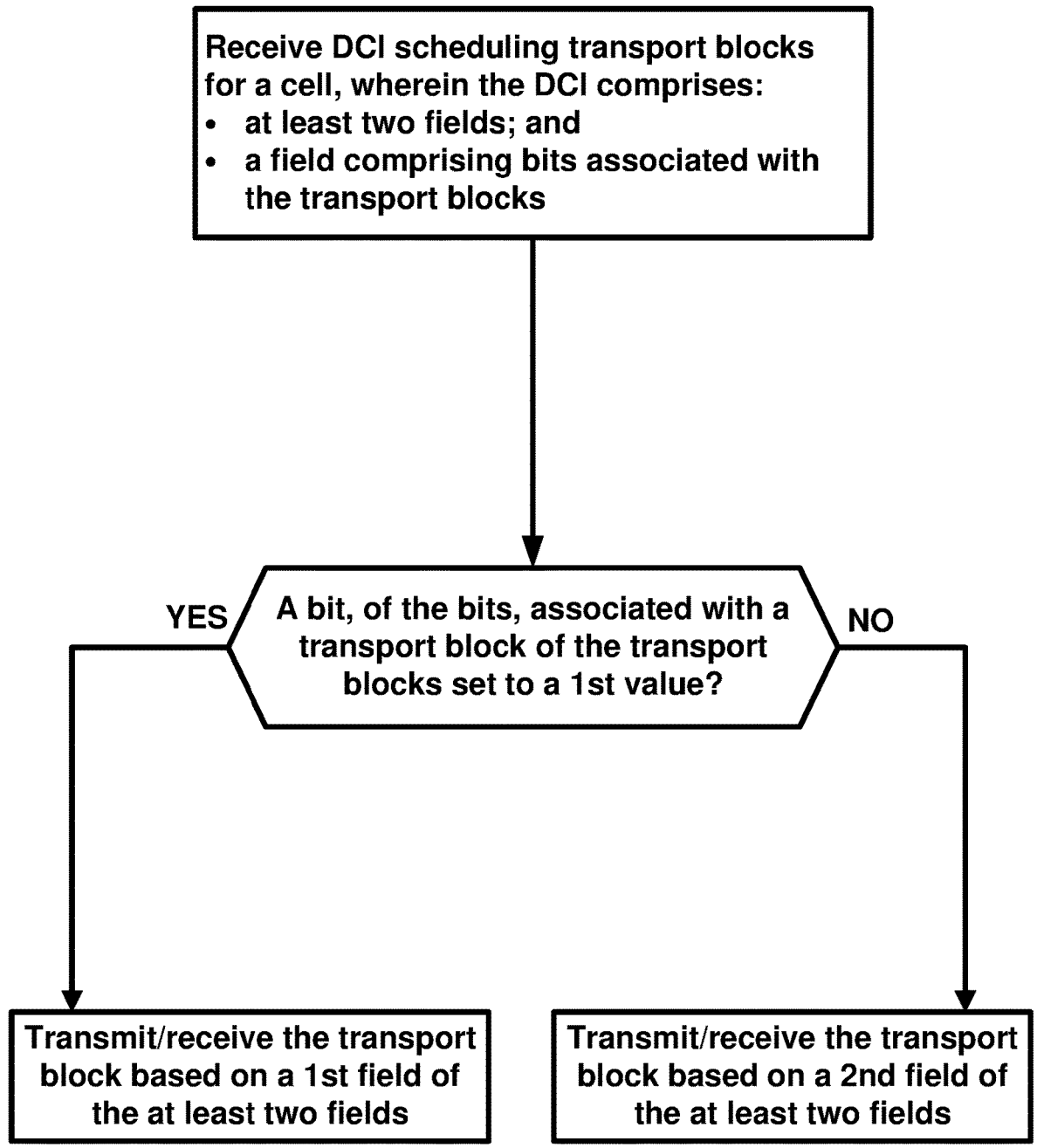
FIG. 21 illustrates an example flow diagram of scheduling of a plurality of transport blocks as per an aspect of an embodiment of the present disclosure.
Figure 22:
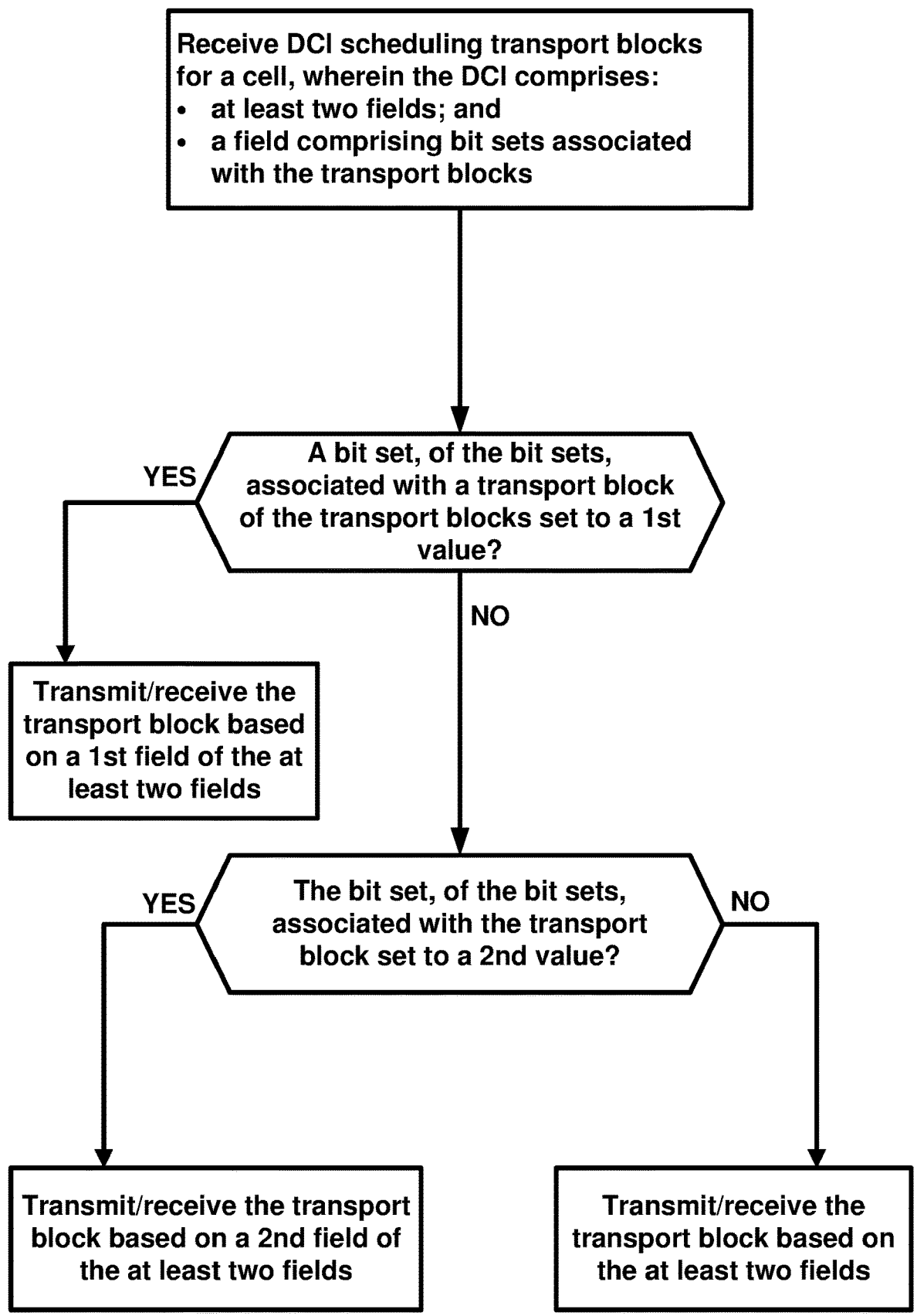
FIG. 22 illustrates an example flow diagram of scheduling of a plurality of transport blocks as per an aspect of an embodiment of the present disclosure.

FIG. 20, FIG. 21 and FIG. 22 illustrate example flow diagrams of scheduling of a plurality of transport blocks as per an aspect of an embodiment of the present disclosure.

A wireless device may receive, e.g., from a base station, one or more messages comprising one or more configuration parameters.

The wireless device may receive DCI. The DCI may schedule a plurality of transport blocks. The DCI may schedule the plurality of transport block for a cell (or for a BWP of a cell). The BWP of the cell may be, for example, an uplink BWP of the cell. The BWP of the cell may be, for example, a downlink BWP of the cell.

The DCI may be, for example, a non-fallback DCI (e.g., DCI 0-1, DCI 1-1, DCI 0-2, DCI 1-2, and the like).

The DCI may comprise at least two fields.

In an example, the DCI may indicate, for transmission/reception of the plurality of transport blocks, a bitmap. The DCI may comprise a field indicating the bitmap.

In an example, the one or more configuration parameters may indicate, for transmission/reception of the plurality of transport blocks, a bitmap.

The bitmap may comprise one or more bits. The one or more bits in the bitmap may correspond to (or be associated with) the plurality of transport blocks.

In an example, each bit of the one or more bits in the bitmap may correspond to (or be associated with) a respective transport block of the plurality of transport blocks.

In an example, each bit of the one or more bits in the bitmap may correspond to (or be associated with) respective (consecutive) transport blocks of the plurality of transport blocks. For example, the DCI may indicate a number of consecutive transport blocks (e.g., N discussed in FIG. 23).

For example, the one or more configuration parameters may indicate a number of consecutive transport blocks (e.g., N discussed in FIG. 23). For example, a number of consecutive transport blocks may be predefined/fixed/preconfigured/preset.

The one or more bits in the bitmap may comprise one or more first bits that are set to a first value (e.g., 0, 1). The one or more bits in the bitmap may comprise one or more second bits that are set to a second value (e.g., 0, 1).

In FIG. 20, the wireless device may apply a first field of the at least two fields to one or more first transport blocks that correspond to (are associated with) the one or more first bits that are set to the first value. The wireless device may apply the first field to the one or more first transport blocks, for example, based on the one or more first bits that correspond to (are associated with) the one or more first transport blocks being set to the first value. The plurality of transport blocks may comprise the one or more first transport blocks.

In FIG. 20, the wireless device may apply a second field of the at least two fields to one or more second transport blocks that correspond to (are associated with) the one or more second bits that are set to the second value. The wireless device may apply the second field to the one or more second transport blocks, for example, based on the one or more second bits that correspond to (are associated with) the one or more second transport blocks being set to the second value. The plurality of transport blocks may comprise the one or more second transport blocks.

In FIG. 21, a bit of the one or more bits in the bitmap may be associated with a transport block of the plurality of transport blocks. The bit may be set to (or be equal to), for example, a first value. The wireless device may apply a first field of the at least two fields to the transport block that correspond to (are associated with) the bit that is set to the first value. The wireless device may apply a first field of the at least two fields to the transport block, for example, based on the bit that correspond to (are associated with) the transport block being set to the first value. The bit may be set to (or be equal to), for example, a second value. The wireless device may apply a second field of the at least two fields to the transport block that correspond to (are associated with) the bit that is set to the second value. The wireless device may apply a second field of the at least two fields to the transport block, for example, based on the bit that correspond to (are associated with) the transport block being set to the second value.

In FIG. 22, the bitmap may comprise one or more bit sets. The one or more bits may be grouped into the one or more bit sets. The one or more bit sets in the bitmap may correspond to (or be associated with) the plurality of transport blocks.

In an example, each bit set of the one or more bit sets in the bitmap may correspond to (or be associated with) a respective transport block of the plurality of transport blocks.

In an example, each bit set of the one or more bit sets in the bitmap may correspond to (or be associated with) respective (consecutive) transport blocks of the plurality of transport blocks. For example, the DCI may indicate a number of consecutive transport blocks (e.g., N discussed in FIG. 23). For example, the one or more configuration parameters may indicate a number of consecutive transport blocks (e.g., N discussed in FIG. 23). For example, a number of consecutive transport blocks may be predefined/fixed/preconfigured/preset.

The one or more bit sets in the bitmap may comprise one or more first bit sets that are set to a first value (e.g., 00). The one or more bit sets in the bitmap may comprise one or more second bit sets that are set to a second value (e.g., 01). The one or more bit sets in the bitmap may comprise one or more third bit sets that are set to a third value (e.g., 10).

In FIG. 22, the wireless device may apply a first field of the at least two fields to one or more first transport blocks that correspond to (are associated with) the one or more first bit sets that are set to the first value. The wireless device may apply the first field to the one or more first transport blocks, for example, based on the one or more first bit sets that correspond to (are associated with) the one or more first transport blocks being set to the first value. The plurality of transport blocks may comprise the one or more first transport blocks.

In FIG. 22, the wireless device may apply a second field of the at least two fields to one or more second transport blocks that correspond to (are associated with) the one or more second bit sets that are set to the second value. The wireless device may apply the second field to the one or more second transport blocks, for example, based on the one or more second bit sets that correspond to (are associated with) the one or more second transport blocks being set to the second value. The plurality of transport blocks may comprise the one or more second transport blocks.

In FIG. 22, the wireless device may apply a first field of the at least two fields and a second field of the at least two fields to one or more third transport blocks that correspond to (are associated with) the one or more third bit sets that are set to the third value. The wireless device may apply the first field and the second field to the one or more third transport blocks, for example, based on the one or more third bit sets that correspond to (are associated with) the one or more third transport blocks being set to the third value. The plurality of transport blocks may comprise the one or more third transport blocks.

Applying a field (e.g., SRI field) to a transport block may comprise transmitting the transport block with/using a transmission power that is determined/computed/calculated based on a power control parameter set indicated by (or mapped to) the field.

Applying a field (e.g., TPC field) to a transport block may comprise transmitting the transport block with/using a transmission power that is determined/computed/calculated based on a TPC command value indicated by (or mapped to) the field. Applying a field (e.g., TPC field) to a transport block may comprise transmitting the transport block with/using a transmission power that is adjusted based on a TPC command value indicated by (or mapped to) the field.

Applying a field (e.g., PTRS-DMRS field) to a transport block may comprise, for example, transmitting, in/on/over a DMRS port (or a layer, or a strongest layer, layer with highest SINR, etc) of the transport block, a PTRS for a PTRS port that is associated with the DMRS port. The field (or the PTRS-DMRS field) may indicate a PTRS-DMRS association that indicates an association between the PTRS port and the DMRS port. The PTRS-DMRS field may associate (or indicate an association between) the PTRS port with/to (or and) the DMRS port. The wireless device may determine an association between the PTRS port and the DMRS port based on the field (or the PTRS-DMRS field).

Applying a field (e.g., TPMI field) to a transport block may comprise transmitting the transport block with/using a transmission precoder that is determined/computed/calculated based on a TPMI value indicated by (or mapped to) the field. The wireless device may transmit the transport block over one or more layers. The TPMI value indicated by (or mapped to) the field may indicate a number of the one or more layers (e.g., rank information, transmission rank, transmission layer).

In an example, the wireless device may apply a first field of the at least two fields to one or more first transport blocks of the plurality of transport blocks. The one or more first transport blocks may occur (or be scheduled) in a first/starting/earliest half of the plurality of transport blocks. The wireless device may apply the first field to the one or more first transport blocks, for example, based on the one or more first transport blocks occurring (or being scheduled) in the first/starting/earliest half of the plurality of transport blocks.

In an example, the wireless device may apply a second field of the at least two fields to one or more second transport blocks of the plurality of transport blocks. The one or more second transport blocks may occur (or be scheduled) in a second/second starting/second earliest/last/ending half of the plurality of transport blocks. The wireless device may apply the second field to the one or more second transport blocks, for example, based on the one or more second transport blocks occurring (or being scheduled) in the second/second starting/second earliest/last/ending half of the plurality of transport blocks.

In an example, the DCI may indicate a value. The DCI may comprise a field indicating the value.

The one or more first transport blocks that the first field is applied may be occur (or be scheduled), for example, before the value. The one or more second transport blocks that the second field is applied may be occur (or be scheduled), for example, after the value.

In an example, the plurality of transport blocks may comprise a first transport block (TB 1), a second transport block (TB 2), a third transport block (TB 3), and a fourth transport block (TB 4).

The value indicated by the DCI may be equal to, for example, one. The one or more first transport blocks that the first field is applied may be the first transport block (TB 1). The one or more second transport blocks that the second field is applied may be the second transport block (TB 2), the third transport block (TB 3), and the fourth transport block (TB 4).

The value indicated by the DCI may be equal to, for example, two. The one or more first transport blocks that the first field is applied may be the first transport block (TB 1) and the second transport block (TB 2). The one or more second transport blocks that the second field is applied may be the third transport block (TB 3) and the fourth transport block (TB 4).

The value indicated by the DCI may be equal to, for example, three. The one or more first transport blocks that the first field is applied may be the first transport block (TB 1), the second transport block (TB 2), and the third transport block (TB 3). The one or more second transport blocks that the second field is applied may be the fourth transport block (TB 4).

In example, the value indicated by the DCI may be a time slot (e.g., slot offset). The wireless device may apply the first field to the one or more first transport blocks that are scheduled (or occur) before the time slot. Starting time(s) of the one or more first transport blocks may occur before the time slot. Starting time(s) of the one or more first transport blocks may occur on/in the time slot. The wireless device may apply the second field to the one or more second transport blocks that are scheduled (or occur) after the time slot. Starting time(s) of the one or more second transport blocks may occur after the time slot. Starting time(s) of the one or more second transport blocks may occur on/in the time slot. For example, the value indicated by the DCI may be equal to k (e.g., k=0, 1, 2, . . . 16, . . . ). The wireless device may receive, in time slot n, the DCI. The wireless device may apply the first field to the one or more first transport blocks that are scheduled (or occur) before time slot n+k. The wireless device may apply the first field to the one or more first transport blocks that are scheduled (or occur) in the time slot n+k. The wireless device may apply the second field to the one or more second transport blocks that are scheduled (or occur) after time slot n+k. The wireless device may apply the second field to the one or more second transport blocks that are scheduled (or occur) in the time slot n+k.

In example, the value indicated by the DCI may be a position/location/starting order/order in the plurality of transport blocks. The wireless device may apply the first field to the one or more first transport blocks that are scheduled (or occur) before the position/location/order. Starting time(s) of the one or more first transport blocks may occur before the position/location/order. Starting time(s) of the one or more first transport blocks may occur on/in the position/location/order. The wireless device may apply the second field to the one or more second transport blocks that are scheduled (or occur) after the position/location/order. Starting time(s) of the one or more second transport blocks may occur after the position/location/order. Starting time(s) of the one or more second transport blocks may occur on/in the position/location/order.

For example, the value indicated by the DCI may be equal to k (e.g., k=0, 1, 2, . . . 16, . . . ).

In an example, the wireless device may apply the first field to the one or more first transport blocks that are scheduled (or occur) before a transport block, of the plurality of transport blocks, in the k-th position/location/order in the plurality of transport blocks. The wireless device may apply the second field to the one or more second transport blocks that are scheduled (or occur) after the transport block, of the plurality of transport blocks, in the k-th position/location/order in the plurality of transport blocks. For example, when k=2, the wireless may apply the first field to the first transport block (TB 1). The wireless device may apply the second field to the second transport block (TB 2), the third transport block (TB 3) and the fourth transport block (TB 4). For example, when k=3, the wireless may apply the first field to the first transport block (TB 1) and the second transport block (TB 2). The wireless device may apply the second field to the third transport block (TB 3) and the fourth transport block (TB 4).

In an example, the wireless device may apply the first field to the one or more first transport blocks that are scheduled (or occur) before a transport block, of the plurality of transport blocks, in the (k+1)-th position/location/order in the plurality of transport blocks. The wireless device may apply the second field to the one or more second transport blocks that are scheduled (or occur) after the transport block, of the plurality of transport blocks, in the (k+1)-th position/location/order in the plurality of transport blocks. For example, when k=2, the wireless may apply the first field to the first transport block (TB 1) and the second transport block (TB 2). The wireless device may apply the second field to the third transport block (TB 3) and the fourth transport block (TB 4). For example, when k=3, the wireless may apply the first field to the first transport block (TB 1), the second transport block (TB 2), and the third transport block (TB 3). The wireless device may apply the second field to the fourth transport block (TB 4).

In an example, the wireless device may switch from the first field to the second field, or vice versa, for example, based on determining a gap (e.g., a number of symbols, number of time slots, at least one symbol, at least one time slot, etc.) between a current transport block and a next transport block. The plurality of transport blocks may comprise the current transport block and the next transport block.

For example, the plurality of transport blocks may comprise a first transport block (TB 1), a second transport block (TB 2), a third transport block (TB 3), and a fourth transport block (TB 4).

For example, the first transport block (TB 1) may be/occur/scheduled in time slot n. The second transport block (TB 2) may be/occur/scheduled in time slot n+1. The third transport block (TB 3) may be/occur/scheduled in time slot n+3. The fourth transport block (TB 4) may be/occur/scheduled in time slot n+4. The wireless device may apply the first field to the first transport block. The wireless device may not determine a gap (e.g., consecutive time slots) between the first transport block and the second transport block. The wireless device may apply the first field to the second transport block. The wireless device may not apply the second field to the second transport block, for example, based on not determining the gap between the first transport block and the second transport block. The wireless device may not switch, for transmission/reception of the second transport block, from the first field to the second field, for example, based on not determining the gap between the first transport block and the second transport block. The wireless device may determine a gap (e.g., 1 time slot, non-consecutive time slots) between the second transport block and the third transport block. The wireless device may apply the second field to the third transport block. The wireless device may apply the second field to the third transport block, for example, based on determining the gap between the second transport block and the third transport block. The wireless device may switch, for transmission/reception of the third transport block, from the first field to the second field, for example, based on determining the gap between the second transport block and the third transport block. The wireless device may not determine a gap (e.g., consecutive time slots) between the third transport block and the fourth transport block. The wireless device may apply the second field to the fourth transport block. The wireless device may apply the second field to the fourth transport block, for example, based on not determining the gap between the third transport block and the fourth transport block. The wireless device may not switch, for transmission/reception of the fourth transport block, from the second field to the first field, for example, based on not determining the gap between the third transport block and the fourth transport block. The one or more first transport blocks are the first transport block and the second transport block. The one or more second transport blocks are the third transport block and the fourth transport block.

For example, the first transport block (TB 1) may be/occur/scheduled in time slot n. The second transport block (TB 2) may be/occur/scheduled in time slot n+2. The third transport block (TB 3) may be/occur/scheduled in time slot n+3. The fourth transport block (TB 4) may be/occur/scheduled in time slot n+5. The wireless device may apply the first field to the first transport block. The wireless device may determine a gap (e.g., non-consecutive time slots) between the first transport block and the second transport block. The wireless device may apply the second field to the second transport block. The wireless device may apply the second field to the second transport block, for example, based on determining the gap between the first transport block and the second transport block. The wireless device may switch, for transmission/reception of the second transport block, from the first field to the second field, for example, based on determining the gap between the first transport block and the second transport block. The wireless device may not determine a gap (e.g., consecutive time slots) between the second transport block and the third transport block. The wireless device may apply the second field to the third transport block. The wireless device may apply the second field to the third transport block, for example, based on not determining the gap between the second transport block and the third transport block. The wireless device may not switch, for transmission/reception of the third transport block, from the second field to the first field, for example, based on not determining the gap between the second transport block and the third transport block. The wireless device may determine a gap (e.g., non-consecutive time slots) between the third transport block and the fourth transport block. The wireless device may apply the first field to the fourth transport block. The wireless device may apply the first field to the fourth transport block, for example, based on determining the gap between the third transport block and the fourth transport block. The wireless device may switch, for transmission/reception of the fourth transport block, from the second field to the first field, for example, based on determining the gap between the third transport block and the fourth transport block. The one or more first transport blocks are the first transport block and the fourth transport block. The one or more second transport blocks are the second transport block and the third transport block.

In an example, the DCI may comprise a PTRS-DMRS field (e.g., a single PTRS-DMRS field). The PTRS-DMRS field may indicate one or more PTRS-DMRS associations. Each bit in/of the PTRS-DMRS field may indicate a respective PTRS-DMRS association of the one or more PTRS-DMRS associations. A first/starting/earliest/MSB bit in/of the PTRS-DMRS field may indicate, for example for a first TRP of the plurality of TRPs, a first PTRS-DMRS association of the one or more PTRS-DMRS associations. A second/second starting/second earliest/last/ending/LSB bit in/of the PTRS-DMRS field may indicate, for example for a second TRP of the plurality of TRPs, a second PTRS-DMRS association of the one or more PTRS-DMRS associations. A TRP may comprise an antenna panel. A TRP and an antenna panel may be used interchangeably.

A size/length of the PTRS-DMRS field may be equal to, for example, N bits (e.g., N=2 bits, 4 bits).

For example, the number of the PTRS port(s) may be equal to one (e.g., uplink PTRS port 0). A transmission rank (or number of layers) of a transport block of the plurality of transport blocks may be up to (and including) two (e.g., maxRank=2).

When a first/starting/earliest/MSB bit of the PTRS-DMRS field is equal to, for example, a first value (e.g., 0), the first PTRS-DMRS association may indicate/associate a first DMRS port for/with a PTRS port (e.g., the uplink PTRS port 0). When a first/starting/earliest/MSB bit of the PTRS-DMRS field is equal to, for example, a second value (e.g., 1), the first PTRS-DMRS association may indicate/associate a second DMRS port for/with the PTRS port (e.g., the uplink PTRS port 0).

When a second/second starting/second earliest/last/ending/LSB bit of the PTRS-DMRS field is equal to, for example, the first value (e.g., 0), the second PTRS-DMRS association may indicate/associate the first DMRS port for/with the PTRS port (e.g., the uplink PTRS port 0). When a second/second starting/second earliest/last/ending/LSB bit of the PTRS-DMRS field is equal to, for example, the second value (e.g., 1), the second PTRS-DMRS association may indicate/associate the second DMRS port for/with the PTRS port (e.g., the uplink PTRS port 0).

In an example, a PTRS-DMRS association may not be needed/required when a transmission rank (or a number of layers or a maximum transmission rank/layer) of a transport block of the plurality of transport blocks is equal to two and the number of the PTRS port(s) is equal to two (e.g., uplink PTRS port 0 and uplink PTRS port 1).

The wireless device may apply the first PTRS-DMRS association to one or more first transport blocks of the plurality of transport blocks. The wireless device may apply the first field to each transport block of the one or more first transport blocks.

The wireless device may apply the second PTRS-DMRS association to one or more second transport blocks of the plurality of transport blocks. The wireless device may apply the second field to each transport block of the one or more second transport blocks.

Applying a PTRS-DMRS association to a transport block may comprise, for example, transmitting, in/on/over a DMRS port (or a layer, or a strongest layer, layer with highest SINR, etc) of the transport block, a PTRS for a PTRS port that is associated with the DMRS port. The PTRS-DMRS association may indicate an association between the PTRS port and the DMRS port.

For example, the wireless device may transmit, in/on/over a first DMRS port (or a first layer, or a first strongest layer, a first layer with highest SINR, etc) of the one or more first transport blocks, a PTRS for a PTRS port that is associated with the first DMRS port. The first PTRS-DMRS association indicated by the PTRS-DMRS field (or the first/starting/earliest/MSB bit of the PTRS-DMRS field) may indicate an association between the PTRS port and the first DMRS port. The wireless device may transmit, in/on/over the first DMRS port of each transport block of the one or more first transport blocks, the PTRS. The wireless device may transmit, in/on/over a second DMRS port (or a second layer, or a second strongest layer, a second layer with highest SINR, etc) of the one or more second transport blocks, a PTRS for the PTRS port that is associated with the second DMRS port. The second PTRS-DMRS association indicated by the second PTRS-DMRS field (or the second/second starting/second earliest/last/ending/LSB bit of the PTRS-DMRS field) may indicate an association between the PTRS port and the second DMRS port. The wireless device may transmit, in/on/over the second DMRS port of each transport block of the one or more second transport blocks, the PTRS.

In an example, the one or more configuration parameters may indicate a plurality of TCI states (e.g., provided by a higher layer parameter tci-StatesToAddModList in PDSCH_Config, PUSCH_Config, or PUCCH_Config, etc). In an example, the wireless device may receive an activation command (e.g., TCI States Activation/Deactivation for UE-specific PDSCH MAC CE, TCI States Activation/Deactivation for UE-specific PUSCH MAC CE, MAC-CE, DCI, control command, and the like) activating/selecting/indicating/updating a first plurality of TCI states of the plurality of TCI states. The wireless device may map the first plurality of TCI states to one or more TCI codepoints. The mapping the first plurality of TCI states to the one or more TCI codepoints may comprise grouping the first plurality of TCI states into/in the one or more TCI codepoints. Each TCI codepoint of the one or more TCI codepoints may comprise/indicate at least one TCI state of the first plurality of TCI states. A TCI field in a DCI may be equal to a TCI codepoint of the one or more TCI codepoints. In an example, the first plurality of TCI states may be TCI state 0, TCI state 1, TCI state 8, TCI state 4, and TCI state 3. The one or more TCI codepoints may be TCI codepoint 00, TCI codepoint 01, TCI codepoint 10, and TCI codepoint 11. The TCI codepoint 00 may indicate TCI state 0, the TCI codepoint 01 may indicate TCI state 1 and TCI state 8, the TCI codepoint 10 may indicate TCI state 4 and TCI state 3, and the TCI codepoint 11 may indicate TCI state 8. The TCI codepoint 00 may be mapped to TCI state 0, the TCI codepoint 01 may be mapped to TCI state 1 and TCI state 8, the TCI codepoint 10 may be mapped to TCI state 4 and TCI state 3, and the TCI codepoint 11 may be mapped to TCI state 8.

For example, the plurality of TCI states may be for (decoding) PDSCH of/for the cell. The one or more configuration parameters may indicate the plurality of TCI states for decoding PDSCH of/for the downlink BWP of the cell. For example, the first plurality of TCI states may be for (decoding) PDSCH of/for the cell. The activation command may indicate/activate/update/select the first plurality of TCI states for decoding PDSCH of/for the downlink BWP of the cell.

For example, the plurality of TCI states may be for transmission of an uplink signal (e.g., UCI, PUSCH, SRS, PUCCH, transport block, SR, CSI, HARQ-ACK) of/for/on/via an uplink resource (e.g., PUSCH resource, PUCCH resource, SRS resource) of the cell. The one or more configuration parameters may indicate the plurality of TCI states for transmission of the uplink signal of/for/on/via the uplink resource of the uplink BWP of the cell. For example, the first plurality of TCI states may be for transmission of an uplink signal (e.g., UCI, PUSCH, SRS, PUCCH, transport block, SR, CSI, HARQ-ACK) of/for/on/via an uplink resource (e.g., PUSCH resource, PUCCH resource, SRS resource) of the cell. The activation command may indicate/activate/update/select the first plurality of TCI states for transmission of the uplink signal of/for/on/via the uplink resource of the uplink BWP of the cell. The plurality of uplink resources may comprise the uplink resource.

In an example embodiment, the at least two SRI fields may be/comprise a TCI field (e.g., a single TCI field). The at least two SRI fields may be combined in the TCI field. The DCI may comprise the TCI field. The TCI field (or a value of the TCI field) may indicate a TCI codepoint. The TCI field (or the value of the TCI field) may be equal to the TCI codepoint. The one or more TCI codepoints may comprise the TCI codepoint.

The TCI codepoint may indicate (or be mapped to) at least two TCI states. The first plurality of TCI states may comprise the at least two TCI states. The DCI may indicate the at least two TCI states. The at least two TCI states may comprise a first TCI state and a second TCI state. For example, a value of the TCI field (e.g., the TCI codepoint) may be equal to 01. The value of the TCI field may be equal to (or indicate) TCI codepoint 01 that indicates (or be mapped to) TCI state 1 and TCI state 8. The at least two TCI states indicated by the DCI may be TCI state 1 and TCI state 8. The first TCI state of the at least two TCI states may be TCI state 1, and the second TCI state of the at least two TCI states may be TCI state 8. For example, a value of the TCI field (e.g., TCI codepoint) may be equal to 10. The value of the TCI field may be equal to (or indicate) TCI codepoint 10 that indicates (or be mapped to) TCI state 4 and TCI state 3. The at least two TCI states indicated by the DCI may be TCI state 4 and TCI state 3. The first TCI state of the at least two TCI states may be TCI state 4, and the second TCI state of the at least two TCI states may be TCI state 3.

In an example, the at least two TCI states may be/comprise at least two downlink TCI states. The wireless device may use the at least two downlink TCI states for reception of the plurality of transport blocks (or the plurality of PDSCH transmissions/receptions).

In an example, the at least two TCI states may be/comprise at least two uplink TCI states. The wireless device may use the at least two uplink TCI states for transmission of the plurality of transport blocks (or the plurality of PUSCH transmissions).

In an example, the at least two TCI states may be/comprise at least two common/joint TCI states. The wireless device may use the at least two common/joint TCI states for transmission of the plurality of transport blocks (or the plurality of PUSCH transmissions). The wireless device may use the at least two common/joint TCI states for reception of the plurality of transport blocks (or the plurality of PDSCH transmissions/receptions).

The at least two SRI fields indicating (or being mapped to) the at least two power control parameter sets may comprise/be the at least two TCI states indicating (or being mapped to or being associated with) the at least two power control parameter sets. Each TCI state of the at least two TCI states may indicate (or be mapped to) a respective power control parameter set of the at least two power control parameter sets. A first TCI state of the at least two TCI states may indicate (or be mapped to) a first power control parameter set of the at least two power control parameter sets. A second TCI state of the at least two TCI states may indicate (or be mapped to) a second power control parameter set of the at least two power control parameter sets.

A TCI state indicating (or being mapped to or being associated with) a power control parameter set may comprise the TCI state comprising/indicating a pathloss reference signal for/of the power control parameter set. The TCI state may comprise/indicate the pathloss reference signal. For example, the one or more configuration parameters may indicate, for the TCI state, the pathloss reference signal. For example, the one or more configuration parameters may indicate an association/mapping between the TCI state and the pathloss reference signal. The TCI state may, for example, indicate/comprise a periodic reference signal that is used as the pathloss reference signal.

A TCI state indicating (or being mapped to or being associated with) a power control parameter set may comprise the TCI state comprising/indicating a target received power for/of the power control parameter set. The TCI state may comprise/indicate the target received power. For example, the one or more configuration parameters may indicate, for the TCI state, the target received power. For example, the one or more configuration parameters may indicate an association/mapping between the TCI state and the target received power.

A TCI state indicating (or being mapped to or being associated with) a power control parameter set may comprise the TCI state comprising/indicating a pathloss compensation factor for/of the power control parameter set. The TCI state may comprise/indicate the pathloss compensation factor. For example, the one or more configuration parameters may indicate, for the TCI state, the pathloss compensation factor. For example, the one or more configuration parameters may indicate an association/mapping between the TCI state and the pathloss compensation factor.

A TCI state indicating (or being mapped to or being associated with) a power control parameter set may comprise the TCI state comprising/indicating a closed-loop process number/index for/of the power control parameter set. The TCI state may comprise/indicate the closed-loop process number/index. For example, the one or more configuration parameters may indicate, for the TCI state, the closed-loop process number/index. For example, the one or more configuration parameters may indicate an association/mapping between the TCI state and the closed-loop process number/index.

For example, the one or more configuration parameters may indicate a mapping between the TCI state and the power control parameter set. The TCI state may comprise/indicate, for example, a power control parameter set index/identifier/identity (e.g., sri-PUSCH-PowerControlId) identifying/indicating the power control parameter set. For example, the one or more configuration parameters may indicate a mapping between the value of the TCI state and the power control parameter set index/identifier/identity. The one or more configuration parameters may indicate, for the power control parameter set, the power control parameter set index/identifier/identity.

The base station may transmit the DCI indicating the at least two TCI states for a power control (e.g., open-power control). Each TCI state of the at least two TCI states may be for a respective power control of a TRP of a plurality of TRPs. The first TCI state may be for a first power control of a first TRP of the plurality of TRPs. The second TCI state may be for a second power control of a second TRP of the plurality of TRPs. A TRP may comprise an antenna panel. A TRP and an antenna panel may be used interchangeably.

The wireless device may apply the first TCI state of the at least TCI states to one or more first transport blocks of the plurality of transport blocks. The wireless device may apply the first TCI state to each transport block of the one or more first transport blocks.

The wireless device may apply the second TCI state of the at least two TCI states to one or more second transport blocks of the plurality of transport blocks. The wireless device may apply the second TCI state to each transport block of the one or more second transport blocks.

Applying a TCI state to a transport block may comprise, for example, receiving the transport block based on the TCI state (or a reference signal indicated by (or associated with) the TCI state). Applying a TCI state to a transport block may comprise, for example, transmitting the transport block based on the TCI state (or a reference signal indicated by (or associated with) the TCI state). Applying a TCI state to a transport block may comprise, for example, transmitting the transport block with/using a transmission power that is determined/computed/calculated based on a power control parameter set indicated by (or mapped to or associated with) the TCI state. The wireless device may determine/compute/calculate a transmission power based on the TCI state. The wireless device may determine the transmission power, for example, based on a power control parameter set indicated by (or mapped to or associated with) the TCI state. The at least two TCI states may comprise the TCI state. The plurality of transport blocks may comprise the transport block. For example, the wireless device may determine a first transmission power based on the first power control parameter set indicated by (or mapped to or associated with) the first TCI state of the at least two TCI states. The wireless device may transmit, with/using the first transmission power, the one or more first transport blocks. The wireless device may determine a second transmission power based on the second power control parameter set indicated by (or mapped to or associated with) the second TCI state of the at least two TCI states. The wireless device may transmit, with/using the second transmission power, the one or more second transport blocks.

What is claimed is:

1. A wireless device comprising:
one or more processors; and
memory storing instructions that, when executed by the one or more processors, cause the wireless device to:
receive downlink control information (DCI) scheduling physical uplink shared channel (PUSCH) transmissions for a cell, wherein the DCI comprises:
a first phase tracking reference signal-demodulation reference signal (PTRS-DMRS) association field;
a second PTRS-DMRS association field; and
a sounding reference signal (SRS) resource set field, wherein:
a first value of the SRS resource set field indicates the PUSCH transmissions are based on the first PTRS-DMRS association field; and
a second value of the SRS resource set field indicates the PUSCH transmissions are based on both the first PTRS-DMRS association field and the second PTRS-DMRS association field; and
transmit the PUSCH transmissions based on the SRS resource set field.

2. The wireless device of claim 1, wherein the instructions further cause the wireless device to determine, based on the first value or the second value, a PTRS-DMRS association field, from the first PTRS-DMRS association field and the second PTRS-DMRS association field, to apply to a PUSCH transmission of the PUSCH transmissions.

3. The wireless device of claim 1, wherein the instructions further cause the wireless device to select, based on the first value or the second value, one of the first PTRS-DMRS association field or the second PTRS-DMRS association field to apply to a PUSCH transmission of the PUSCH transmissions.

4. The wireless device of claim 1, wherein the instructions further cause the wireless device to transmit one or more PTRSs over one or more DMRS ports of the PUSCH transmissions.

5. The wireless device of claim 1, wherein one of the first PTRS-DMRS association field or the second PTRS-DMRS association field indicates an association between a DMRS port of a PUSCH transmission of the PUSCH transmissions and a PTRS port.

6. The wireless device of claim 1, wherein the instructions further cause the wireless device to transmit:
a first PTRS over a first DMRS port of a first PUSCH transmission of the PUSCH transmissions; and
a second PTRS over a second DMRS port of a second PUSCH transmission of the PUSCH transmissions.

7. The wireless device of claim 1, wherein:
the first PTRS-DMRS association field indicates an association between a first DMRS port of a first PUSCH transmission of the PUSCH transmissions and a first PTRS port; and
the second PTRS-DMRS association field indicates an association between a second DMRS port of a second PUSCH transmission of the PUSCH transmissions and a second PTRS port.

8. A base station comprising:
one or more processors; and
memory storing instructions that, when executed by the one or more processors, cause the base station to:
transmit, to a wireless device, downlink control information (DCI) scheduling physical uplink shared channel (PUSCH) transmissions for a cell, wherein the DCI comprises:
a first phase tracking reference signal-demodulation reference signal (PTRS-DMRS) association field;
a second PTRS-DMRS association field; and
a sounding reference signal (SRS) resource set field, wherein:
a first value of the SRS resource set field indicates the PUSCH transmissions are based on the first PTRS-DMRS association field; and
a second value of the SRS resource set field indicates the PUSCH transmissions are based on the second PTRS-DMRS association field; and
receive the PUSCH transmissions based on the SRS resource set field.

9. The base station of claim 8, wherein the instructions further cause the base station to determine, based on the first value or the second value, a PTRS-DMRS association field, from the first PTRS-DMRS association field and the second PTRS-DMRS association field, to apply to a PUSCH transmission of the PUSCH transmissions.

10. The base station of claim 8, wherein the instructions further cause the base station to select, based on the first value or the second value, one of the first PTRS-DMRS association field or the second PTRS-DMRS association field to apply to a PUSCH transmission of the PUSCH transmissions.

11. The base station of claim 8, wherein the instructions further cause the base station to receive one or more PTRSs over one or more DMRS ports of the PUSCH transmissions.

12. The base station of claim 8, wherein one of the first PTRS-DMRS association field or the second PTRS-DMRS association field indicates an association between a DMRS port of a PUSCH transmission of the PUSCH transmissions and a PTRS port.

13. The base station of claim 8, wherein the instructions further cause the base station to receive:
a first PTRS over a first DMRS port of a first PUSCH transmission of the PUSCH transmissions; and
a second PTRS over a second DMRS port of a second PUSCH transmission of the PUSCH transmissions.

14. The base station of claim 8, wherein:
the first PTRS-DMRS association field indicates an association between a first DMRS port of a first PUSCH transmission of the PUSCH transmissions and a first PTRS port; and
the second PTRS-DMRS association field indicates an association between a second DMRS port of a second PUSCH transmission of the PUSCH transmissions and a second PTRS port.

15. A non-transitory computer-readable medium storing instructions that, when executed by one or more processors of a wireless device, cause the wireless device to:
receive downlink control information (DCI) scheduling physical uplink shared channel (PUSCH) transmissions for a cell, wherein the DCI comprises:
a first phase tracking reference signal-demodulation reference signal (PTRS-DMRS) association field;
a second PTRS-DMRS association field; and
a sounding reference signal (SRS) resource set field, wherein:
a first value of the SRS resource set field indicates the PUSCH transmissions are based on the first PTRS-DMRS association field; and a second value of the SRS resource set field indicates the PUSCH transmissions are based on both the first PTRS-DMRS association field and the second PTRS-DMRS association field; and transmit the PUSCH transmissions based on the SRS resource set field.

16. The non-transitory computer-readable medium of claim 15, wherein the instructions further cause the wireless device to determine, based on the first value or the second value, a PTRS-DMRS association field, from the first PTRS-DMRS association field and the second PTRS-DMRS association field, to apply to a PUSCH transmission of the PUSCH transmissions.

17. The non-transitory computer-readable medium of claim 15, wherein the instructions further cause the wireless device to select, based on the first value or the second value, one of the first PTRS-DMRS association field or the second PTRS-DMRS association field to apply to a PUSCH transmission of the PUSCH transmissions.

18. The non-transitory computer-readable medium of claim 15, wherein the instructions further cause the wireless device to transmit one or more PTRSs over one or more DMRS ports of the PUSCH transmissions.

19. The non-transitory computer-readable medium of claim 15, wherein one of the first PTRS-DMRS association field or the second PTRS-DMRS association field indicates an association between a DMRS port of a PUSCH transmission of the PUSCH transmissions and a PTRS port.

20. The non-transitory computer-readable medium of claim 15, wherein the instructions further cause the wireless device to transmit:

a first PTRS over a first DMRS port of a first PUSCH transmission of the PUSCH transmissions; and a second PTRS over a second DMRS port of a second PUSCH transmission of the PUSCH transmissions.

* * * * *